(12) United States Patent
Hill et al.

(10) Patent No.: US 9,589,287 B2
(45) Date of Patent: Mar. 7, 2017

(54) USER COMMUNITY GENERATED ANALYTICS AND MARKETPLACE DATA FOR MODULAR SYSTEMS

(71) Applicant: MIQ LLC, Bellevue, WA (US)

(72) Inventors: William McGinley Hill, Seattle, WA (US); Adam Monroe Livesay, Seattle, WA (US); Steven Richard Schwasnick, Rocklin, CA (US)

(73) Assignee: MIQ LLC, Bellevue, WA (US)

( * ) Notice: Subject to any disclaimer, the term of this patent is extended or adjusted under 35 U.S.C. 154(b) by 0 days.

(21) Appl. No.: 14/919,393

(22) Filed: Oct. 21, 2015

(65) Prior Publication Data
US 2016/0379282 A1 Dec. 29, 2016

Related U.S. Application Data

(63) Continuation-in-part of application No. 14/754,431, filed on Jun. 29, 2015.

(51) Int. Cl.
*G06Q 30/06* (2012.01)
*G06Q 50/00* (2012.01)
*G05B 19/418* (2006.01)

(52) U.S. Cl.
CPC ......... *G06Q 30/0601* (2013.01); *G06Q 50/01* (2013.01); *G05B 19/4183* (2013.01); *Y02P 90/10* (2015.11)

(58) Field of Classification Search
None
See application file for complete search history.

(56) References Cited

U.S. PATENT DOCUMENTS

| 6,272,873 B1 | 8/2001 | Bass | |
| 6,862,589 B2 * | 3/2005 | Grant | G05B 19/19 702/183 |

(Continued)

OTHER PUBLICATIONS

Office Communication for U.S. Appl. No. 14/448,960 mailed on Nov. 18, 2014 (25 pages).

(Continued)

*Primary Examiner* — Sean Shechtman
*Assistant Examiner* — Steven Garland
(74) *Attorney, Agent, or Firm* — John W. Branch; Lowe Graham Jones PLLC

(57) ABSTRACT

Embodiments are directed towards providing analytics and marketplace data to members of a user community. In some embodiments, the analytics and marketplace data are generated based on machine data provided by the members. The analytics and marketplace data may enable automatically identifying, configuring, monitoring, controlling, managing, and/or maintaining a machine or a collection/system of machine components. The analytics may include, but are not limited to analytics related to machine component reliability, machine maintenance conditions, machine prohibited conditions, machine usages, machine alert conditions, and the like. The marketplace data may include information relating to the maintenance of the machine, replacement components or alternative components for the machine, and the like for various machines. Marketplace data may include an aggregation of electronic (e)-commerce data. The marketplace data may be provided is based on data aggregated from various sources, including vendors, suppliers, buyers, sellers, online auctioneers, or other members of the user community.

24 Claims, 20 Drawing Sheets

(56) References Cited

U.S. PATENT DOCUMENTS

| | | | |
|---|---|---|---|
| 8,004,663 | B1 | 8/2011 | Melvin |
| 2002/0077779 | A1 | 6/2002 | Liebl et al. |
| 2002/0112042 | A1 | 8/2002 | Coburn, II et al. |
| 2002/0133273 | A1 | 9/2002 | Lowrey et al. |
| 2005/0183421 | A1 | 8/2005 | Vaynberg et al. |
| 2006/0182055 | A1 | 8/2006 | Coffee et al. |
| 2007/0063029 | A1 | 3/2007 | Brandt et al. |
| 2007/0208436 | A1 | 9/2007 | Das et al. |
| 2007/0268128 | A1 | 11/2007 | Swanson et al. |
| 2008/0033600 | A1 | 2/2008 | Norbeck |
| 2008/0147571 | A1* | 6/2008 | Greiner .............. G06Q 30/0283 705/400 |
| 2009/0170537 | A1 | 7/2009 | Mauti, Jr. |
| 2010/0100279 | A1 | 4/2010 | Silvester |
| 2010/0135187 | A1 | 6/2010 | Kwark |
| 2010/0145629 | A1 | 6/2010 | Botich et al. |
| 2011/0153052 | A1* | 6/2011 | Pettibone ............ G06F 17/5004 700/98 |
| 2012/0299828 | A1 | 11/2012 | Grokop et al. |
| 2012/0303392 | A1 | 11/2012 | Depura et al. |
| 2013/0185675 | A1 | 7/2013 | Perry et al. |
| 2013/0207783 | A1* | 8/2013 | Cruzado .............. H05K 5/0208 340/10.5 |
| 2013/0298652 | A1 | 11/2013 | Gillette, II |
| 2014/0070924 | A1 | 3/2014 | Wenger et al. |
| 2014/0075362 | A1 | 3/2014 | Gray et al. |
| 2015/0026622 | A1 | 1/2015 | Roaldson et al. |
| 2015/0169922 | A1 | 6/2015 | Krepel et al. |

OTHER PUBLICATIONS

Office Communication for U.S. Appl. No. 14/448,960 mailed on May 6, 2015 (32 pages).
Office Communication for U.S. Appl. No. 14/448,960 mailed on Jul. 23, 2015 (6 pages).
Office Communication for U.S. Appl. No. 14/449,936 mailed on Apr. 27, 2015 (9 pages).
Office Communication for U.S. Appl. No. 14/449,936 mailed on Oct. 21, 2015 (14 pages).
Office Communication for U.S. Appl. No. 14/449,936 mailed on Feb. 18, 2016 (5 pages).
Office Communication for U.S. Appl. No. 14/754,431 mailed on Feb. 23, 2016 (18 pages).
Office Communication for U.S. Appl. No. 14/449,936 mailed on Mar. 23, 2016 (17 pages).
Office Communication for U.S. Appl. No. 15/009,566 mailed on Jun. 16, 2016, (7 pages).
Office Communication for U.S. Appl. No. 14/754,431 mailed on Aug. 4, 2016, (24 pages).
Office Communication for U.S. Appl. No. 14/448,960 mailed on Jul. 27, 2016, (37 pages).
Office Communication for U.S. Appl. No. 14/449,936 mailed on Sep. 27, 2016, (17 pages).
Office Communication for U.S. Appl. No. 15/009,566 mailed on Oct. 6, 2016, (6 pages).
Office Communication for U.S. Appl. No. 14/754,431 mailed on Oct. 20, 2016, (7 pages).
Office Communication for U.S. Appl. No. 14/443,960 mailed on Nov. 15, 2016, (5 pages).

\* cited by examiner

US 9,589,287 B2

USER COMMUNITY GENERATED ANALYTICS AND MARKETPLACE DATA FOR MODULAR SYSTEMS

PRIORITY CLAIM

This patent application is a Continuation-in-Part of U.S. patent application Ser. No. 14/754,431, entitled MODULAR CONTROL SYSTEM, filed on Jun. 29, 2015, which the contents of are hereby incorporated in entirety by reference.

TECHNICAL FIELD

The present invention relates generally to managing systems for machines, and more particular, but not exclusive, to providing user community generate analytics and marketplace data for modular machines.

BACKGROUND

Typically, commercial and industrial machinery have many different components and subsystems. These machines can include various mechanical, fluid, and/or electrical systems. If one system, subsystem, or component fails, a machine may be idle for some time while the failure is diagnosed and replacement components are ordered. The longer a machine sits idle, the more money that is lost to the machines owner and/or operator. So, identifying, configuring, monitoring, and controlling various aspects and characteristics of the machinery in real-time could help in diagnosing and resolving problems before they occur and providing helpful solutions when they do happen. Due to the complexity of these machines, however, the amount data obtained by monitoring a single machine may be overwhelming and its lack of context may be uninformative.

Moreover, because of the complexity of these machines, many different skill sets may be required to diagnose a component failure, determine the necessary repairs and/or replacement components, and perform the repair and/or install the replacement components. Sometimes a component may fail due to a malfunction or failure of another component, which may be difficult to diagnose. Because of machine complexity and the difficulty in diagnosing component failures, these machines may sit idle while repairs are performed, resulting in lost income. Thus, it is with respect to these considerations and others that the invention has been made.

DETAILED DESCRIPTION OF THE INVENTION

Figure 1:
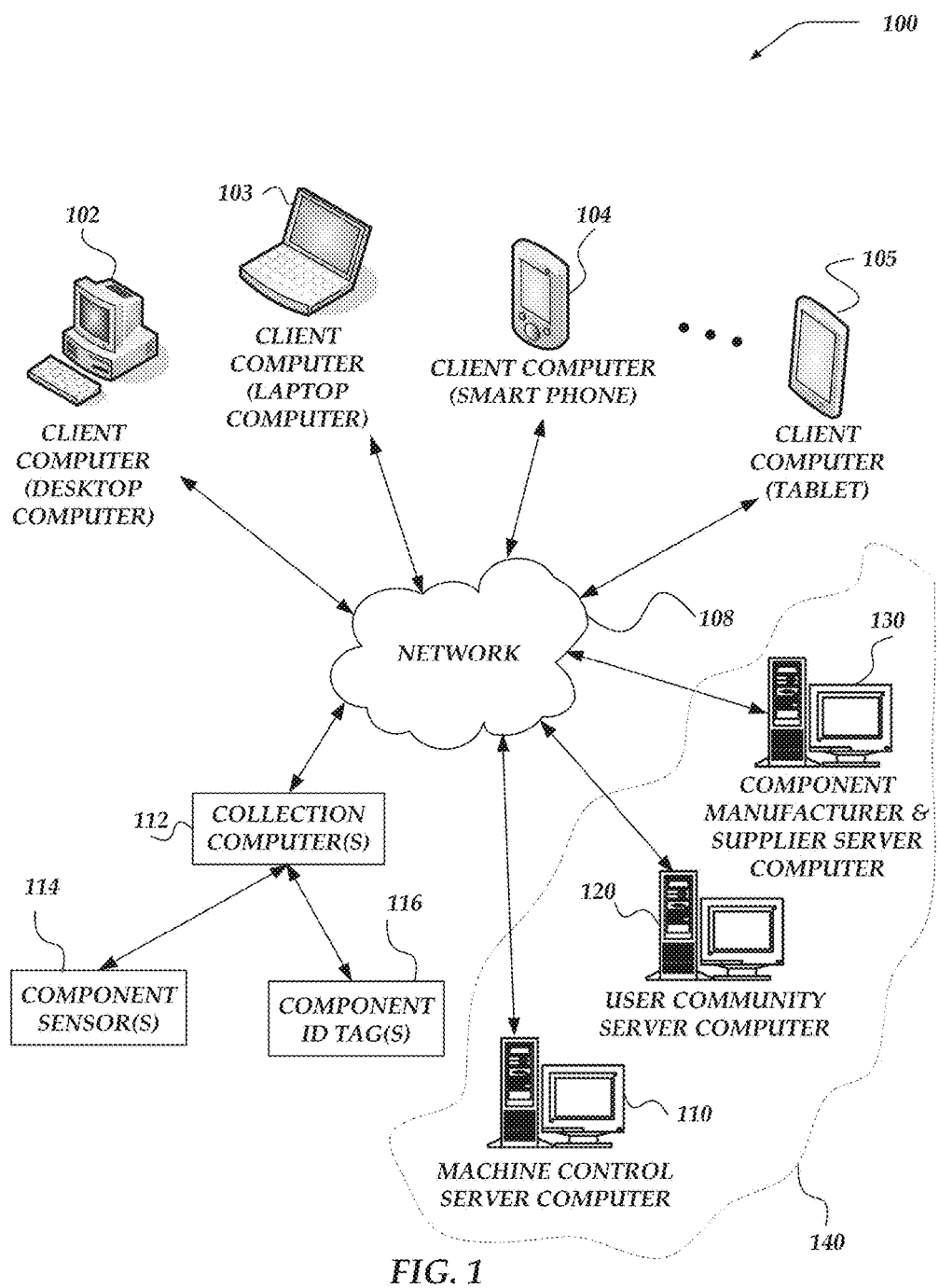
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "machine" and "equipment" may refer to a collection, ensemble, system, or sub-system of components. The components may be modular components. A component may be a machine part. At least a portion of the components enable and/or provide various functions associated with the machine. Furthermore, the terms "machine," and "equipment" may refer to mechanical devices that can be used at a job site to perform actions. In at least one of various embodiments, the machine/equipment may be field-deployable or stationary. Examples of machines or equipment includes, but are not limited to industrial or construction equipment or vehicles or various components thereof.

Machines/equipment may include virtually any system or subsystem that includes mechanical, electrical, fluid power systems, or the like. As such, machines may be systems or sub-systems. Examples further include engines, motors, pumps, pistons, valves, winches, gearboxes, power units, manifolds, filters, cylinders, actuators, accumulators, lubrication systems/components, control devices such as joysticks, or other mechanical/hydraulic/pneumatic devices that have characteristics that can be monitored by one or more sensors. As discussed further below, machines or equipment may be remotely configured, monitored, controlled, and/or at least partially maintained by one or more collection computers in communication, via a network, with the machine.

As used herein, the term "collection computer" may refer to a network computer device that can identify, configure, monitor, control, and manage the maintenance of one or more collections of components, such as a machine. The machine components may include sensors that provide machine data to the collection computer over a network. The collection computer may automatically identify each component via the ID Tags, as well as collect sensor data from the sensors.

The data may be transmitted to another network computer. In some embodiments, a collection computer may be referred to as a collection node. In various embodiments, a collection computer may store at least some of the collected data. In other embodiments, the collection computer may transmit at least some of the collected data to a remote server computer. In various embodiments, a user may be enabled to customize the collection computer by selecting which sensors to collect, store, and/or transmit data. Because a collection computer at least partially enables the remote control of a machine, a collection computer may be a controller computer. Furthermore, because a collection computer at least partially enables the management of a machine, a collection computer may be a manager computer. In various embodiments, a collection computer is a collection server computer.

As used herein, the terms "Identification Tag," "ID Tag," and "Tag" may refer to a readable device that includes identifying information or data regarding a component. The identifying information may be uniquely identifying information, such that at least one of a component type, version, manufacturing traceability, component specifications, and the like may be determined from reading or interrogating the ID Tag. In addition to identifying a type of component, information stored in the ID Tag may uniquely identify the specific instance of the component. For instance, a unique serial number may be stored in each ID Tag that uniquely identifies the component. Thus, both component type and specific instances of components may be tracked via the identifying information stored in the ID Tag.

ID Tags include non-volatile memory to store information pertaining to the corresponding part. Various, but non-limiting, examples of non-volatile memory include read-only memory, FLASH memory (NAND or NOR), ferroelectric (Fe) random-access memory (RAM), magnetic RAM, phase-change memory (PCM or PCRAM), erasable programmable read only memory (ROM) (EPROM), electrically erasable programmable read only memory (EEPROM), and the like. Embodiments of PCM include chalcogenide memory and the like. In at least one embodiment, ID Tags include an integrated circuit (IC) that includes onboard FLASH memory that stores the pertinent information regarding the corresponding component.

In preferred embodiments, an ID Tag is a radio-frequency ID (RFID) Tag. When read, an RFID TAG may wirelessly provide, via electromagnetic fields, the information embedded or encoded within the Tag. A Tag may electronically store the information. A Tag may be powered via electromagnetic induction that is induced by an interrogating or reading device. In other embodiments, the Tag may be powered via an internal power source, such as a battery.

An ID Tag may be included in one or more components included in a machine. For instance, at least one ID Tag may be mounted directly on, on integrated with, or otherwise connected to at least one component included in a collection of components, i.e. a machine. Information regarding the associated or corresponding component may be determined by wirelessly reading and/or interrogating the ID Tag. In preferred embodiments, at least a portion of the ID Tags included in a collection of components are in communication with one or more manger computers. A collection computer may automatically determine information regarding the collection of components based on the information provided by the one or more ID Tags. In preferred embodiments, one or more collection computers may enable the automatic identification of at least a machine type associated with the machine based on the information stored in the machine component ID Tags. The collection computer may further enable the automatic configuration of the machine based on at least the information provided by the one or more ID Tags.

As used herein, the term "sensor" may refer to a device that measures at least one characteristic of a machine and/or equipment. Examples of machine/equipment characteristics may include, but are not limited to, current load, current component movement/motion (e.g., a conveyer belt), hydraulic pressure, bearings, GPS location, gearbox temperature, hydraulic temperature, engine PRMs, vehicle speed, coolant temperature, engine coolant level, engine coolant pressure, engine oil temperature, engine oil level, engine oil pressure, engine fuel consumption rate, instantaneous fuel economy, average fuel economy, total average fuel economy, total fuel used, total engine idle hours, total engine idle fuel used, total engine hours of operation, fuel level, or the like. Examples of sensors may include, but are not limited to, pressure sensors, temperature sensors, load cells, revolutions per minute sensors, fluid level sensors, consumption or flow rate sensors, running time, idle time, location sensors (e.g., GPS), video cameras, still image cameras, motion sensors, humidity sensors, moisture sensors, vibration sensors, sound/acoustic sensors, or the like.

In some embodiments, the sensor may be mounted to, integrated with, or otherwise connected to components within the configured, monitored, and managed collection of components, i.e. the machine or equipment. In various embodiments, one or more sensors may be in communication with one or more collection computers. In some embodiments, each sensor may include or be connected to a controller that can convert signals received from the sensor into messages or other data formats that can be recognized and understood by the collection computer. In one non-limiting example, sensors may be in communication or connected to a collection computer by a controller area network (CAN), a National Marine Electronics Association (NMEA) 2000 network, an Aircraft Data Network (ADN), and the like. The network sensors may be identified by a corresponding CAN, NMEA 2000 or ADN identifier (e.g., a source address, unique sensor identifier, or the like).

As used herein, the term "template" may refer to a report or graphical representation of at least ID Tag, sensor data, machine and/or component analytics, marketplace data, and the like. Templates may be predetermined and/or generated, created by a user, modified by a user, customized by a user, or the like. Each template may include one or more gauges, charts, graphs, maps, or other visualizations to represent ID Tag, sensor data, analytics, marketplace data, and the like, which can be customized by a user. A template may also indicate a machine type, such as a hydraulic pump, or the like, for a machine that is automatically identified by the parts included in the machine. Furthermore, a template may also indicate a specific instance of a machine. Such indications of specific instances of machines may include unique serial numbers, licenses numbers, or the like. Templates may also include features to visually represent data, such as machine data obtained via the interrogation of ID Tags and sensors. In various embodiments, a user may be enabled to select which ID Tags and sensors to view corresponding ID Tag and sensor data. In other embodiments, the ID Tags and/or sensors may be automatically selected for a template based on a machine being automatically configured and/or monitored, the ID Tags and sensors providing real-time data, historical data stored at the server, or the like.

A template may be an analytics template. Analytics templates may also include features to visually represent analytics, such as but not limited to component reliability analytics, maintenance condition analytics, prohibited condition analytics, alert condition analytics, and the like. In various embodiments, a user may be enabled to select which analytics to be provided with from a user community, as well as which analytics to provide to the user community, via a customization of an analytics template. For instance, a user may customize which machine data to provide to generate user community machine analytics via an analytics template. In other embodiments, the analytics to be provided with or to provide to a user community may be automatically selected for an analytics template based on a machine being automatically configured and/or monitored, as discussed in conjunction with the various embodiments described herein.

A template may be a marketplace template. Marketplace templates may also include features to visually represent marketplace data, such as but not limited to component prices, component availability, preferred vendors, reviews of vendors and components, and the like. In various embodiments, a user may be enabled to select which marketplace data to be provided with from a user community, as well as which marketplace data to provide to the user community, via a customization of a marketplace template. In other embodiments, the marketplace data to be provided with or to provide to a user community may be automatically selected for a marketplace template based on a machine being automatically configured and/or monitored, as discussed in conjunction with the various embodiments described herein.

Briefly stated, embodiments are directed towards providing analytics and marketplace data to members of a user community. In some embodiments, at least a portion of the analytics and marketplace data is generated based on machine data provided by members of the user community. The analytics and marketplace data may enable, or at least enhance, automatically identifying, configuring, monitoring, controlling, managing, and/or at least partially maintaining a machine or a collection/system of machine components. The analytics may include, but are not limited to analytics related to machine component reliability, machine maintenance conditions, machine prohibited conditions, machine usages, machine alert conditions, and the like. The marketplace data may include information relating to the maintenance of the machine, replacement components or alternative components for the machine, and the like for various machines. Marketplace data may include an aggregation of electronic (e)-commerce data. Marketplace data may be provided (automatically or manually) may be based on data aggregated from various sources, including vendors, suppliers, buyers, sellers, online auctioneers, members of the user community, and the like. In at least some embodiments, vendors, suppliers, and the like, as well as machine users are included in the user community.

The analytics may be provided to the user via a populated analytics template. The user may customize the analytics template to customize which analytics are provided and a structure for the provided analytics, as well as which members of the user community contribute machine data to determine the analytics. Likewise, the marketplace data may be provided via a populated marketplace template. The user may customize the marketplace template to customize what marketplace data is provided and a structure for the provided marketplace data, as well as which members of the user community may contribute machine data to determine the marketplace data.

The analytics and marketplace data may be determined based on various analyses of machine data, at least a portion of which is provided by the user community. Such analyses include, but are other not limited to predictive analyses pertaining to the maintenance and reliability of machines that include modular components, availability of replacement and/or alternative components for the machines, and the like. Furthermore, such analyses may be based on user community generated heuristics.

A member of the user community may generate a social network, which includes peers of the member. Each of the peers may also be members of the user community. Accordingly, a social graph may be generated for each member of the user community. The user community generated analytics and marketplace data provided to a member may be updated or refined based on the peers included in the member's social network.

At least some embodiments are directed toward automatically identifying, configuring, monitoring, controlling, managing, and/or at least partially maintaining a machine or a collection/system of machine components, at least partially based on user community generated analytics. One or more collection computers, in communication via a network with the machine components, may enable the remote and/or automatic identification, configuration, monitoring, controlling, and maintaining of a machine based on at least machine readable ID Tags and sensors associated with the machine components.

Various data, including previously collected data, as well as real-time data are utilized to identify configure, manage, and maintain the machine. At least a portion of the data may be accessible via a system database. The system database includes at least machine, component, user, user community, reliability, and market related information. Users are enabled to customize the identifying, configuring, monitoring, controlling, and maintaining aspects of the various embodiments. The user may also customize data collection and various predictive analyses or determinations regarding the usage, operation, and maintenance of the machine.

A collection computer is coupled to a machine (or collection/system of components) and is in communication with a remotely located server computer. The collection computer may automatically detect each of a plurality of ID Tags associated with one or more components of the machine. The collection computer may additionally automatically detect sensors that provide real-time data regarding at least one characteristic of a first machine. In some embodiments, the collection computer may monitor a network such as a Controller Area Network (CAN), a National Marine Electronics Association (NMEA) 2000 network, an Aircraft Data Network (ADN), and the like. These networks may provide message identifiers that correspond to the detected ID Tags or sensors currently providing real-time data to the collection computer. In various embodiments, a user may be enabled to select a separate sampling rate of the current real-time data for at least a portion of the plurality of sensors. The collection computer collects a real-time, or near real-time, telemetry datastream during the operation or usage of the machine. The telemetry datastream includes at least a portion of the ID Tag data and a portion of the sensor data.

Various embodiments are enabled to determine information that enables the identifying, configuring, monitoring, managing, and maintaining of the machines. Real time information provided by the component ID Tags and sensors is employed in various predictive analyses to determine such information. Additional information from databases or libraries included in the embodiments further informs the predictive analyses. The analyses may be deterministic analyses or statistical analyses. Statistical analyses may include likelihoods, probabilities, or confidence levels associated with the determined information. These analyses are utilized to increase the functionality of the embodiments, such as monitoring, controlling, and maintaining the machine.

As discussed throughout, any of the analytics and marketplace data generated to identify, configure, control, manage, or maintain a machine may be based on one or more heuristics. The heuristics may be developed over time as data, such as ID Tag and sensor data, are collected and analyzed by the modular system. In preferable embodiments, data supplied by machine & component manufacturers, as well the user and a user community are used to develop the various heuristics. Data generated or at least provided by a subset of the user community, such as peers included in a member's social network, may further refine such heuristics. Thus, as the user community and a particular social network grows, e.g. as the number and variety of individual users within the community increases, the applicability and optimization of the heuristics is increased. Refinement of the analytics marketplace data via a social network may direct the analytics and marketplace data to the specific member who has generated the social network.

The heuristics may be developed automatically and/or with the assistance or input from the user or the user's social network, or peers within the social network. Various embodiments may employ forms of machine learning to develop, generate, and/or update the heuristics as data from the machines (ID Tag and sensor data), manufacturers (specification and reliability data), users (specific applications and user preferences/profile data), user community (crowd sourced reviews & configurations), as well as component and machine vendors (replacement parts availability and pricing). In at least some embodiments, component and machine vendors may be members of the user community. Accordingly, the predictive analyses and/or heuristics are adaptive and updated to reflect the accumulating knowledge of the various machines, components, uses, and applications, generated by the users, manufacturers, and suppliers/vendors.

Each of the determinations may be based on information provided by the ID Tags and the sensors. For instance, the history of the usage of the machine may be tracked via at least sensor data. The tracking or logging of the sensor data enables the determination of the distribution of the usage conditions of the components and the machine as a whole. For instance, the average, as well as the extreme operational (i.e. peak) parameters, conditions, location, environmental conditions, and the like may be tracked to inform any of the determinations, predictive analyses, and/or heuristics as discussed throughout. For instance, after a predetermined period of use, the various embodiments may determine an average load on the machine, as well as a peak load based on collected sensor data. The history of any machine, or machine component, may be archived in one or more corresponding log files.

The ID Tags enable a self-identification of the components. The self-identification process may identify the type of the component, as well as the specific instance of the component type. Furthermore, ID Tags may include component traceability information, such as component manufacturers, part/lot data, manufacturing date, factory, and the like. Accordingly, each component includes complete traceability enabled by information stored on the corresponding ID Tag.

The system utilizes information regarding the self-identified components to automatically identify the machine, as a specific collection of the self-identified components. When identifying a machine, various embodiments may identify a machine type associated with the specific combination of the self-identified collection of components. For instance, a specific combination of components may be a signature that the machine is a hydraulic pump. The embodiments may also determine a specific instance of the machine type, such as these identified components signify that the machine is User_X's hydraulic pump and is identified by Serial No. XYZ.

Additionally, because the components included in the machine are discoverable in real-time, the component history of a particular machine may be logged and/or archived. Thus, the specific components included in the machine at any point in the machine's history is traceable. A component archive or history may be generated for each machine. Thus it is easily determinable that on Jun. 1, 2014, Machine_A included the following components: X, Y, and Z. However the on Jun. 1, 2015, Machine_A included the following components: X, Y, and W. Thus, the maintenance history may be automatically logged via the self-identification of machine components.

Once identified (machine type and/or specific instance of the machine), a machine may be automatically configured based on the machine type, previous usage of the machine, a location or environment of the machine, an intended use of the machine, the actual components included in the machine, user community generate heuristics, and the like. Various machine and/or component configurations may be included in databases or libraries. Once identified, the configurations are accessed and executed by the components and/or machine. Thus, because the identification and configuration of the machine and its components is automatic, the self-identifying components may be "plug-n-play" components.

As mentioned above, the various embodiments may employ prior knowledge of the machine (a previous machine use), current machine conditions (such as machine environment, current/actual usage, machine operator, and the like), and user/user community generated analytics and heuristics to automatically predict an expected usage of the machine. The expected usage of the machine may be based on weighted averages of previous sensor data, as well as the peak and/or extreme values of the data. In at least one embodiment, the distribution of sensor value data, over at least a portion of the machine's history, is evaluated when determining a machine's previous and expected usage.

The machine may be automatically configured based on the automatically determined machine type and expected/previous machine usage. In other embodiments, the implemented configuration may be tailored to a specific application of the machine. Such an application may include the expected load, such as an engine load or torque, and expected utilization, and the like. The user may at least partially define or update the intended or specific application of the machine. As such, the configurations included in the configuration libraries may be included in configuration files and tailored to, directed at, or otherwise optimized to the determined expected use or specific application.

Furthermore, the component sensor data enables the real-time, or near real-time, monitoring and managing of the machine's usage. Such real-time monitoring informs various predictive analyses, such as the unsafe or unauthorized operating of the machine, operating the machine outside of its intended uses or applications, or a violation of a regulation regarding the machine's legal usage.

In an exemplary embodiment, a particular operator may not be authorized to operate a machine outside of a limited range of operating conditions, locations, environments, time/date periods, and the like. The various embodiments may use real-time, as well as previously logged or archived sensor data, and other accessible data, such as user-specific permissions and regulatory rules, to predict or determine alert and/or prohibited conditions. When an alert or prohibited condition is triggered, the various embodiments are enabled to provide an alert to a user, limit or prohibit the further use of the machine, or force the machine's operator to return the usage of the machine into compliance.

Another functionality of the various embodiments includes the remote access and operation of the machine. Such remote access enables the remote controlling and managing of the machine. Remote access enables the remote configuration, as well as remotely varying operational parameters during machine start-up, or even in real, or near real-time during the operation of the machine.

One advantage of such remote access is the remote clearing of a diagnostic alert, error condition, or prohibited condition. For instance, certain alerts or diagnostic conditions may require the attention and/or clearance by a specific user, or class of users such as certified technicians. Through the employment of user credentials and permissions, the embodiments enable members of a trusted or certified specific or group of users to remotely attend to the alert. In at least one embodiment, a certified technician may remotely attend to and "clear" an alert or warning via a remote user interface. As such, various embodiments obviate the need for a certified technician to travel to the field to attend to the condition. The remote access of the machine may be logged and reviewed for compliance at a later date. Such remote access enables the remote troubleshooting and diagnosis of machine issues.

Additionally, the various embodiments store, archive, and/or log at least a portion of the ID and sensor data, as well as other data, such as user provided data, to inform and update future predictive analyses. For instance, tracking the usage of a machine via sensor data enables the embodiments to determine the machine's previous usage, loads, duty cycles, and the like. Systems implemented in the various embodiments are enabled to predict expected usages based on at least previous usages.

Information, including but not limited to the ID and sensor data are utilized to generate and/or update databases that are utilized in the various determinations and analyses of the embodiments. The predictive analyses and/or heuristics may "learn" from previous data, or are at least updatable so that an accuracy or fidelity of the analysis increases over time. In at least some embodiments, Bayesian methodologies are implemented on user community generate data and analytics to to update prior knowledge of the machines that are identified, configured, monitored, and maintained by the system. Machine learning, such as neural networks, Bayesian networks, and the like may be employed to generate and/or update the predictive analyses and heuristics.

The ongoing monitoring of the machine's usage may be used to generate additional or update existing machine and component configurations included in the configuration libraries. As such, over time, updated configurations may be enhanced, optimized, and/or tailored to specific users, operators, machine applications/usages, geo-locations, environments, and the like. The various embodiments may predict and/or suggest other configurations or other specific components or combinations of components, where the component/configurations suggestions are tailored to a user's expected use of the machine. These and other determinations made by the various embodiments may be based on weighted average values of sensor data, peak values, distributions, and the like. For instance, the configurations may be based on the average use of a machine or a user may select to automatically configure the components for the most extreme usage, such as a peak load on the machine.

The reliability and maintenance requirements of the machine may be predicted or at least anticipated prior to an actual event or usage precipitates the malfunction, diminished operation, or failure of the machine's operation. Furthermore, systems or sub-systems of the various embodiments may determine a plurality of maintenance options, such that a user may choose the most cost-effective and/or efficient option to maintain the machine. For instance, by tracking the actual usage of the components via sensor data, the embodiments may determine a predicted or approximate date of component failure. The determination may incorporate component reliability data, as well as the expected component usage to predict a failure or replacement date, well in advance of that date. The predictive failure analysis may incorporate user community generate or provided data and analytics, such as manufacture reliability data, as well as reliability data generated by the user's social network.

In addition to providing user's various information regarding the maintenance needs of a machine, the embodiments may provide the user real-time market data regarding replacement and/or alternative components. The system may utilize market data, as well as component data to provide various vendors, and other parties who may supply a replacement component. The system may aggregate information regarding all known sources of a replacement part, such that the user may easily chose the most efficient option. In at least one embodiment, the system automatically aggregates marketplace data accessible over a network. For instance, the system may aggregate web-accessible market data, including data provided by vendors, sellers, and buyers. The system may incorporate data available via online auction, or other e-commerce sites.

Furthermore, the embodiments may use component data to provide suggestions regarding alternative choices for replacement components or parts. At least a portion of the component data may be provided my members of the user community to generate various analytics. Any of the data used by the system may be provided from various members of the user community, including component and machine manufactures, as well as from a community of users, suppliers, vendors, and the like. Thus, at least a portion of the data may be provided by the members of the user community, and the peers included in one or more social networks. The embodiments may suggest alternative components based on the previous, expected, or actual usage of the machine. Such suggestions may be informed by a community of users, including the peers with the user's social network, that have used various combinations of components in various usages, contexts, locations and the like. Various heuristics developed from analytics may be employed to suggest alternative components, alternative uses for, and/or alternative configurations of machines and systems of components. Any marketplace data provided to the user may be local to the user's environment. In some embodiments, at least a portion of the marketplace data includes global market data.

All of the information, capabilities, determinations, predictions, and the like of the various embodiments may be provided to the user in an integrated environment that includes a user interface. As such, a user may order a replacement and/or alternative part via the user interface while monitoring the machine. As such, the maintenance of monitored machines is much more manageable and efficient.

Illustrated Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include machine control server computer (MCSC) 110, user community server computer 120, component manufacturer and supplier server computer 130, client computers 102-105, collection computer(s) 112, component sensor(s) 114, component ID Tags 116, and network 108.

In various embodiments, system 100 includes a machine-managing platform 140. Machine-managing platform 140 may include one or more server computers, such as but not limited to MCSC 110, user community server computer 120, component manufacturer and supplier server computer 130. Furthermore, platform 140 may include one or more instances of client devices, including but not limited to any of client devices 102-105. Platform 140 may include one or more collection computers, such as collection computer 112 or and other network computer. Although not shown, platform 140 may include one or more data storage devices, such as rack or chassis-based data storage systems. Any of the databases discussed herein may be at least partially stored in data storage devices within platform 140. As shown, any of the network devices, including the data storage devices included in platform 140 are accessible by other network devices, via network 108.

At least one embodiment of client computers 102-105 is described in more detail below in conjunction with client computer 200 of FIG. 2. Briefly, in some embodiments, client computers 102-105 may be configured to communicate with collection computers 112, MCSC 110, user community server computer 120, component manufacturer and supplier server computer 130, and/or other network computers. In various embodiments, client computers 102-105 may be enabled to access, interact with, and/or view user interfaces and reports provided by MCSC 110, such as through a web browser. In at least one of various embodiments, a user of a client computer may be enabled to manipulate, configure, and/or customize the machine configuration, monitoring, controlling, maintenance, and reporting services proved by MCSC 110. The user of a client computer may also configure a template.

In at least one of various embodiments, client computers 102-105 may be enabled to receive alerts if an alert condition is satisfied by at least one sensor. Similarly, client computers 102-105 may be enabled to communicate (e.g., via a Bluetooth or other wireless technology, or via a USB cable or other wired technology) with collection computers 112, such as to configure a collection computer in which ID Tag and sensor data may be collected by the collection computer 112, stored at the collection computer 112, and/or transmitted to MCSC 110. In some embodiments, at least some of client computers 102-105 may operate over a wired and/or wireless network to communicate with other computing devices, collection computers 112, or MCSC 110. Generally, client computers 102-105 may include computing devices capable of communicating over a network to send and/or receive information, perform various online and/or offline activities, or the like. It should be recognized that embodiments described herein are not constrained by the number or type of client computers employed, and more or fewer client computers—and/or types of client computers—than what is illustrated in FIG. 1 may be employed.

Devices that may operate as client computers 102-105 may include various computing devices that typically connect to a network or other computing device using a wired and/or wireless communications medium. Client computers 103-105 may be mobile devices and may include portable computers, and client computer 102 may include non-portable computers. Examples of client computer 102 may include, but is not limited to, desktop computers, personal computers, multiprocessor systems, microprocessor-based or programmable electronic devices, network PCs, or the like, or integrated devices combining functionality of one or more of the preceding devices. Examples of client computers 103-105 may include, but are not limited to, laptop computers (e.g., client computer 103), smart phones (e.g., client computer 104), tablet computers (e.g., client computer 105), cellular telephones, display pagers, Personal Digital Assistants (PDAs), handheld computers, wearable computing devices, or the like, or integrated devices combining functionality of one or more of the preceding devices. As such, client computers 102-105 may include computers with a wide range of capabilities and features.

Client computers 102-105 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 102-105 may be enabled to connect to a network through a browser, or other web-based application.

Client computers 102-105 may further be configured to provide information that identifies the client computer. Such identifying information may include, but is not limited to, a type, capability, configuration, name, or the like, of the client computer. In at least one embodiment, a client computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of MCSC 110 is described in more detail below in conjunction with machine control server computer 300 of FIG. 3. Briefly, in some embodiments, MCSC 110 may be operative to communicate with client computers 102-105 to enable users of client computers 102-105 to view, access, and/or manipulate ID Tag and sensor data stored/maintained by MCSC 110. In various embodiments, MCSC 110 may communicate with one or more collection computers 112 to configure the collection computer 112, receive sensor data and ID Tag data from the collection computer, or the like. In some embodiments, MCSC 110 may maintain one or more templates which can be generated, modified, and/or customized based on ID Tag and/or sensor data transmitted from a collection computer 112 and/or based on input by a user (e.g., a user's selection of one or more ID Tags or sensors).

In some embodiments, MCSC 110 may monitor the ID Tag and/or sensor data to determine if an alert condition is satisfied (e.g., a temperature value exceeding a threshold value). If an alert condition is satisfied, then an alert may be provided to one or more users (e.g., users of client computers 102-105). In other embodiments, the usage of the machine may be limited based on ID Tag or sensor data. MCSC 110 may perform predictive analysis on ID Tag data to determine a machine type. MCSC 110 may perform predictive analysis on sensor data to determine patterns in the sensor data to predict component failures. In some embodiments, the predictive analysis may be performed based on ID Tag and sensor data from a plurality of separate machines (which may or may not be operated by a same customer). Any of the analyses provided by MCSC 110 may incorporate geo-data to inform such predictions. The geo-data may be provided by GPS transceivers included in the machine, in the components, in the collection computer 110, the MCSC 110, and of the client devices 102-105, or the like.

Figure 3:
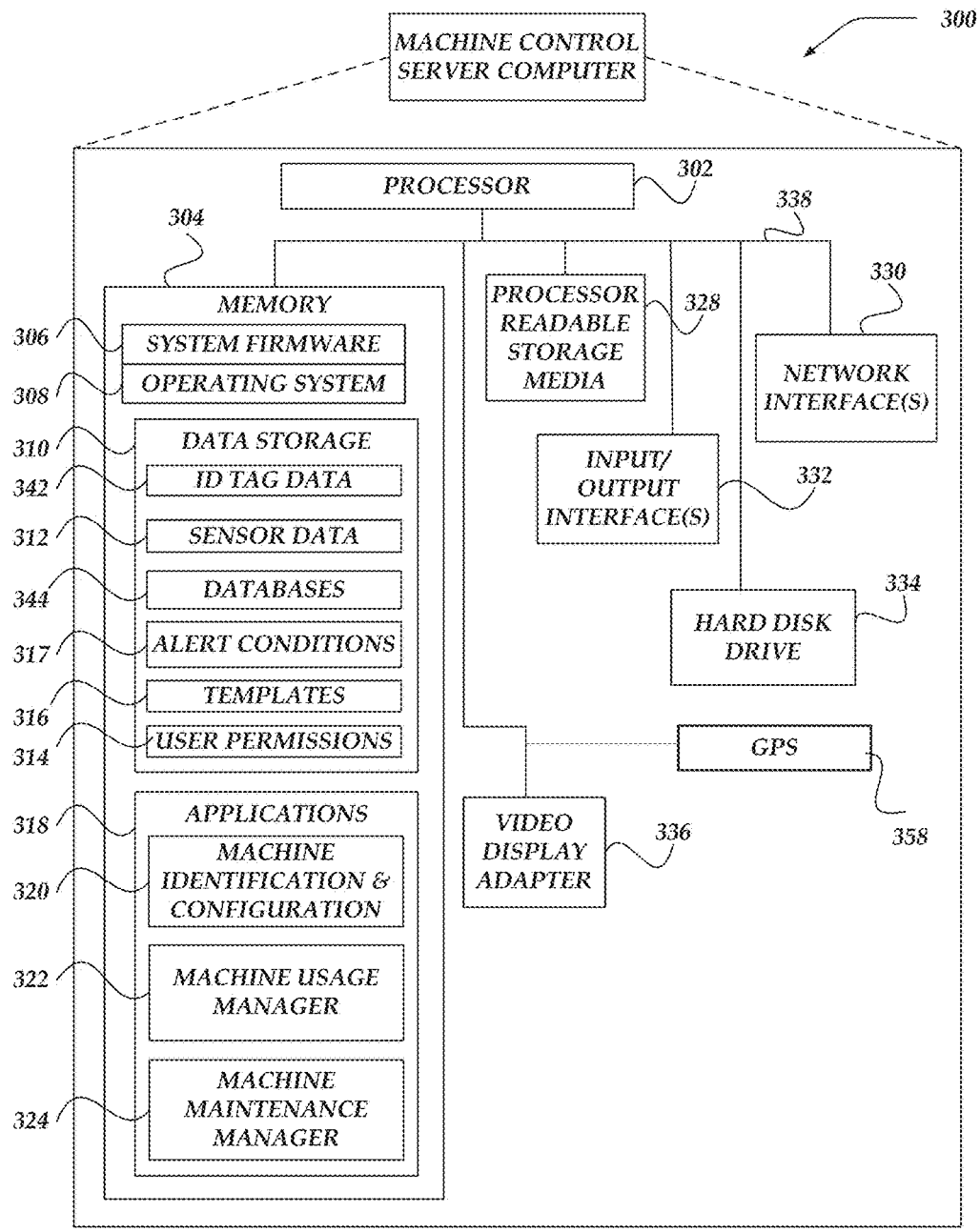
FIG. 3 illustrates an embodiment of a server computer that may be included in a system such as that shown in FIG. 1.

Various embodiments of the user community server computer 120 and component manufacturer and supplier server computer 130 may be implemented on a server computer, including but not limited to a server computer similar to machine control server computer 300 of FIG. 3. User community server computer (UCSC) 120 may receive, provide, manage, integrate, and collect various user or crowd-sourced or social network data as discussed throughout. For instance, UCSC 110 may receive, manage, and provide the user community data of user community database 728 of FIG. 7. Furthermore, UCSC 120 may generate, update, and manage any of the predictive analyses or crowd-sourced or social network heuristics discussed herein.

Component Manufacturer and supplier server computer (CMSSC) 140 may receive, provide, manage, integrate, and collect data originating from machine and component suppliers, vendors, and manufacturers, including but not limited to component specification and reliability data. CMSSC 140 may receive, provide, manage, integrate, aggregate, and collect marketplace or electronic commerce (e-commerce) data. As such, CMSSC 140 may provide and receive data from any of the databases included in system database 702 of FIG. 7, such as component specification database 714, component reliability database 720, marketplace database 726, and the like.

In some embodiments, collection computer 112 is a collection server computer. Various embodiments of collection computers are described in more detail below in conjunction with collection server computer 400 of FIG. 4. Briefly, in some embodiments, collection computer 112 may monitor and/or collect sensor data from one or more sensors 114. Collection computer 112 also collects ID Tag data from one or more ID Tags 116. In some embodiments, collection computer 112 may store at least some of the ID Tag and sensor data locally on collection computer 112. In other embodiments, collection computer 112 may transmit at least some of the ID Tag and sensor data to MCSC 110. In various embodiments, the data that is collected, stored, and/or transmitted may be configured by a user of client computers 102-105 and/or a user of MCSC 110. In some embodiments, collection computer 112 may monitor the sensor data to determine if an alert condition is satisfied, and may provide one or more alerts to one or more users based on the alert condition. In other embodiments, collection computer 112 may perform any of the predictive analyses, such as those based ID Tag and sensor data to predict machine type, machine configurations, component failures, and the like, similar to that of MCSC 110.

In some embodiments, the ID Tag or sensor data collected by collection computer 112 may be based on a list of ID Tags and sensors in communication with the collection computer 112. In at least one of various embodiments, this list may be determined/defined by a user. In another embodiment, the list of ID Tags and sensors may include a plurality of ID Tags and sensors that are automatically detected and provide real-time data regarding at least one characteristic of a machine. The list of ID Tags and sensors that are currently providing real-time data may be dynamically updated based on each new ID Tag and/or sensor currently providing real-time data and each existing ID Tag and/or sensor currently disabled from providing real-time data. So the list of current components and sensors may dynamically change depending on components and sensors being disabled or enabled to communicate with the collection computer 112.

Sensors 114 may include one or more sensors in communication with one or more collection computers 112. In some embodiments, sensors 114 may communicate with a collection computer 112 through a CAN, ADN, NMEA 2000, or other type of network connection (e.g., USB, Bluetooth, or the like). Sensors 114 may monitor and/or measure any of a variety of different system aspects and/or characteristics (e.g., mechanical, hydraulic, or electrical) of a machine or other equipment. These sensors may be directly mounted and/or integrated into one or more components of the machine.

ID Tags 116 may include one or more ID Tags in communication with one or more collection computers 112. ID Tags 116 may be interrogated via a scanning device, or some other specialized hardware. In some embodiments, at least the ID Tags 116 or the interrogation hardware may communicate with a collection computer 112 through a CAN, ADN, NMEA 2000, or other type of network connection (e.g., USB, Bluetooth, or the like). ID Tags 116 may include embedded or otherwise stored digital information that uniquely identifies the associated component included in a machine or other equipment. At least a portion of the ID Tags 116 may be directly mounted and/or integrated into one or more components of the machine.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including client computers 102-105, collection computers 112, MCSC 110, or the like. In at least one of various embodiments, sensors 114 may be coupled to network computers via network 108, which is not illustrated in FIG. 1. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computer 103-105 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between client computers 102-105, MCSC 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Client Computer

Figure 2:
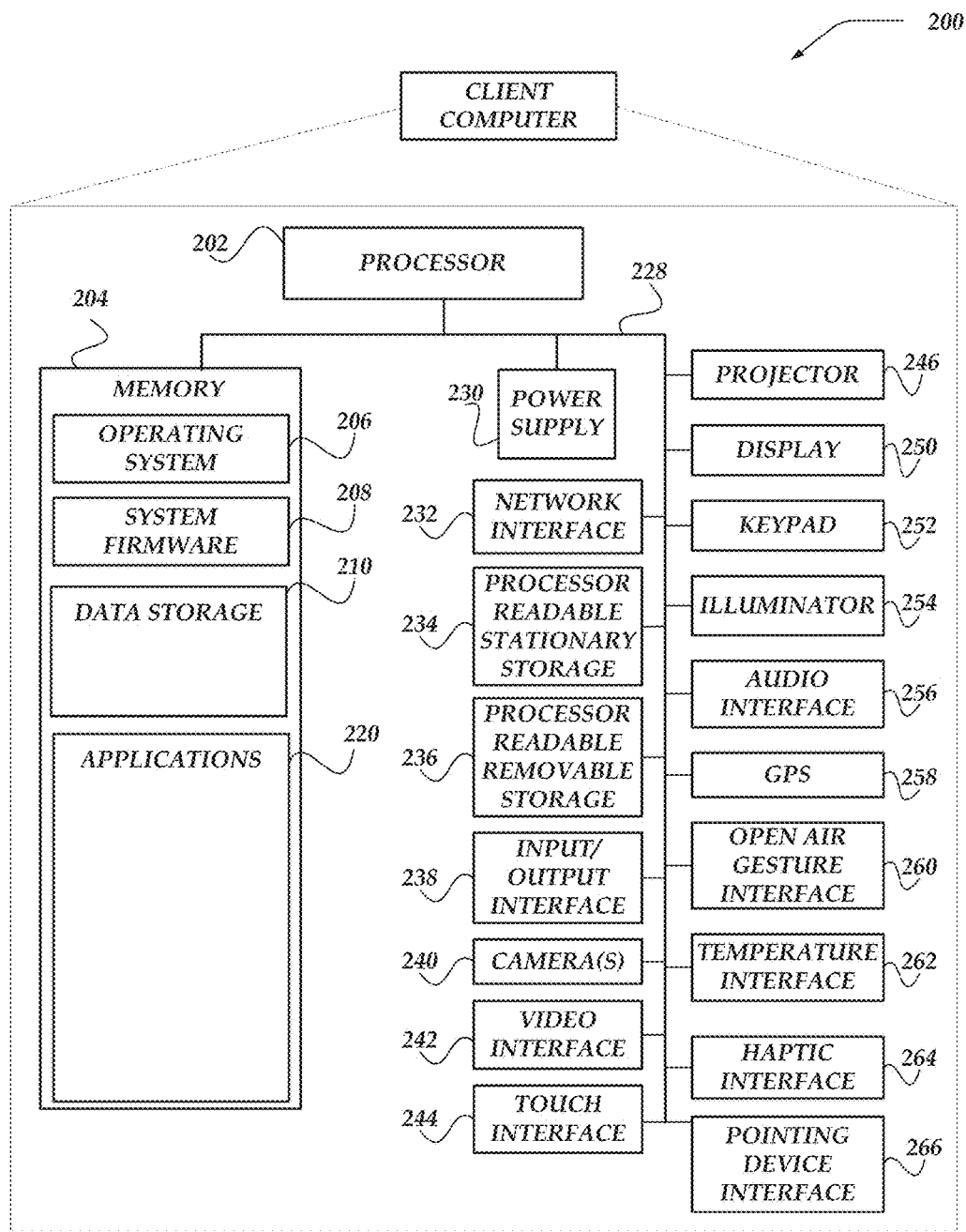
FIG. 2 shows an embodiment of a client computer that may be included in a system such as that shown in FIG. 1.

FIG. 2 shows one embodiment of client 200 that may include many more or less components than those shown. Client computer 200 may represent, for example, at least one embodiment of client computers 102-105 shown in FIG. 1. So, client computer 200 may be a mobile device (e.g., a smart phone or tablet), a stationary/desktop computer, or the like.

Client computer 200 may include processor 202, such as a central processing unit (CPU), in communication with memory 204 via bus 228. Client computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Client computer 200 may optionally communicate with a base station (not shown), or directly with another computer. And in one embodiment, although not shown, an accelerometer or gyroscope may be employed within client computer 200 to measuring and/or maintaining an orientation of client computer 200.

Additionally, in one or more embodiments (not shown in the figures), the client device may include an embedded logic hardware device instead of a CPU. The embedded logic hardware device would directly execute it's embedded logic to perform actions, e.g., an Application Specific Integrated Circuit (ASIC), Field Programmable Gate Array (FPGA), and the like.

Also, in one or more embodiments (not shown in the figures), the client device may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Client computer 200 may also comprise input/output interface 238 for communicating with external peripheral devices or other computers such as other mobile computers and network computers. Input/output interface 238 may enable client computer 200 to communicate with one or more servers, such as MCSC 110 of FIG. 1. In some embodiments, input/output interface 238 may enable client computer 200 to connect and communicate with one or more collection computers, such as collection computers 112 of FIG. 1. Other peripheral devices that client computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a client computer. For example, the haptic interface 264 may be employed to vibrate client computer 200 in a particular way when another user of a computer is calling. Temperature interface 262 may be used to provide a temperature measurement input and/or a temperature changing output to a user of client computer 200.

Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 200 on the surface of the Earth. It is understood that under different conditions, GPS transceiver 258 can determine a physical location for mobile device 200. In at least one embodiment, however, client computer 200 may, through other components, provide other information that may be employed to determine a physical location of the mobile computer, including for example, a Media Access Control (MAC) address, IP address, and the like. In at least one embodiment, GPS transceiver 258 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of client computer 200.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view sensor data. In at least one of various embodiments, the browser may enable a user to view reports of sensor data that is stored by MCSC 110 of FIG. 1. In some embodiments, the browser/user interface may enable the user to customize a view of the report, such as which ID Tag or sensor data is displayed, what types of graphics or information may be displayed, or the like. As described herein, the extent to which a user can customize the reports may depend on permissions/restrictions for that particular user.

In various embodiments, the user interface may present the user with one or more initial templates for viewing the ID Tag or sensor data. In some embodiments, the templates may include gauges, graphs, maps, charts, or other visualizations that can be used to visually represent sensor data. In some embodiments, the template may include a list of sensors, component types, ID Tags, and the like that are available for which the user can view corresponding data. This corresponding data may be current real-time sensor data (e.g., by employing a real-time gauge) and/or historic data (e.g., by using a line graph). In some embodiments, the user may be enabled to select from a component or sensor list which components or sensors to include in the template/report. In other embodiments, the ID Tags and sensors may be initially selected based on the machine that is being monitored, the type of sensors being used, or the like.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of client computer 200. The memory may also store operating system 206 for controlling the operation of client computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the mobile device.

Applications 220 may include computer executable instructions which, when executed by client computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, client computer 200 may be enabled to employ various embodiments, combinations of embodiments, processes, or parts of processes, as described herein.

Illustrative Server Computer

FIG. 3 shows one embodiment of a machine control server computer (MCSC) 300, according to one embodiment of the invention. MCSC 300 may include many more or less components than those shown. The components shown, however, are sufficient to disclose an illustrative embodiment for practicing the invention. MCSC 300 may represent, for example MCSC 110 of FIG. 1. Other network computer devices included in platform 140 of FIG. 1, including but not limited to UCSC 120 and CMSSC 130, may be implemented on a server computer similar to MCSC 300. MCSC 300 may be a server computer, a server device, or simply a server.

MCSC 300 may include processor 302, such as a CPU, processor readable storage media 328, network interface unit 330, an input/output interface 332, hard disk drive 334, video display adapter 336, and memory 304, all in communication with each other via bus 338. In some embodiments, processor 302 may include one or more central processing units.

Additionally, in one or more embodiments (not shown in the figures), the computing device may include an embedded logic hardware device instead of a CPU. The embedded logic hardware device would directly execute it's embedded logic to perform actions, e.g., an Application Specific Integrated Circuit (ASIC), Field Programmable Gate Array (FPGA), and the like.

Also, in one or more embodiments (not shown in the figures), the computing device may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

As illustrated in FIG. 3, MCSC 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

MCSC 300 also comprises input/output interface 332 for communicating with external devices, such as a keyboard or other input or output devices not shown in FIG. 3. Input/output interface 332 can utilize one or more communication technologies, such as USB, infrared, Bluetooth™, or the like.

GPS transceiver 358 can determine the physical coordinates of MCSC 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of MCSC 300 on the surface of the Earth. It is understood that under different conditions, GPS transceiver 358 can determine a physical location for server computer 200. In at least one embodiment, however, MCSC 300 may, through other components, provide other information that may be employed to determine a physical location of the mobile computer, including for example, a Media Access Control (MAC) address, IP address, and the like. In at least one embodiment, GPS transceiver 358 is employed for localization of the various embodiments discussed herein. For instance, the various embodiments may be localized, via GPS transceiver 358, to customize the linguistics, technical parameters, time zones, configuration parameters, units of measurement, monetary units, and the like based on the location of MCSC 300.

Memory 304 generally includes RAM, ROM and one or more permanent mass storage devices, such as hard disk drive 334, tape drive, optical drive, and/or floppy disk drive. Memory 304 stores operating system 308 for controlling the operation of MCSC 300. Any general-purpose operating system may be employed. System firmware 306 is also provided for controlling the low-level operation of MCSC 300 (e.g., BIOS).

Although illustrated separately, memory 304 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by MCSC 300 to store, among other things, applications 318 and/or other data. For example, data storage 310 may also be employed to store information that describes various capabilities of MCSC 300. The information may then be provided to another device based on any of a variety of events, including being sent as part of a header during a communication, sent upon request, or the like.

Data storage 310 may also include a database, text, spreadsheet, folder, file, or the like, that may be configured to maintain and store user account identifiers, user profiles, email addresses, IM addresses, and/or other network addresses; or the like. Data storage 310 may further include program code, data, algorithms, and the like, for use by a processor, such as processor 302 to execute and perform actions. In one embodiment, at least some of data store 310 might also be stored on another component of MCSC 300, including, but not limited to processor-readable storage media 328, hard disk drive 334, or the like.

Data storage 310 may include sensor data 312, user permissions 314, templates 316, ID Tag data 342, databases 344, and/or alert conditions 317. In some embodiments, this information (sensor data 312, ID Tag data 342, databases 344, user permissions 314, templates 316, and alert conditions 317) may be stored on a same server computer or on a plurality of separate server computers.

Sensor data 312 may include one or more databases for sensor data that has been collected from a collection computer (e.g., collection computers 112) to MCSC 300. In various embodiments, a separate database may be maintained for each separate collection computer. In some embodiments, sensor data 312 may be transmitted from a collection computer to the server computer via a wired or wireless connection. In other embodiments, sensor data 312 may be provided to MCSC 300 via a client computer, such as client computer 200. For example, a collection computer may not have a wireless connection (e.g., if it is out of range of a cellular network tower). A user may take a client computer to the site of the collection computer and upload the sensor data from the collection computer to the client computer (e.g., using a USB connection, accessing an SD card employed by the collection computer, or the like). The user can then upload the sensor data from the client computer to the server computer.

ID Tag data 314 may include one or more databases for ID Tag data that has been collected from a collection computer (e.g., collection computers 112) to MCSC 300. In various embodiments, a separate database may be maintained for each separate collection computer. In some embodiments, ID Tag data 314 may be transmitted from a collection computer to the server computer via a wired or wireless connection. In other embodiments, ID Tag data 314 may be provided to MCSC 300 via a client computer, such as client computer 200. For example, a collection computer may not have a wireless connection (e.g., if it is out of range of a cellular network tower). A user may take a client computer to the site of the collection computer and upload the ID Tag data from the collection computer to the client computer (e.g., using a USB connection, accessing an SD card employed by the collection computer, or the like). The user can then upload the ID Tag data from the client computer to the server computer.

User permissions 314 may include one or more permissions for each of one or more users. Each permission may indicate how much customization a user is authorized to perform. For example, the permissions may indicate if and how a user can customize a collection computer, such as, for example, if a user can select which ID Tag or sensor data to collect, which ID Tag or sensor data to store locally to a collection computer, which ID Tag or sensor data to store remotely at a server computer. The permissions may also indicate if and how a user can customize ID Tag or sensor data reports and/or templates. In some embodiments, a user may be authorized to view data from only a subset of a plurality of ID Tags or sensors. In other embodiments, the user may be authorized to view the data, but may not modify the templates for displaying ID Tag or sensor data reports. In some other embodiments, the user permissions may indicate if a user can provide alert conditions and/or when a user can receive alerts based on alert conditions be satisfied.

Templates 316 may include one or more templates that can be employed for generating a configuring, monitoring, or maintenance report that displays ID Tag and sensor data to a user. In some embodiments, templates may be premade, such as by an administrator. In other embodiments, templates may be automatically generated based on a type of machine and/or component being monitored by the sensors. In yet other embodiments, the templates may be automatically generated based on the ID Tags or sensors that are currently providing real-time data. In various embodiments, at least some of the templates may be customizable by a user. The user may be enabled to manipulate which ID Tag or sensor data (e.g., by selected a sensor from a list of available sensors having previously provided data) is displayed in gauges, maps, charts, graphs or other visualization.

Alert conditions 317 may store one or more alert conditions. Each alert condition may include one or more conditions that need to be satisfied before an alert is sent to a user. Each alert condition may also include a list of one or more users to provide the alert to. Along with each user, a type of alert may also be stored. In this way, users may be provided customized alerts for each alert condition. As described herein, the conditions may be for one or more ID Tags, sensors, single events (e.g., spikes in values, values exceeding a threshold, or the like), multiple events, patterns, or the like.

Databases 344 may include various databases, such as but not limited to collection computer databases, component specification databases, machine databases, machine usage databases, component reliability databases, user databases, maintenance databases, marketplace databases, user community databases, and the like. Furthermore, at least a portion of the above discussed ID Tag and sensor databases may be included in databases 344.

Applications 318 may include computer executable instructions, which may be loaded into mass memory and run on operating system 308. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth.

Applications 318 may include machine identification and configuration manager 320. Machine identification and configuration manager 320 may be operative to automatically identify and configure a machine based on at least one of ID Tag data 342, sensor data 312, or one or more databases found in databases 344, as discussed further below.

Applications 318 may also include machine usage manager 322. Machine usage manager 322 may be operative to monitor and manage the usage of a machine based on at least one of ID Tag data 342, sensor data 312, or one or more databases found in databases 344, as discussed further below.

Applications 318 may include machine maintenance manager 324. Machine maintenance manager 324 may be operative to automatically manage the maintenance of a machine based on at least one of ID Tag data 342, sensor data 312, or one or more databases found in databases 344, as discussed further below.

Any of the manager applications 320, 322, and 324 may perform actions by actively managing a managing computer, such as collection computer 112 of FIG. 1. In some embodiments, manager application 320/322/324 may provision new databases if new collection computer logs into MCSC 300. Manager applications 320/322/324 may also be operative to manage the intake of ID Tag or sensor data, such as by adding received ID Tag or sensor data to a database that corresponds to the collection computer that collected the ID Tag or sensor data. In some embodiments, if a collection computer begins to collect ID Tag or sensor data from a previously unknown ID Tag or sensor, at least one of the manager applications 320/322/324 may be enabled to assign a new column within a database table for the collection computer for ID Tag or sensor data obtained by the new ID Tag or sensor.

In some embodiments, at least one of the manager applications 320/322/324 may be operative to provide instructions to a collection computer indicating which ID Tags and sensors the collection computer should collect data from, store data locally at the collection computer, and/or transmit data to the server computer or remote storage at the server computer. In some embodiments, these instructions may also indicate how often the collection computer is to collect, store, and/or transmit data. In various embodiments, manager applications 320/322/324 may include a user interface where a user may be enabled to provide this information.

At least one of the manager applications 320/322/324 may be operative to enable a user to customize reports of ID Tag data 243, sensor data 312, databases 344, and the like based on permissions 314 associated with the user. In various embodiments, manager applications 320/322/324 may enable a user to log into an account and access a user interface where they can select ID Tags, sensors, gauges, graphs, or the like, which can be employed to generate a customized report that can be displayed to the user. In various embodiments, application managers 320/322/324 may determine, generate, and/or maintain templates 316.

The manager applications 320/322/324 may be operative to perform predictive analyses bases on ID Tag data 342, sensor data 314, databases 344 and the like. For instance machine maintenance user 324 may be operative to analyze ID Tag and sensor data collected by one or more collection computers (e.g., collection computers 112 of FIG. 1), as well as information provided by databases, such as a component reliability database to determine one or more patterns associated with component failures. In some embodiments manager applications 320/322/324 may employ ID Tag and sensor data from one or more machines. In various embodiments, these machines may be from different customers/users, located in similar or different geographical regions/environments, used for similar or different purposes, or the like.

Manager applications 320/322/324 may be operative to determine and/or generate alerts based on alert conditions. For instance, if an alert condition is satisfied, machine usage manager 322 may generate and provide an alert to one or more users based on the alert condition. In some embodiments, manager applications 320/322/324 may employ predictive alert conditions, which may be determined based on the patterns determined by predictive analyzer instantiated in one or more of the manager applications 320/322/324.

So, in some embodiments, MCSC 300 may be enabled to employ various embodiments, combinations of embodiments, processes, or parts of processes, as described herein.

Illustrative Collection Computer

Figure 4:
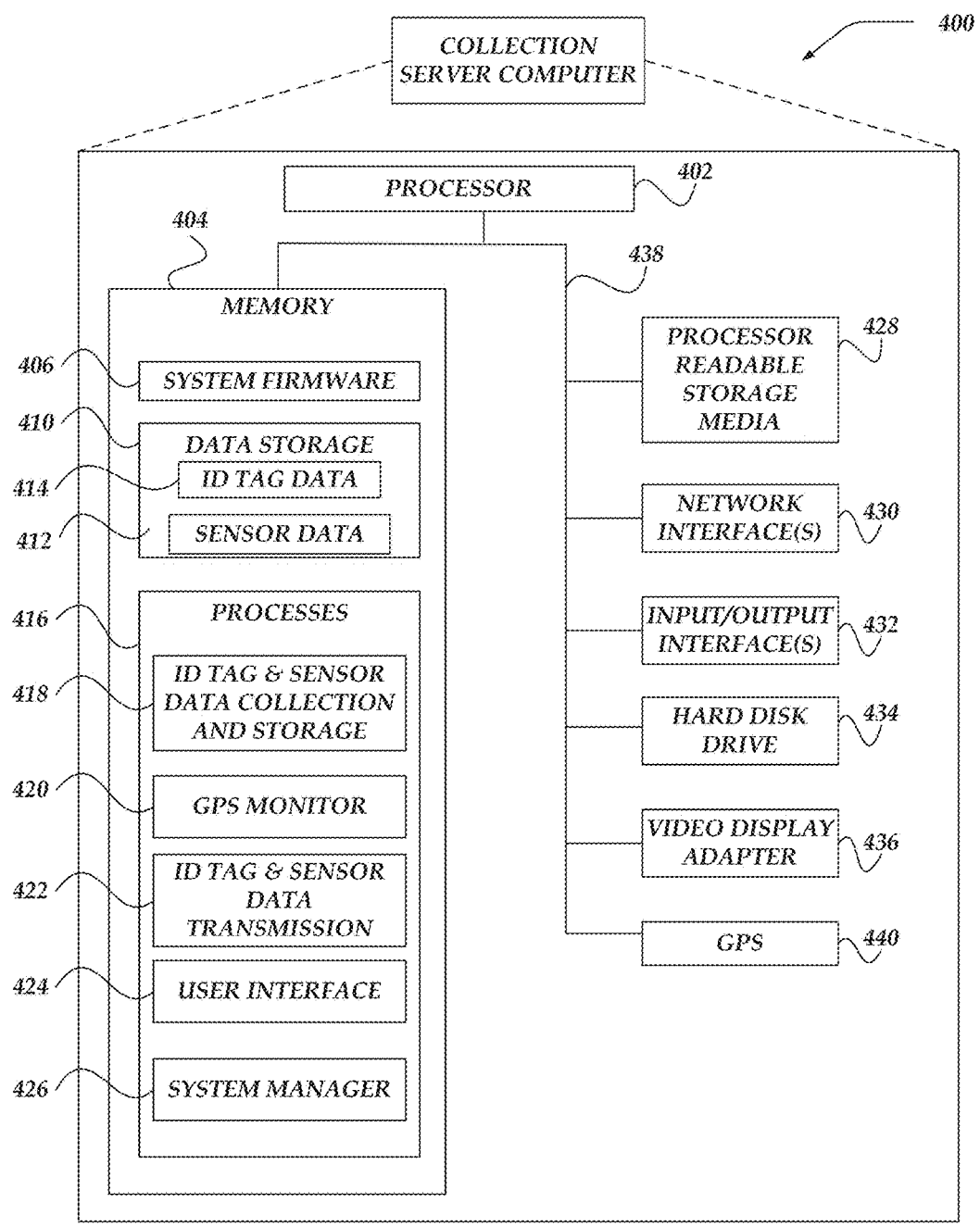
FIG. 4 illustrates an embodiment of a collection computer that may be included in a system such as that shown in FIG. 1.

FIG. 4 shows one embodiment of collection server computer 400, according to one embodiment of the invention. Collection server computer 400 may include many more or less components than those shown. The components shown, however, are sufficient to disclose an illustrative embodiment for practicing the invention. Collection server computer 400 may represent, for example, one of collection computers 112 of FIG. 1. Thus, collection server computer 400 may be a collection computer.

Collection server computer 400 may include processor 402, such as a CPU, processor readable storage media 428, network interface unit 430, an input/output interface 432, hard disk drive 434, video display adapter 436, GPS transceiver 440, and memory 404, all in communication with each other via bus 438. In some embodiments, processor 402 may include one or more central processing units.

GPS transceiver 440 can determine the physical coordinates of collection server computer 400 on the surface of the Earth, which typically outputs a location as latitude and longitude values. Physical coordinates of a collection server computer 400 that includes a GPS transceiver 440 may be referred to as geo-location data. GPS transceiver 440 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of collection server computer 400 on the surface of the Earth. It is understood that under different conditions, GPS transceiver 440 can determine a physical location for collection server computer 200. In at least one embodiment, however, collection server computer 400 may, through other components, provide other information that may be employed to determine a physical location of the collection server computer 400, including for example, a Media Access Control (MAC) address, IP address, and the like. In at least one embodiment, GPS transceiver 440 is employed for localization of the various embodiments discussed herein. For instance, the various embodiments may be localized, via GPS transceiver 440, to customize the linguistics, technical parameters, time zones, configuration parameters, units of measurement, monetary units, and the like based on the location of the collection server computer 400.

Additionally, in one or more embodiments (not shown in the figures), the collection computer may include an embedded logic hardware device instead of a CPU. The embedded logic hardware device would directly execute it's embedded logic to perform actions, e.g., an Application Specific Integrated Circuit (ASIC), Field Programmable Gate Array (FPGA), and the like.

Also, in one or more embodiments (not shown in the figures), the collection computer may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

As illustrated in FIG. 4, collection server computer 400 also can communicate with the Internet, cellular networks, or some other communications network (either wired or wireless), via network interface unit 430, which is constructed for use with various communication protocols. Network interface unit 430 is sometimes known as a transceiver, transceiving device, or network interface card (NIC). In some embodiments, collection server computer 400 may communicate with a server computer, such as MCSC 110 of FIG. 1; sensors, such as sensors 112 of FIG. 1; and/or client computers, such as client computers 102-105 of FIG. 1, via the network interface unit 420.

Collection server computer 400 also comprises input/output interface 432 for communicating with external devices, such as a various sensors or other input or output devices not shown in FIG. 4. Input/output interface 432 can utilize one or more communication technologies, such as USB, infrared, Bluetooth™, or the like.

Memory 404 generally includes RAM, ROM and one or more permanent mass storage devices, such as hard disk drive 434, tape drive, optical drive, and/or floppy disk drive. Memory 404 may store system firmware 406 for controlling the low-level operation of collection server computer 400 (e.g., BIOS). In some embodiments, memory 404 may also store an operating system for controlling the operation of collection server computer 400.

Although illustrated separately, memory 404 may include processor readable storage media 428. Processor readable storage media 428 may be referred to and/or include computer readable media, computer readable storage media, and/or processor readable storage device. Processor readable storage media 428 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 404 further includes one or more data storage 410, which can be utilized by collection server computer 400 to store, among other things, sensor data 412, processes 416, and/or other data. For example, data storage 410 may further include program code, data, algorithms, and the like, for use by a processor, such as processor 402 to execute and perform actions. In one embodiment, at least some of data storage 410 might also be stored on another component of collection server computer 400, including, but not limited to processor-readable storage media 428, hard disk drive 434, or the like.

Sensor data 412 may include data that is collected from one or more sensors. In various embodiments, sensor data 412 may store sensor data until it is successfully transmitted to a server, such as MCSC 110 of FIG. 1; until it is deleted by a user (e.g., if the user transfers all the sensor data from the collection computer to a client computer (e.g., client computers 102-105 of FIG. 1)); or the like.

Likewise, ID Tag data 414 may include data that is collected from one or more ID Tags. In various embodiments, ID Tag data 414 may store ID Tag data until it is successfully transmitted to a server, such as MCSC 110 of FIG. 1; until it is deleted by a user (e.g., if the user transfers all the sensor data from the collection computer to a client computer (e.g., client computers 102-105 of FIG. 1)); or the like.

Processes 416 may include computer executable instructions that can execute on processor 402 to perform actions. In some embodiments, one or more of processes 416 may be part of an application that may be loaded into mass memory and run on an operating system Processes 416 may include ID Tag and sensor data collection and storage 418, GPS monitor 420, ID Tag and sensor data transmission 422, user interface 424, and system manager 426.

ID Tag and sensor data collection and storage 418 may manage the collection/intake of data from one or more ID Tags or sensors and may manage the local storage/logging of the collected ID Tag and sensor data at the collection computer. As described herein, a user may customize the collection computer such that it may or may not collect data from each ID Tag and sensor that it is in communication with. In some embodiments, ID Tag and sensor data collection and storage 418 may manage the sampling rate of one or more sensors, which may be selected by the user or automatically determined. ID Tag and sensor data collection and storage 418 may manage the collection of ID Tag and sensor data based on the user customizations.

GPS monitor 420 may monitor GPS transceiver 440 for changes and may report changes to a user. In this way a user can track the movement of the equipment or machine that is being monitored by the sensors/collection computer. Changes in the GPS location can be employed to help determine if someone is attempting to steal the equipment, such as if the equipment is not to be removed from a jobsite.

ID Tag and sensor data transmission 422 may manage the transmission of ID Tag and sensor data to a server, such as MCSC 110 of FIG. 1. As described herein, a user may customize a collection computer such that it may transmit some or all collected data to the server for remote storage by the server. The user may also be enabled to customize how often or when data may be transmitted to the server, which may be managed by Id Tag and sensor data transmission 422. If the collection computer is unable to transmit sensor data to the server (e.g., if the collection computer does not have a network connection), then ID Tag and sensor data transmission 422 may wait to begin transmission once the collection computer is again able to transmit data (e.g., if the network connection is restored). In some embodiments, ID Tag and sensor data transmission 422 manage the buffering of ID Tag or sensor data (e.g., in a queue) so that when a network connection is restored, the buffered data may be transmitted to the server.

User interface 424 may enable the user to provide the collection, storage, and transmission customizations described herein. In some embodiments, user interface 424 may enable a user to view to collected data in real-time or near-real time with the collection computer.

System manager 426 may provide other functionality to the collection server computer 400. For example, system manager 426 may provide power management to the collection computer. In some embodiments, system manager 426 may be enabled to put the collection computer into a power saving mode when sensors are not being monitored, the equipment/machinery being monitored is shut off, or the like. System manager 426 may be enabled to "wake up" from this power saving mode based on a variety of watchdog conditions. For example, if the GPS or an accelerometer detects a change, then the system may wake up and transmit its location to the server.

So, in some embodiments, collection server computer 400 may be enabled to employ various embodiments, combinations of embodiments, processes, or parts of processes, as described herein. Moreover, in various embodiments, collection server computer 400 may be enabled to employ various embodiments described above in conjunction with MCSC 300 of FIG. 3.

System Overview

Figure 5:
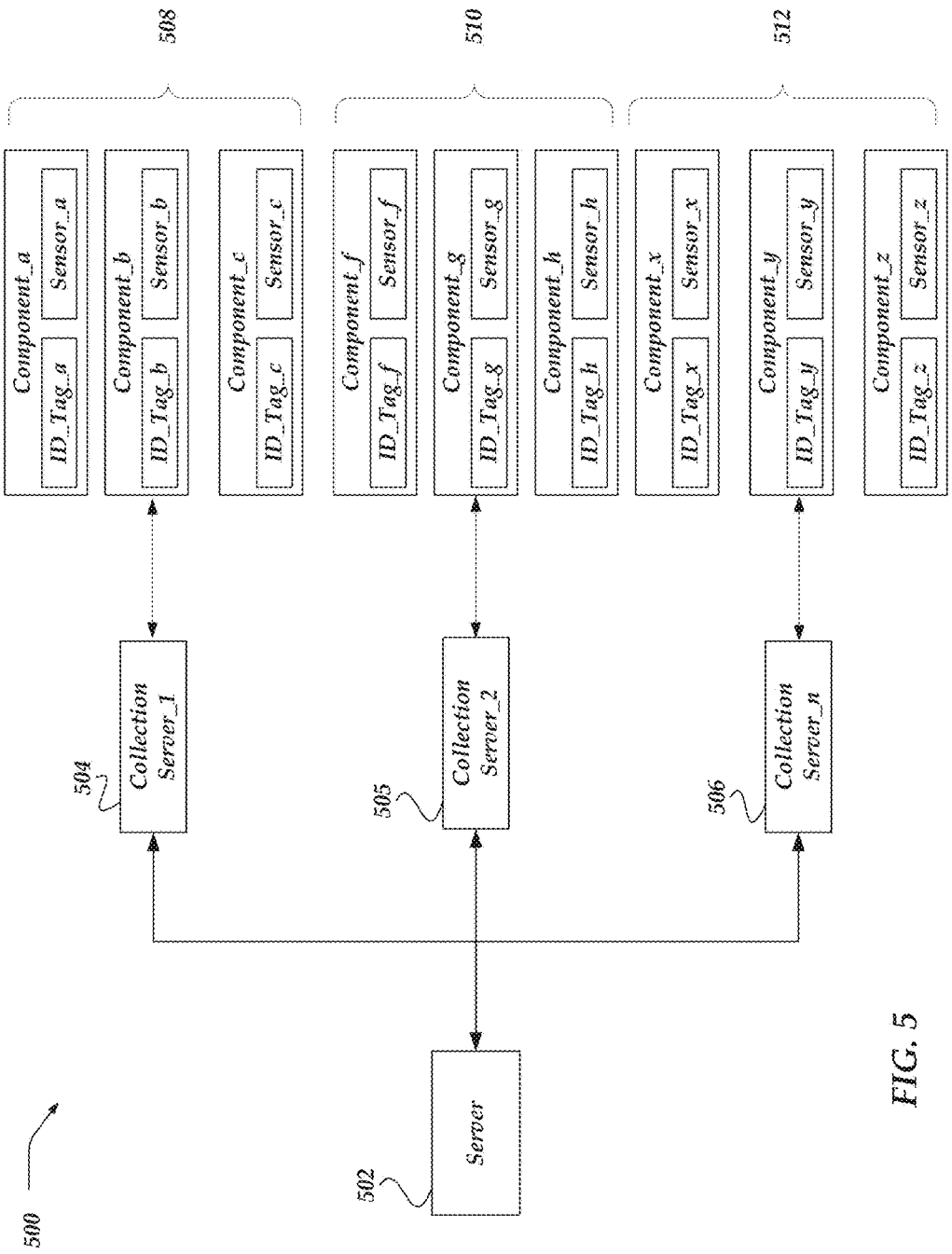
FIG. 5 illustrates an embodiment of a system diagram of collection computers in communication with a plurality component collections, via ID Tags and sensors, as well as a server computer.

FIG. 5 illustrates an embodiment of a system diagram of collection computers in communication with a plurality component collections, via ID Tags and sensors, as well as a server computer. System 500 may include server 502 and collection servers 504-506. Server 502 may be an embodiment of MCSC 110 of FIG. 1 or an embodiment of MCSC 300 of FIG. 3. Collection servers 504-506 may embodiments, of collection computers 112 of FIG. 1 or collection server computer 400 of FIG. 4.

One or more collection servers 504-506 may be in communication with server 502. Collection servers 504-506 may provide information regarding machine components based of ID Tag data and sensor data to server 502. The provided information may further be based on various user customizations. Each collection computer may be connected to or in communication with one or more ID Tags and sensors that are associated with various components. For example, collection server 504 may be in communication with component collection 508 that includes at least component_a, component_b, and component_c. Likewise, collection server 505 may be in communication with component collection 510 that includes at least component_f, component_g, and component_h. Collection server 506 may be in communication with component collection 512 that includes at least component_x, component_y, and component_z. As shown in system 500, each of the components includes one or more associated ID Tags and sensors. Each of component collections 508, 510, and 512 may be a separate machine, or the component collections 508, 510, and 512 may be included in a single machine.

More specifically, the collection servers 504, 505, 506 may be in communication directly with one or more of the associated ID tags and/or sensors the components within the component collections 508, 510, 512. The collection servers 504, 505, 506 may communicate with the ID Tags and sensors through a variety of different wired or wireless networks, such as, but not limited to, a CAN. Although system 500 illustrates a plurality of ID Tags and sensors communicating with each collection server 504 505, and 506, embodiments are not so limited, but rather, in some embodiments, a collection computer may be in communication with a ID Tag or a single sensor. Similarly, although not illustrated, some ID Tags and/or sensors may be connected to or communicate with a plurality of collection computers.

Figure 6:
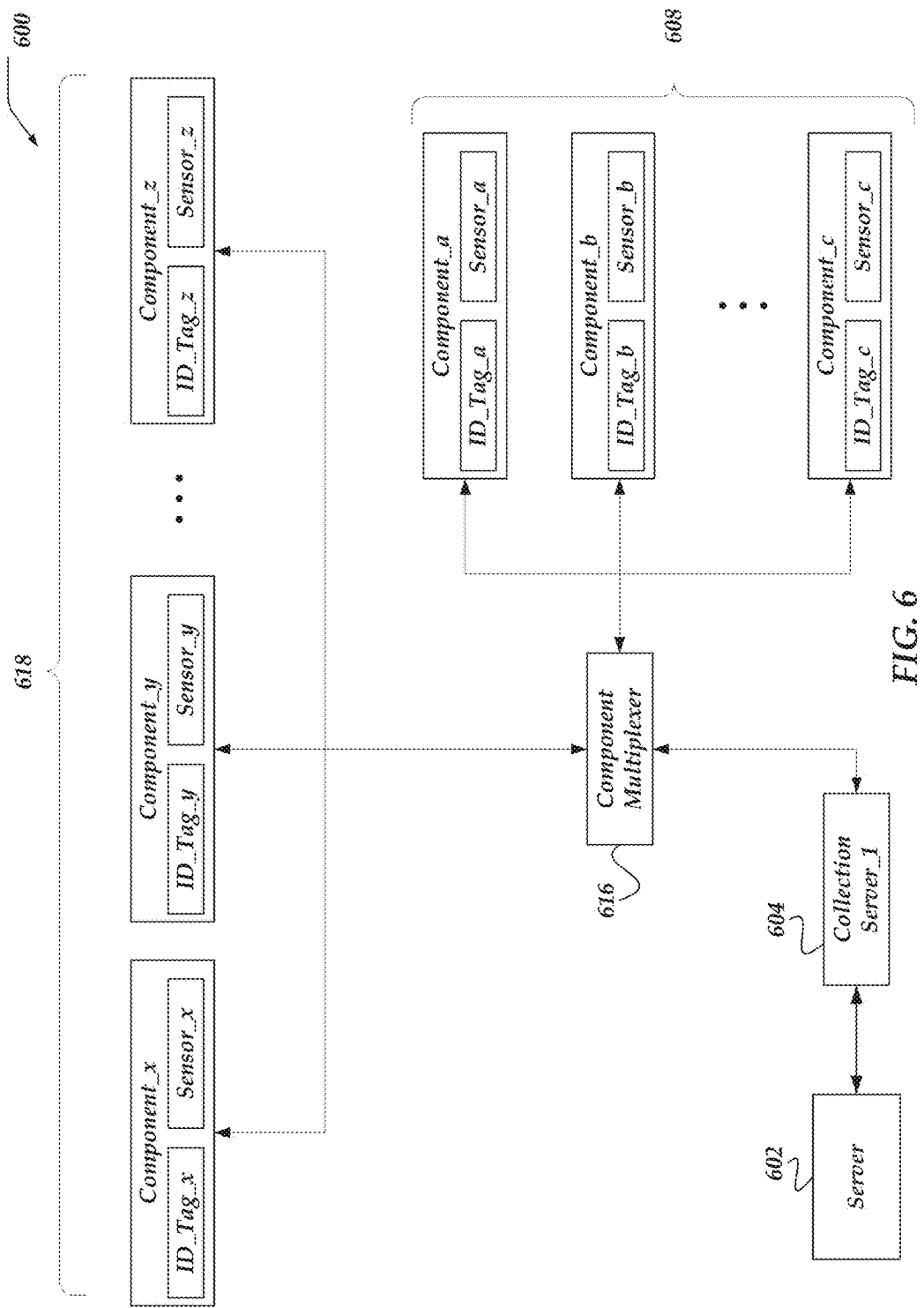
FIG. 6 illustrates an embodiment of a system diagram of a collection computer in communication with a plurality of component collections, via ID Tags and sensors associated with individual components within component collections, a component multiplexor, and a server computer.

FIG. 6 illustrates an embodiment of a system diagram of a collection server 604 in communication with a plurality of component collections 608 and 618, via ID Tags and sensors associated with individual components within component collections 608 and 618, a component multiplexor 616, and a server 602. System 600 may be an embodiment of system 500 of FIG. 5. Component multiplexor 616 may be an intermediate device between component collections 608/618 and collection server 604. In some embodiments, sensor multiplexor 616 may be a controller for managing signals provided by ID Tags and sensors associated with the components within component collections 608/618 and converting/packaging the signals/data into messages that can be transmitted across a network, such as a CAN, ADN, or NMEA 2000 network, to collection server 604.

Figure 7:
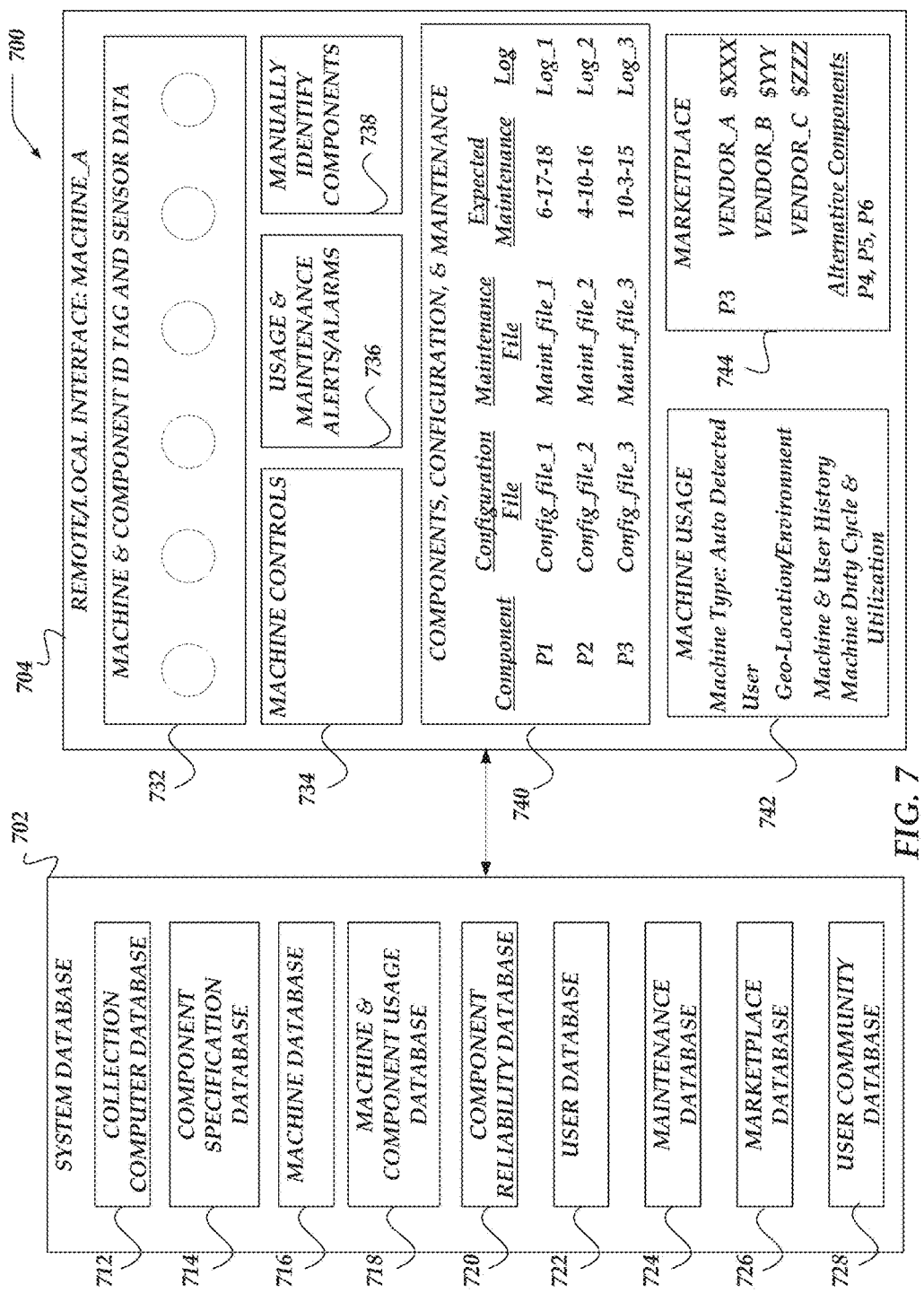
FIG. 7 illustrates an embodiment of a system diagram, where the system is enabled to automatically identify, configure, monitor, control, and maintain a machine, as well as provide user reports and alert conditions regarding the current use, condition, maintenance and other aspects of the machine.

FIG. 7 illustrates an embodiment of a system diagram, where system 700 is enabled to automatically identify, configure, monitor, control, and maintain a machine, as well as provide user reports and alert conditions regarding the current use, condition, maintenance and other aspects of the machine. Furthermore, system 700 may predict the usage of the machine based on the included components, geo-location/environment, previous use, and the like. System 700 may be at least partially implemented combinations of the devices, networks, sensors, ID Tags, and the like shown in systems 100, 500, and 600 of FIGS. 1, 5, and 6 respectively. As shown in FIG. 7, system 700 has identified and configured Machine_A, and is monitoring and managing the usage and maintenance of Machine_A.

System 700 includes a system database 702 and user interface (UI) 704. Furthermore, system 700 is enabled to interrogate, or otherwise receive component identification data from component ID Tags associated with the components included in the machines that system 700 identifies, configures, monitors, and manages. Likewise, system 700 is operative to receive, collect, monitor, store, and manage sensor data from sensors associated with the components within the machines.

In order to identify, configure, monitor, manage, and maintain machines, system 700 performs various predictive analyses based on the ID Tag and sensor data. Furthermore, the predictive analyses of system 700 may be based on information included in the system database 702. For instance, system 700 may identify a machine type based on a self-identification of the components via the component ID Tags based on known combinations of component type included in known machine types, where the mapping between the combination of component types and the corresponding machine type is stored in the system database 702.

System 700 may also predict a machine configuration, an expected machine usage, unsafe operation conditions, an upcoming need to replace and/or maintain a component (maintenance conditions), and the like based on the ID Tag and sensor data, as well as data included in system database 702. System 700 may even determine replacement components options in a marketplace, as well as suggest alternative components, based on availability (local and/or global), price, reliability, user and crowd input, and the like, for a particular machine. In any of these determinations may be based on, or otherwise include, the strategic deployment of various predicative analyses and/or heuristics.

System 700 may employ various statistical models, machine learning networks, heuristics, and the like for the analyses or determinations used to identify, configure, manage, and maintain a system. Furthermore, data stored in system database 702 may be used to train, configure, optimize, generate, and/or adapt statistical models, machine-learning networks, and heuristics.

System database 702 may include a plurality of separate and/or sub-databases. Such databases may include, but are not otherwise limited to a collection computer database 712, a component specification database 714, a machine database 716, a machine and component usage database 718, a component reliability database 720, a user database 722, a maintenance database 724, a marketplace database 726, a user community database 728, and the like.

When identifying, configuring, monitoring, controlling, and maintaining a machine, system 700 is enabled access each of the databases included in the system database 702. For instance, any of a collection computer, server computer, client device, and the like may be provided read and/or write access to each of the databases within system database 702, via a network. The read and/or write access may be based on, or even limited, by user permissions of a user of any such device. Data written to the database may be employed to generate and/or update the various predictive analyses.

In an exemplary embodiment, collection computer database 712 may include a separate database for each collection computer included in system 700. Various system information, such as configuration, logs, and the like for each collection computer may be stored in collection computer database 712. For instance, collection computer database 712 may include entries for each of collection server_1 504, collection server_2 505, and collection server_n 506 of FIG. 5.

Component specification database 714 may include information regarding a plurality of components, some of which may be included in the one or more machines that system 700 is operative to identify, configure, monitor, manage, and maintain. Entries in component specification database 714 may include manufacturer specifications for each component within the database. For instance, component specification database 714 may include the specifications and other relevant information for each of the components shown in FIG. 5, including but not limited to component_a, component_b, component_c, component_f, component_g, component_h, component_x, component_y, component_z, and the like.

Database 714 may include reference/part/component numbers, component type, name, brand, operating parameter ranges/tolerances, and the like. Information regarding the expected, as well as the extreme ranges of component performance and operating conditions are included in component specification database 714. At least a portion of component specification database 714 may be provided directly and/or automatically from the component manufacturer. For instance, database entries may be retrieved from a network accessible database or website maintained by the manufacturer. System 700 may access component specification database 714 to obtain information regarding any of the components that are identified, and are being configured, monitored, managed, or maintained, in real-time.

Machine database 716 includes entries for the various machines that system 700 is operative or enabled to identify, configure, monitor, manage, and maintain. In preferred embodiments, machines are identifiable by combinations of components that are likely included in the particular machine or machine type. Machine database 716 enables system 700 to automatically identify a machine included in machine database 716. When a machine comes online, system 700 reads or otherwise interrogates ID Tags associated with the components included in the machine.

The identifying information provided by ID Tags enables system 700 to identify both the type and specific instance of a machine. The type of machine may be determinable via a predictive analysis of detected combination of the components types within the machine. For instance, the combination of components types included in the machine may be compared to one or more known component types corresponding to machine types within machine database 716.

The predictive analyses may be a statistical analysis that determines a probability, or likelihood, for one or more potential machine types of the identified machine. The multiple potential machine types may be presented to the user, ranked via the determined probabilities. The user may choose, or otherwise confirm the machine type via user interface 704. In other embodiments, the machine type may be determined via a deterministic look-up table within machine database 716. The look-up table maps correlations between specific combinations of component types and specific machine types.

For instance, consider the collection of components 508 of FIG. 5. Collection of components 508 may be included in Machine_A. Machine_A may be a pump. An entry for Machine_A in machine database 716 includes information that indicates that the combination of component_a, component_b, and component_c, within a collection of components likely signals that the machine type of Machine_A is a hydraulic pump. Also, the specific instances of component_a, component_b, and component_c indicates the specific instance of Machine_A is User_X's hydraulic pump identified by Serial No. XYZ. Accordingly, by interrogating the self-identifying components within a component collection 508, system 700 is operative to identify the specific instance of Machine_A, as well as the type of machine (a hydraulic pump), via a query of machine database 716.

The comparison between the identified component type (or specific instances of components) may require an exact match to determine the machine type, i.e. each of ten known component types associated with a machine type must be identified to associate that machine type with the machine being identified. In other embodiments, the strictness for a match is relaxed, and only a threshold number of components must be identified, for instance eight out of ten components must be identified. In still other embodiments, the known component type list may be considered a vector (in this example, the dimensionality of the known vector is 10). The actual component types identified during a powering up of the machine is another vector. If only eight components were identified, the dimensionality of this vector is eight. A comparison between the vectors representing the known combination of component types and the identified component types may be performed. A machine type is matched if and only the distance between vector of known combination component types and identified component types is less than a predetermined threshold.

The first time that system 700 identifies a specific instance of a machine, system 700 may store the combination of identified components within machine database 716 to uniquely define the specific instance of the machine. For instance, the first time that system 700 identifies the specific combination of component_a, component_b, and component_c, system 700 stores an entry for Machine_A in machine database 716. In some embodiments, a user may be prompted to provide additional, and or other information regarding Machine_A, to be stored within machine database 716. For instance, the user may be prompted to confirm the automatically determined or predicted machine type associated with the combination or collection of components. Thus, look-up tables are generated in machine database 716, as system 700 identifies additional machines. Upon next identification of the specific combination of component_a, component_b, and component_c, the need for a predictive analyses for the machine type is not required. The now known (and user confirmed) machine type may be queried in machine database 716 when the specific combination of component_a, component_b, and component_c is self-identified in the future.

Likewise, machine database 716 may include entries for Machine_B and Machine_C that correspond to component collections 510 and 512 of FIG. 5 respectively. Thus, when system 700 identifies the combination component_f, component_g, and component_h, via the corresponding ID Tags, system 700 queries machine database 716, for the identified combination. Thus, system 700 identifies at least the type and/or the specific instance of Machine_B and Machine_C.

Machines may be uniquely identified by the unique and/or specific components identified by interrogating the ID Tags. Thus, machine database 716 may further track which specific instances of machines includes which specific components. Thus, at any point, system 700 includes the knowledge, via machine database 716, of the specific components included in each of the traceable machines. When a component is replaced or switched out for an alternative component, machine database 716 is automatically updated upon the next self-identification process for the machine, to update the machine's entry in database 716 to include the new part. Thus, machine database 716 includes the most up to date information regarding each of the machines.

Machine and component usage database 718 includes stored information regarding the usage of machines that system 700 is operative to identify, configure, monitor, manage, or maintain. Machine and component usage database 718 may include operational specifications or limits of the machine. Machine usage may include information about previous, expected, or nominal usage of a machine or machine type. For instance, the usage may include information about previous or expected machine loads, utilization or duty factors, geo-locations, environments, day/time of use, and the like. Environment information may include temperature, humidity, terrain conditions, elevation, and the like.

Machine and component usage database 718 may include limiting or nominal values for operational parameters of each machine, as well as conditions that would be outside the range for the safe operation of the machine. Machine and component usage database 718 may include correlations between operational parameters. As such, system 700 is operative, via a predictive analyses, to determine an expected machine usage, at least based on a previous machine usage, a manufacturer's machine specification, geo-location/environmental information, and the like, any of which may be included in machine and component usage database 718.

Machine and component usage database 718 may store at least a portion of the telemetry datastream provided by the component ID Tags and/or sensors over a history of machine usage. The stored and/or archived telemetry datastream includes a tag or other such metadata so that the previous or historical usage of a machine and its corresponding components is logged. Thus, in at least one embodiment, previous and/or historical sensor data from the sensors associated with the machine components are stored in machine and component usage database 718.

As such, machine and component usage 718 may include a log or history of the data obtained via the component sensors, regarding the use of the machine, i.e. the telemetry datastream. Such a log may include the total use, duty cycle, number of usage cycles, and the like for at least a portion of the components in a machine that is monitored and managed by system 700.

These logs, archives, or histories of the actual and previous machine usage for machines that have been previously monitored, managed, and maintained may be employed in the heuristics or analyses used to monitor, manager, and maintain the machine in the future. As such, information included in machine and component usage database 718 may be employed to predict an actual or estimated expiration date or lifetime for any component included in the various machines. Machine and component usage database 718 may also include expected or nominal machine usage for specific instance or types of machines that system 700 may monitor and manage in the future.

Component reliability database 720 includes information regarding the reliability of components and component types that may be included in the machines that are configured, monitored, and managed by system 700. By combining or otherwise comparing reliability information included in component reliability database 720 and information regarding the actual usage or history of a component (such as that included in machine and component usage database 718), system 700 may perform a reliability analyses. Such a predictive analysis may determine a date associated with an expected failure of a machine component.

Component reliability database 720 may include reliability information provided by the component manufacturer. At least a portion of the reliability data within reliability database 720 may be crowd-sourced data. For instance, a community of users that have actually used a component may provide reliability data to include within component reliability database. In at least one embodiment, a third party that conducts its own reliability testing on manufactured components may provide reliability data to include in component reliability database 720. A comparison or statistical blending of the reliability data from the various sources (manufacturer, crowd, reliability testing lab, and the like) may be used to increase the accuracy of various maintenance predictive analyses that system 700 is operative to perform. The maintenance predicative analyses may utilize heuristics. The heuristics may be developed with the active assistance of one or more users, or automatically generated and/or updated in view of the various sources of reliability data.

User database 722 includes information regarding users of system 700. Users may include machine operators, individual's within a community that provide information to the various databases, users of server or client devices of system 700, and the like. User database 722 may include user credentials and system permissions associated with each user. User database 722 may include user profiles, histories, and the like. User database 722 may include a history of machine operation for a machine operator user.

For example, user database 722 may include information regarding how a particular machine operator has operated a particular, or class or machines in the past. System 700 is operative to employ such information included in user database 722, in combination with other information, is a predictive analysis to determine an expected machine usage and maintenance requirements, such as expected component failure dates, based on the operator of the machine.

Maintenance database 724 includes information regarding the maintenance history of the machines and machine components. Accordingly, when predicting the maintenance requirements, system 700 may access maintenance database 724 to query when a particular component was last replaced. Furthermore, maintenance database 724 may be automatically updated when system detects a new or replace self-identified component within the machine.

Marketplace database 726 includes marketplace data for the maintenance, replacement components, alternative components, and the like. As discussed throughout, marketplace database 726 may include the aggregation of online or e-commerce data. Marketplace or e-commerce data may be provided (automatically or manually) by various sources, including vendors, suppliers, buyer, sellers, online auctioneers, and the like.

User community database 728 may include additional data regarding machine and machine components usages, reliabilities, availability, and the like. User community database 728 may include crowd-sourced data. In various embodiments, a system user (such as a user of a server device or a machine operator) may be a member of one or more social networks. Based on various user permissions, members of these social networks may contribute information to the user community database. Additionally and/or alternatively, various embodiments include a machine user network. Members of the machine network are users of the machines and systems, however they may be unknown to a current operator of the machine. Members of the machine user network may also contribute information to the user community database.

Information in the user community database may be employed to generate and/or update the predicative analyses, including the heuristics and statistical models, used to determine machine type, expected machine use, machine and component configurations, alert/prohibited conditions, machine and component reliability, maintenance conditions, component replacement availability, alternative components, or any other such determinations.

System 700 provides user interface 704 to at least a user or operator of a machine (Machine_A), as well as a user of a client computer, a server computer, or any other device. User interface 704 may be a local interface (local to Machine_A) or a remote interface (remote from Machine_A). At least a portion of the information presented to a user of interface 704 may be based on data included in the system database 702, as well as ID Tag and sensor data. The user may provide information to system 700, via user interface

704. In various embodiments, user interface 1900 of FIG. 19 may provide a user with any of the user interactions discussed in conjunction with at least user interface 704 of system 700. Likewise, user interface 704 may provide a user with any of the user interactions, such as providing machine data, analytics, marketplace data, and the like, discussed in conjunction of user interface 1900 of FIG. 19. System 700 may store the user provided information within database 702. Likewise, system 700 is operative to store any ID Tag and sensor data within database 702.

User interface 702 includes a machine and component display 732. The machine and component display 732 displays data from component ID Tags and/or sensors included in Machine_A. Machine and component display 732 may include a plurality of gauges, a map, and/or one or more graphs to visually display or render data from one or more ID Tags and sensors. In various embodiments, the user may be enabled to select which ID Tags and sensors to view display 732. In at least one of various embodiments, each gauge in the interface may represent real-time (or near real-time) data from the selected sensors. In some embodiments, the user may be enabled to drag and drop the gauges into the report for viewing, where each gauge corresponds to a separate sensor. Machine and component display 732 may include a map of the current location of the Machine (e.g., as provided by a sensor that includes a GPS transceiver). Machine and component display 732 may also include a graph to illustrate historical data for each ID Tags and/or sensors that is selected.

User interface 704 may also include machine controls display 734, usage and maintenance alerts/alarms display 736, and manually identify components display 738. The machine controls display 734 may enable a user to interact with machine controls visually displayed with display 738 and locally or remotely control Machine_A. For instance, machine controls with display 738 enable a user to remotely control Machine_A, as well as update operational and/or control parameters, as well as configuration settings.

Furthermore, usage and maintenance alerts/alarms display 736 may display and/or provide alerts or alarms to the user regarding the real-time usage and/or maintenance needs of Machine_A. As described herein, the user is enabled to customize alert conditions, which if satisfied, an alert or alarm may is provided to one or more users via display 736. In some embodiments, the condition for triggering an alert may be determined based on a comparison of real-time sensor data and data within database 702, such as component specific information (such as component operating parameters) included in any of component specification database 714, component reliability database 720, user community database 728, and the like. However, additional alert conditions may also be determined, provided, and/or otherwise defined by a user.

As discussed throughout, system 700 may automatically identify various components within Machine_A via interrogating ID Tags associated with the components. System 700 also enables a user to manually identify at least some components via manually identifying components display 738. In some embodiments, manually identifying components display 738 provides a drop-down-menu, clickable interface, or other means for the user to manually identify or enter components included in Machine_A that are not automatically identifiable via component ID Tags.

User interface 704 includes component, configuration, and maintenance display 740. Display 740 may display each component automatically or manually identified in Machine_A, such as P1, P2, P3, and the like. For each component or part, display 740 may provide links or other access to configuration files, maintenance files, sensor log files, and the like. In at least one embodiment, display 740 also provides at least an expected date or deadline regarded expected maintenance, determined in a maintenance predictive analysis. For instance, system 700 may predict that component P1 will be required to be replaced and/or maintained by Jun. 17, 2018. At least a portion of the information shown in display 740 may be based on information provided by system database 702, such as machine and component usage database 718, maintenance database 724, component reliability database 720.

User interface 704 may include a machine usage display that provides the user information regarding the usage, users, location, and the like of Machine_A. For instance, the automatically detected machine type and geo-location or environment of Machine_A may be displayed by display 742. Likewise, display 742 may enable the display or access of Machine_A's usage and user history, as well as duty cycle and utilization. At least a portion of the information shown in display 742 may be based on information provided by system database 702, such as machine usage database 718, machine and component usage database 718, user database 722, machine database 716, and the like.

User interface 704 includes marketplace display 744. Marketplace display 744 provides the user real-time marketplace, or e-commerce, information regarding replacement and/or alternative components for Machine_A. For instance, marketplace display 744 may show multiple vendors and prices that offer component P3. Alternative components to P3 may also be shown by marketplace 744. At least a portion of the information shown in display 744 may be based on information provided by system database 702, such as marketplace database 727, component specification database 714, and user community database 728.

In some embodiments, a user may select a replacement part, via marketplace display 744 to order a replacement and/or alternative component. In at least one embodiment, system 700 is enabled to automatically a replacement part, without user action, based on a ranking of the multiple choices. The ranking may be based on price, availability, component reliability, crowd-source user review, and the like.

Generalized Operations

The operation of certain aspects of the invention will now be described with respect to FIGS. 8-15. In at least one of various embodiments, processes 800, 900, 1000, 1100, 1200, 1300, 1400, 1500, 1600, 1700, 1720, or 1800 of FIGS. 8, 9, 10, 11, 12, 13, 14, 15, 16, 17A, 17B, or 18 respectively, may be implemented by and/or executed on a combination of computers, such as collection server computer 400 of FIG. 4; client computer 200 of FIG. 2; and/or MCSC 300 of FIG. 3. Additionally, various embodiments described herein can be implemented in a system such as system 100 of FIG. 1.

Figure 8:
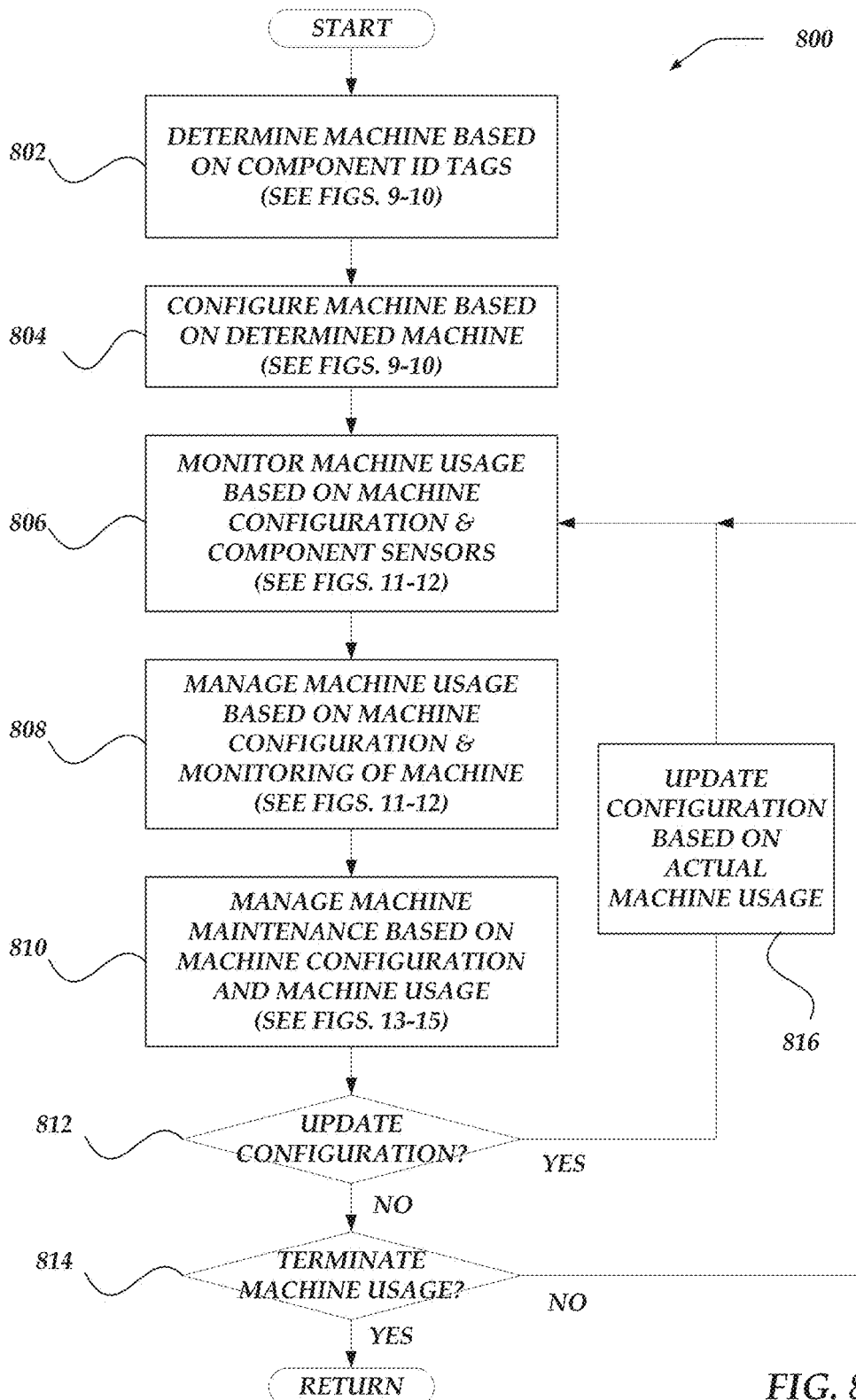
FIG. 8 illustrates a logical flow diagram generally showing one embodiment of a process for identifying, configuring, monitoring, controlling, and maintaining a machine that includes a collection of modular components.

FIG. 8 illustrates a logical flow diagram generally showing one embodiment of a process for identifying, configuring, monitoring, controlling, and maintaining a machine that includes a collection of modular components. As discussed throughout, at least some of the modular components include an ID Tag. Furthermore, one or more of the components includes one or more sensors. Process 800 may begin, after at start block, at block 802, where the machine is identified and/or determined. Various embodiments of determining a machine are discussed in the context of FIGS. 9 and 10. However briefly, at block 802, a machine type may be determined based on interrogating or receiving data from a plurality of ID Tags associated with components included in the machine. Furthermore, the machine may be uniquely identified as a specific instance of the machine type. The specifically identified machine may be uniquely defined by a serial number or the like based on the self-identified components types and/or specific instances of the self-identified components. For instance, the machine may be uniquely identified.

In at least one embodiment, the machine includes a dedicated ID_Tag that includes identification data for at least the machine type or the unique instance of the machine. In such embodiments, the identification of the included components and/or component types may not be required. The determination at block 802 may be an automatic determination. A machine user may be prompted to confirm the determination of the machine and/or provide additional information. In at least some embodiments, the determination may be based on at least components that were manually entered by a machine user.

Process 800 proceeds to block 804 where the machine is configured. Various embodiments of configuring a machine are discussed in the context of FIGS. 9 and 10. However briefly, at block 804, the machine is configured based on at least the machine determination/identification at block 802. For instance, configuring the machine may be based on at least the identified machine type or the specific instance of the machine. In some embodiments, the machine is further configured based on an expected usage of the machine, which as discussed below, may be based on the previous usage of the specific machine, or by the history of the machine operator. The previous and/or expected usage may be based on a community of users of the machine, a user social network, or other sources of crowd-sourced data aggregation, for instance, one or more crowd-generated heuristics.

Furthermore, the expected usage may be based on an environment or geo-location of the machine, a user of the machine, user permissions associated with the user, and the like. The configuration of the machine may be based on the environment (automatically determined via GPS enabled component sensors). For instance, if the environment is a desert environment the machine may configured on a first configuration and if the environment is a forest or a high altitude environment, the machine may be configured in a second configuration. The machine may be automatically configured or a user may provide at least a portion of the configuration. A user may be prompted to verify the configuration. In at least one embodiment, a user at least partially configure the machine via a user interface, such as user interface 704 of FIG. 7. A machine configuration may include configurations for one or more of the components included in the machine.

At block 806, the machine usage is monitored. Various embodiments of monitoring machine usage are discussed in the context of FIGS. 11 and 12. However briefly, at block 806, the usage of the machine is monitored in real time by collecting and/or receiving sensor data from the various sensors corresponding to machine components. The monitoring of the machine may be at least partially based on the configuration of the machine. For instance, the user may configure the collection and displaying of the various sensors displayed in user interface 704 of FIG. 7.

Monitoring the machine may include collecting and analyzing the datastream provided by the sensors. For instance, the sensors provide real-time telemetry of the operating conditions of the machine. The telemetry datastream may be analyzed to determine alarm/alert conditions. At least a portion of the telemetry, including data provided by the ID Tags and sensors may be stored in various databases, such as system database 702 of FIG. 7. In at least one embodiment, monitoring machine usage includes determining an actual machine usage based on the real-time telemetry datastream.

At block 808, the machine's usage is at least partially managed and/or controlled. Various embodiments of managing the machine's usage are discussed in the context of FIGS. 11 and 12. However briefly, at block 808, the machine usage is managed based on at least one of the machine configuration, the telemetry datastream generated by at block 806 (such as component sensor data), the system database 702, or user provided information. At least a portion of the machine usage management may be automatic. Another portion of the machine usage management may be manually performed by a user, such as a user of system 700 of FIG. 7. For instance, a user may remotely interact with, control, or otherwise operate the machine, via a user interface, such as user interface 704 of FIG. 7.

Process 800 proceeds to block 810 where at least a portion of the machine's maintenance is managed. Various embodiments of managing the machine's maintenance are discussed in the context of FIGS. 13, 14, and 15. However, briefly, at block 810 the machine maintenance is managed based on at least one of the machine configuration or the monitored machine usage. Predictive analyses or heuristics may be employed to inform a user, in advance, of an upcoming need to maintain the machine, such as replacing a component. E-commerce marketplace data is provided to the user, and the user is presented replacement and/or maintenance options. At least a portion of the market data may be crowd sourced from a social network that includes the user and/or a machine user network. Vendors and/or suppliers may contribute to the marketplace data. The user may order replacement components directly from the user interface. Replacement components may be automatically ordered, with or without intervention via the user, so that components are available in advance to a scheduled replacement data, without user intervention or action.

Process 800 is an adaptive process, in that any of the determinations included in process 800, or any sub-processes of process 800 may be updated or adapted based on the real-time operating or usage conditions of the machine. Such real-time information may be determined based on the telemetry datastream generated by monitoring the machine usage, i.e. the actual machine usage. One such example of an adaptive feedback loop is enabled be decision block 812, where it is determined if the machine configuration should be updated. For instance, the configuration may be updated in real-time and based on the actual machine usage. When an updated machine configuration may be beneficial to the operation of the machine, process 800 proceeds to block 816. If the configuration is not to be updated, process 800 proceeds to decision block 814.

At block 816, the configuration is updated or adapted based on the actual machine usage. For instance, the real-time telemetry datastream (data from the sensors and ID Tags) may be used to update the configuration. After the configuration has been updated, process 800 returns to block 806 to continue monitoring the machine usage.

At decision block 814, it is determined if the machine usage is to be terminated. For instance, if the machine is taken offline, or powered down, the machine usage is terminated. If the machine usage is not terminated, then process 800 returns to block 806 to continue monitoring the machine usage. Otherwise, process 800 terminates and/or return to a calling process to perform other actions.

Identifying and Configuring a Machine

Figure 9:
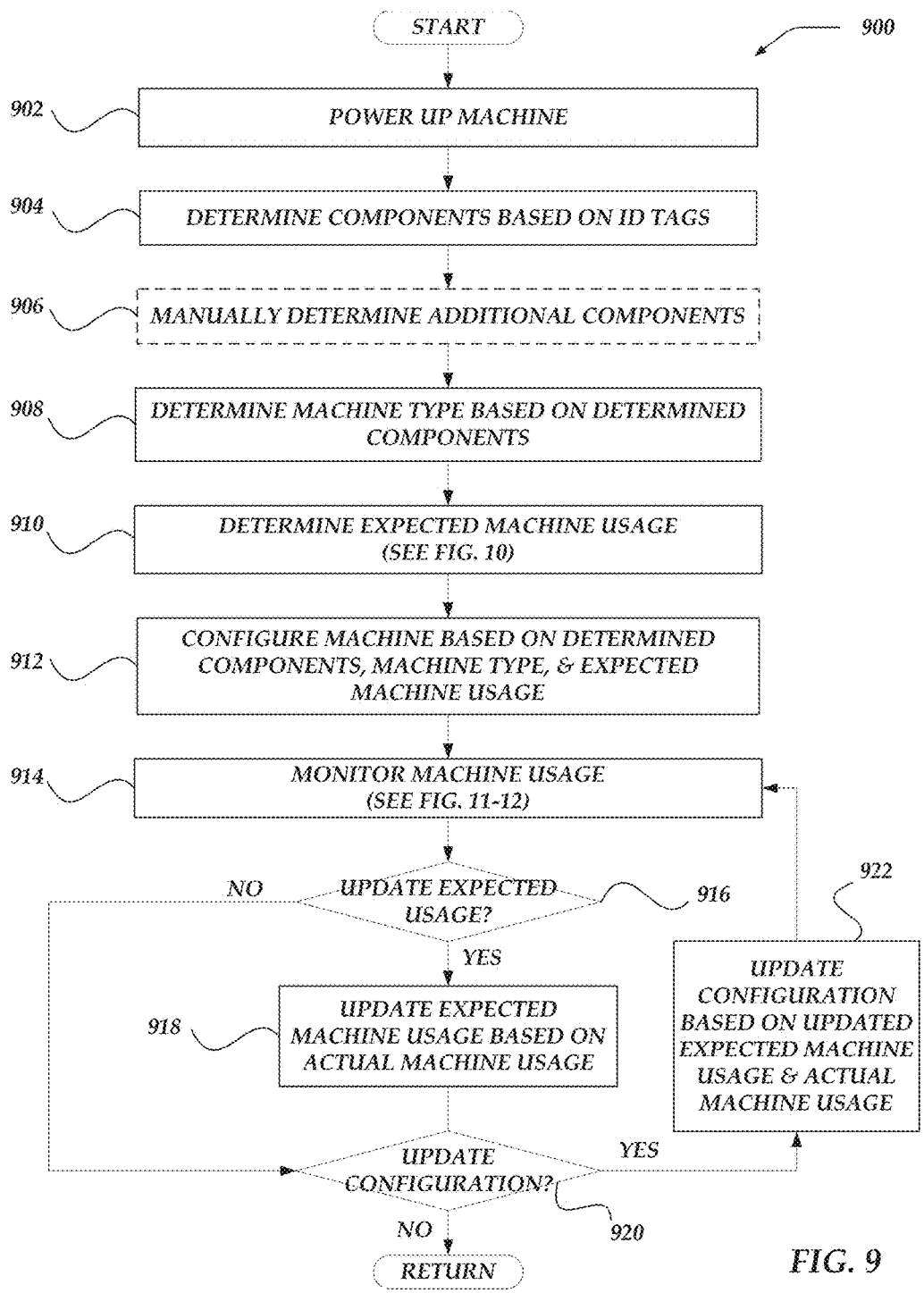
FIG. 9 illustrates a logical flow diagram generally showing one embodiment of a process for identifying and configuring a machine that includes a collection of modular components.

FIG. 9 illustrates a logical flow diagram generally showing one embodiment of a process for identifying and configuring a machine that includes a collection of modular components. Process 900 begins, after a start block, at block 902, where a machine is powered up. In at least one embodiment, at block 902, a machine may come available online, or is otherwise enabled to communicate to a collection computer or a server computer over a network.

Process 900 proceeds to block 904, where components in the machine are determined. At least a portion of the determined components may be identified based on one or more ID Tags included with the components. ID Tags may provide component identification data to a collection computer when interrogated. The component identification data may be provided wirelessly. In at least one embodiments, an RFID Tag is remotely interrogated and transmits the component identification data to the collection computer. The interrogation may be wireless, i.e. the collection computer or some other device may wirelessly provide a signal to the ID Tag to transmit the component identification data. In other embodiments, the interrogation may be received over a wired network. For instance, if the ID TAG includes EEPROM, a voltage on a pin may be transitioned to a read state.

The specific component, as well as a component type may be determined at block 904. At least a portion of the components may be self-identified via an interrogation of or receiving the data stored in the ID Tags. For instance, some of the components may be self-identified by an automatic interrogation of one or more of the ID Tags. Accordingly, at least some of the components and/or component types of the machine may be automatically determined upon powering on of the machine. Thus, self-identifying the components may be automatically performed during a power-up cycle of the machine.

In at least one embodiment, once a component has been identified, the inclusion of the component may be stored with the collection computer, such as collection sever computer 112 of FIG. 1, or a server computer, such as MCSC 110 of FIG. 1. Thus, once identified, in some embodiments, it may not be required to interrogate the ID Tags upon each powering up of the machine, unless the arrangement or inclusion of components has varied between successive power-up cycles (such as when a component has been replaced).

In some embodiments, the functionality or operability of the component is determined upon identification of the component. For instance, after identification, the collection computer may put the component into a "warming-up" mode or a test mode. In such embodiments, the collection computer may verify that the component functions within the manufacture specifications or at least within the limits tested in the test mode. If one or more components are determined to not be fully functional, an alert or alarm may be provided to the user.

In some embodiments, at optional block 906, a user is enabled to manually determine additional components included in the machine. For instance, some components may not include an ID Tag, or the included ID Tag has malfunctioned, or is otherwise not readable upon powering up of the machine. In such instances, a user may manually identify such components. In at least one exemplary embodiment, a user of user interface 704 of FIG. 7 may manually enter components that were not automatically determined or identified during the power-up cycle. The manually identified components display 738 of user interface 704 may be operative to assist the user in entering these additional components. In at least one embodiment, one or more components are suggested to the user, via the user interface, based on additional components that are likely included with the combination of components that were self-identified at block 904.

At block 908, the machine type is determined based on at least the determined components. In various embodiments, the type of the machine is automatically determined based on the self-identified components determined at block 904. The determined machine type may be further based on the manually identified components of block 906. The machine type may be based on the specific combination of components or component types determined or identified at blocks 904 and 906. In at least one embodiment, the machine includes one or more dedicated ID Tags that include the machine type corresponding to the machine.

The machine type may be determined based on information from one or more databases, such as the databases within system database 702 of FIG. 7, such as machine database 716. The machine entries in machine database 716 may include lists or tables of components typically included in the machine types within machine database 716. Such component collections included in the machine database may be consulted to determine the machine type. A look-up table may be consulted to determine the machine type. The look-up table may include one or more possible specific combination of components or component types that map or correspond to the machine type.

As noted throughout, a statistical analysis may be performed, and statistical probabilities assigned to one or more potential machine types. In at least one embodiment, a heuristic may be employed to determine the machine type. The database entries, look-up tables, statistical models, and heuristics may be updated to incorporate or integrate newly generate user or user community data. The user may be prompted to verify the determined machine type.

In some embodiments, in addition to the machine type, the specific instance of the machine may be uniquely determined or identified at block 908. For instance, the specific combination of the specific components determined at blocks 904 and 906 may indicate a specific machine. A look-up table may be included in machine database 716, where the specific combination of the specific identified components indicates a specific machine. A serial number or some other unique identifier may be assigned to uniquely indicate the specific machine. The unique identifier tracks the specific machine in the various databases included in the system database 702, as well as through the various predictive analyses.

In at least one embodiment, one or more of the ID Tags included in the machine, such as the dedicated machine ID Tag, or any other ID Tag associated with the components of the machine, are programmable and/or writable from a distance, i.e. a collection computer, a server computer, or a client device may write information to store information on a ID Tag. According, once the machine or the machine type has been identified, the identified machine type or unique serialization number (or any other type of information or data) may be stored on the dedicated ID Tag. This new stored information may be automatically read, along with the component identification data upon reading of the ID Tags. Accordingly, the information stored in the ID Tags may be updated or adapted during the life cycle of the machine or the components of the machine.

At block 910, the expected machine usage is determined. Various embodiments of determining the expected usage of the machine are discussed in the context of FIG. 10. However briefly, once the machine has been identified, predictive analyses or heuristics are utilized to determine an expected usage of the machine. The expected usage may be based on a previous machine usage, the specific machine operator, the user's social network, network of machine users, and the like. For instance, the previous usage may be based on a prior use of the specifically identified machine and/or a previous usage of another machine that is of an equivalent or similar machine type.

The expected usage may be based on a specific application of the machine, such as an application defined by a user. The expected usage may be further based on the operator or user of the machine, user permissions of the user, geo-location or environment of the user, and the like. A predictive analysis determines the likely expected use of the machine based on knowledge of how the machine (and/or other machines of similar machine type) was previously used, location, user community, and the like. Information included in system database 702 may be used in the predictive analysis, including but not limited to machine & component usage database 718, user database 722, user community database 728.

At block 912, the machine is configured. The machine may be configured based on at least one of the determined components/component type or the expected machine usage. In at least one embodiment, the machine is configured based on the determined machine type and/or the specific instance of the machine. In at least one embodiment, the determined configuration may be based on specific components, the machine operator, user permission, machine geo-location and environment, previous machine usage, and the like. The user may be prompted to verify the configuration. In at least one embodiment, a portion of the components are individually configured based on the determined.

In at least one embodiment, the configuration is based on the geo-location and/or environmental factors. For instance, the machine may be configured differently if the machine is located in a desert environment, as opposed to a forest, coastal, or mountainous environment. Block 1008 of FIG. 10 discusses various embodiments for determining a geo-location or environment of the machine.

A configuration may include a machine configuration, as well as configurations for the individual components included in the machine. Configuration files (machine and/or component files) may be loaded from various configuration libraries included in the system database based on the determined configurations for each of the components. The user may update the various configurations during the operation of the machine. In at least one embodiment, the system tests the functionality of the components once the components are configured. In a least one embodiment, a localization of at least a portion of any of the processes discussed herein is performed based on at least the geo-location data. For instance, time zone parameters, currency type, units, language parameters, and the like are set or otherwise configured in various portions of any of the processes discussed herein.

Process 900 is an adaptive process, and thus provides feedback loops to adapt and/or update the configuration of the machine, as the usage or operation of the machine is varied or changes over time. Thus, after configuring the machine, process 900 flows to block 914, where the machine usage is actively monitored. Various embodiments of monitoring the machine usage are discussed in the contexts of FIGS. 11-12. One embodiment of monitoring the machine usage is discussed in the context of block 806 of adaptive process 800 of FIG. 8. A real-time telemetry datastream that includes information regarding the usage or operation of the machine is received in block 914. The actual machine usage may be determined when monitoring the machine at block 914.

At decision block 916, it is decided if the expected machine usage is to be updated. For instance, if the expected machine usage, determined at block 910, varies from the actual machine usage, beyond a tolerance or threshold level, the expected machine usage may be updated. If the expected machine usage is to be updated, process flows to block 918, otherwise process 900 flows to decision block 920.

At block 918, the expected machine usage is updated based on the actual machine usage determined at block 914. In at least one embodiment, the expected machine usage is updated and/or adapted to be similar to the actual machine usage, within the predetermined tolerance level. Various adaptive heuristics may be employed to update the expected machine usage in view of the actual machine usage.

Process 900 flows to decision block 920, where it is determined if the configuration is to be updated, For instance, the configuration may be adapted to updated to be optimized for the actual machine usage. If the configuration is to be updated, process 900 flows to block 922, where the configuration is updated. The configuration may be updated based on at least one of the actual machine usage or the updated expected machine usage. Block 816 of FIG. 800 discusses various embodiments that include updating the machine configuration. Otherwise, process 900 terminates and/or returns to a calling process to perform other actions.

Figure 10:
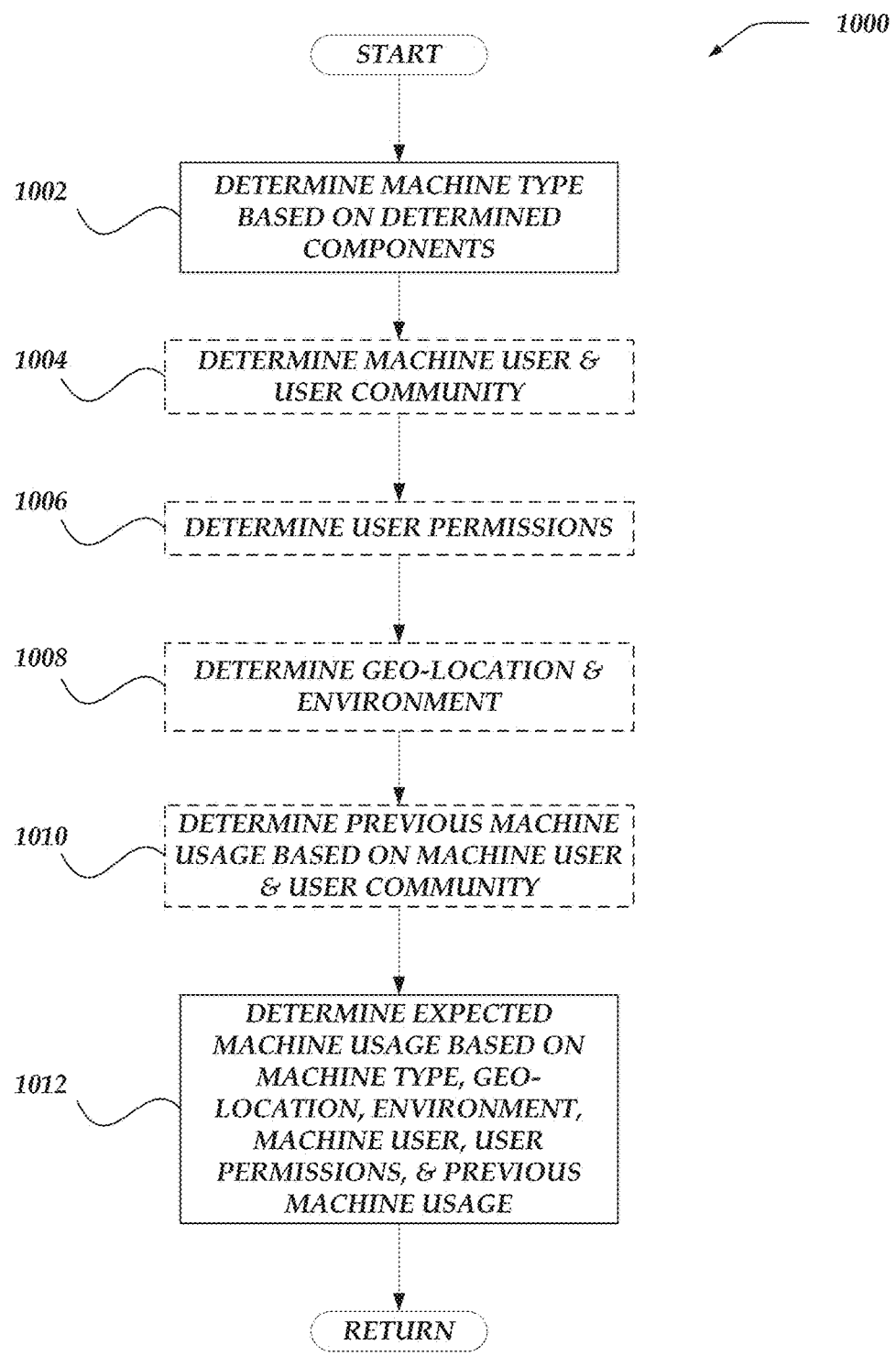
FIG. 10 illustrates a logical flow diagram generally showing one embodiment of a process for determining an expected machine usage, where the machine includes a collection of modular components.

FIG. 10 illustrates a logical flow diagram generally showing one embodiment of a process 1000 for determining an expected machine usage, where the machine includes a collection of modular components. Essentially, process 1000 provides one or more predictive analyses for determining the expected usage of a machine. The predictive analyses is based on various known factors about the type and specific machine, including previous use (nominal, average, peak), machine operator, environment (desert, jungle, high altitude, forest, underwater, and the like), user permissions, regulatory schemes that govern the usage of machine, and other such factors that are useful to predict the expected usage.

The previous usage may be based on previous machine monitoring, for instance monitoring and logging the sensor data during previous usages of the machine, via one or more telemetry datastreams. This prior knowledge may be stored in the system database. As noted throughout, process 1000 is an adaptive process, and thus the various predictions, determinations, or heuristics may be updated or adapted as new information regarding the machine becomes available to the embodiments. For instance, a predicative heuristic may be updated when new information becomes available via a telemetry datastream received during monitoring of the machine, a user social network, or a machine user network is updated.

Process 1000 may begin, after at start block, at block 1002, where a machine type is determined based on the determined and/or self-identified components. In at least one embodiment, at block 1002, the machine type is determined in a similar manner as discussed in regards to block 908 of process 900 of FIG. 9. For instance, ID Tags associated with the machine components may enable the self-identification of the components/component types and the machine/machine type. As such, the machine database 716 of FIG. 7 may be queried to determine the machine.

At optional block 1004, a machine user may be determined. The machine user may be a machine operator. The machine operator may locally or remotely operate the machined. For instance, the machine may be at least partially operated via remote or local user interface 704 of FIG. 7. A user may be determined by prompting the user for user credentials. Furthermore, a user social network and/or a machine user network may be determined at block 1004.

At optional block 1006, user permissions may be determined. User permissions may be determined via user credentials. In at least one embodiment, user database 722 of FIG. 7 may be accessed to determine the user, as well as user permissions. Additionally, user community database 728 may be used to determine the social and machine user networks.

At optional block 1008, the geo-location of the machine is determined. In some embodiments, the geo-location or global position is determined by employing at least a GPS transceiver. One of the sensor components included in machine may be a GPS transceiver. In other embodiments, a GPS transceiver included in a collection computer, a server computer, or a client computer may provide the geo-location. Once the geo-location is determined, various environmental factors are determinable by process 1000. For instance, the machine's elevation may be determined. It may also be determined if the machine is located in a desert, coastal, mountainous, forested, or humid environment. In at least one embodiment, the configuration of the machine is based on the geo-location or environmental factors determined at block 1008. In at least one embodiment, the environment is automatically determined. A user may be prompted to verify or confirm the automatically determined environment and/or geo-location.

At optional block 1010, the previous machine usage is determined. In at least one embodiment, the machine and component database 718 of FIG. 7 is queried to determine the previous machine usage. The previous machine usage may be based on previous telemetry datastreams associated with the specific instance of the machine and/or specific components included in the machine. The previous machine usage may include values for the sensor data collected during previous usages of the machine. For instance, the previous machine usage may include nominal, weighted averages, or peak values of the sensor data. In at least one embodiment, the previous machine usage includes statistical distributions of previous sensor data values. In some embodiments, the previous machine usage is based on the user's previous use. Additionally, the machine's previous usage may be based on a community of users of similar machines and/or one or more social networks of the user. Accordingly, the previous usage may be based on heuristics generated via crowd-sourced data.

At block 1012, the expected usage of the machine is determined. The determination of the expected machine usage is based on at least one of the determined machine type, geo-location, environment, machine user, user permissions, user community, the previous machine usage, and the like. The determination of the expected machine usage may included a predictive analysis that incorporates information from any of the databases included in system database 702 of FIG. 7, as well as user supplied information. In at least one embodiment, a suite of heuristics is employed to integrate and blend the various sources of data to determine the machine's expected use. As with the previous machine usage, the expected machine usage may include nominal, weighted averages, peak values, or statistical distributions of expected sensor data.

As noted throughout, process 1000 is an adaptive process. As such, the expected machine usage may be periodically updated to incorporate data regarding the actual machine usage. For instance, as statistical distributions of actual sensor data becomes available, these distributions may be included or incorporated in the determined expected machine usage. The expected machine usage may be updated via a Bayesian-like process, where the previous sensor data distributions represent the prior knowledge, and the actual sensor data distributions are utilized to update the prior knowledge. In this way, the expected machine usage is adapted, over time, to more accurately reflect the actual machine usage. After block 1012, process 1000 may terminate and/or return to a calling process to perform other actions.

Monitoring and Managing the Operation of a Machine

Figure 11:
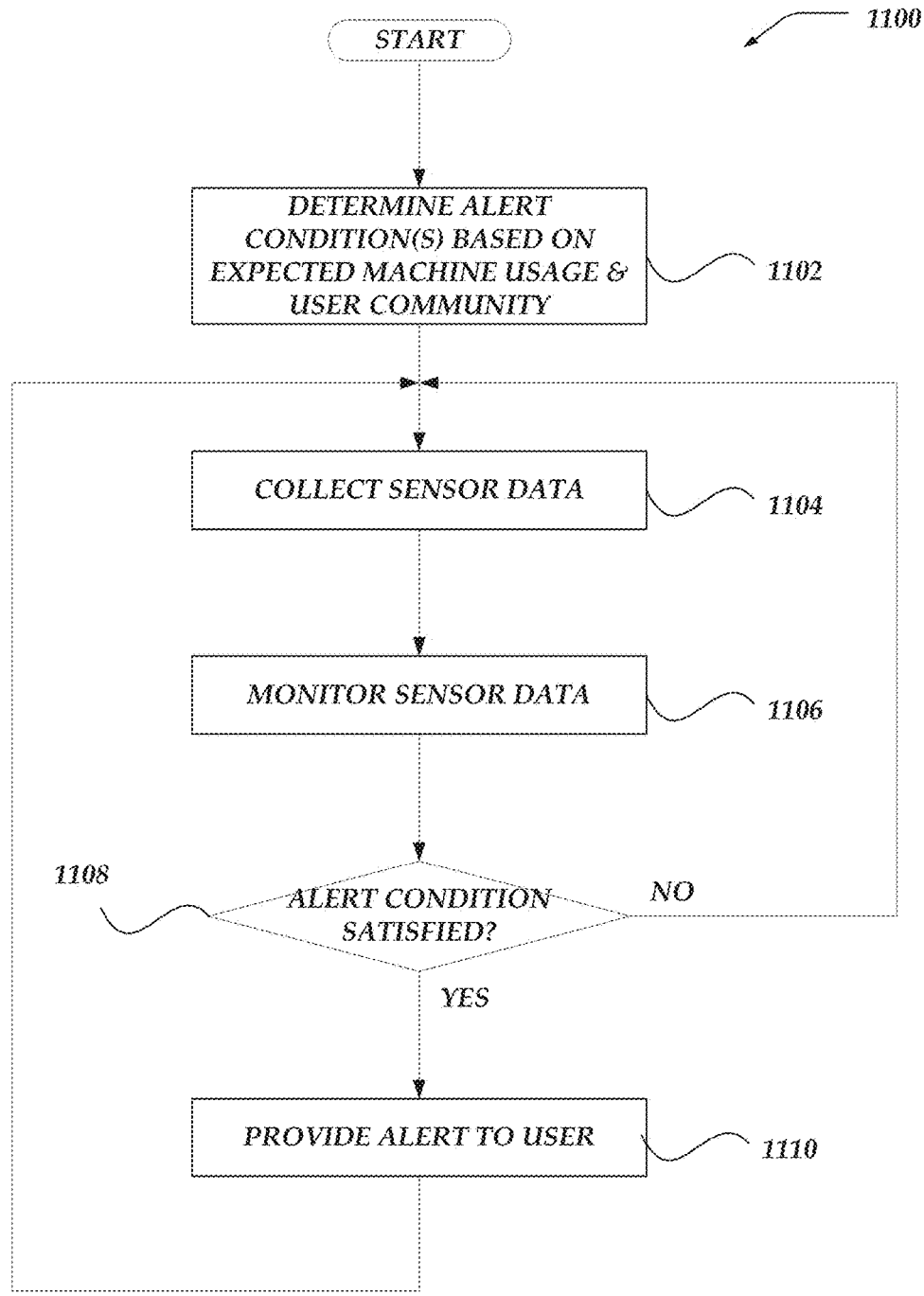
FIG. 11 illustrates a logical flow diagram generally showing one embodiment of a process for monitoring and managing machine usage, wherein the machine that includes a collection of modular components.

FIG. 11 illustrates a logical flow diagram generally showing one embodiment of a process for monitoring and managing machine usage, wherein the machine that includes a collection of modular components. Process 1100 begins, after a start block, at block 1102, where one or more alert conditions for the machine are determined. In at least one embodiment, determining the alert conditions is based on the expected machine usage. The expected machine usage may be determined by a process similar to the various embodiments discussed in the context of at least FIG. 10. In at least one embodiment, the alert conditions may be based on crowd-source data, such as the user's social network or a community of operators of similar machines and/or components. For instance, a community of users may have discovered various operational scenarios or modes that have not been known or previously published. Via crowd-sourced data, other conditions may be determined for such conditions.

In some embodiments, determining the alert conditions is based on information included in the system database, such as component specification database 714, component reliability database 720, machine database 716, user community database 728, or any other database of FIG. 7.

Alert conditions may be sensor values or patterns in the sensor value. Alert conditions may be a sensor value exceeding a predetermined threshold, spikes in a sensor value, a rate of change in a sensor value exceeding a predetermined threshold, or the like, which when satisfied may trigger an alert to be sent to one or more users.

In some embodiments, conditions may be single events, such as a single temperature value exceeding a threshold value. In other embodiments, conditions may be repeating events, such as a temperature value exceeding a threshold value for a given period of time. In other embodiments, the conditions may be a pattern of events, such as a temperature value being above a first threshold value for a given time, then falling below second threshold, then increasing at a given rate before peaking above a third threshold value.

In various embodiments, an alert condition may correspond to a single sensor. For example, a temperature sensor exceeding a threshold value. In other embodiments, an alert condition may be based on a combination of a plurality of sensors. For example, a temperature sensor exceeding a threshold value and a rate of increase of revolutions per minute (RPMs) being above another threshold value. These examples of types of conditions is for illustrative purposes and should to be considered as exhaustive or limiting.

In some embodiments, the alert conditions may be provided by a user (e.g., an administrator). In other embodiments, the alert conditions may be based on a manufacturer's component's specification. For example, each sensor may be associated with one or more components. In some embodiments, a user may be enabled to customize which sensors are associated with which components. In at least one of various embodiments, a database of components and their manufacture specifications and/or operating parameters may be maintained. Each component or line item in the database may include metadata or identifiers of the sensors it is associated with.

In various embodiments, alert conditions may identify one or more users that may be provided an alert if the condition is satisfied. Additionally, alert conditions may include an identifier of the type of alert than may be provided to each user. In this way, alert conditions may be customized for different conditions, different users, and different alert types. Users may include, but are not limited to, mechanics, engineers, site foreman, managers (e.g., a project manager, account manager, finance manager, or the like), or the like. In various embodiments, each of a plurality of users may have a role that may provide access or restrictions to one or more alert conditions and/or collection computer customization.

Since alert conditions may be customized for each user, some users may receive an alert, while others do not. For example, if the oil pressure falls below a predetermined threshold, then a text message may be sent to a mechanic. But if the lifting capacity of a bucket-arm goes below a predetermined threshold then an alert may be sent to a lead engineer and the mechanic. Similarly, alert conditions may include escalation rules, such that if an alert condition is satisfied a predetermined number of times within a predetermined time period then alerts may be provided to additional users. Continuing the example above, if the oil pressure continuously fall below the threshold, then an alert may be provided to a site manager as well as the mechanic. So in some embodiments, alert conditions may include a plurality of thresholds where different users are notified depending on the threshold exceeded.

In another example, alert conditions may be employed to compare usage of one machine to the usage of another machine. For example, assume a business has a fleet of garbage trucks. Each garbage truck may be equipped with a load cell or other sensor for detecting the weight and/or capacity status of the corresponding garbage truck. An alert condition may be determined for each garbage truck such that if the weight for a garbage truck exceeds a predetermined threshold, then an alert (at block 1308) may be provided to a manager. The manager may be able to use this information to tell the heavy garbage truck to stop collecting garbage, reroute other garbage trucks to continue the heavy garbage truck's route, or the like. In various embodiments, another alert condition may be dependent on the weight alert condition such that if a garbage truck is continuously over weight, then the manager can alter future routes, schedule extra maintenance on the overweight garbage truck, or the like.

In some embodiments, alert conditions may be employed to provide additional information to various management and/or business entities/users. For example, alert conditions may provide alerts if a machines operating time exceeds a lease agreement operating time. In another example, an alert condition may indicate that a different billing structure may be utilized. For example, an alert condition may indicate which operator is running the machine, since different operators may have different billing rates. It should be recognized that these examples are for illustration purposes and virtually any alert condition relating to a machine and/or its operation may be employed.

At block 1104, the sensor data is collected. In various embodiments, real-time data may be provided from one or more sensors measuring characteristics of a machine, which may be collected by a collection computer, such as described herein. In various embodiments, ID Tag data is additionally collected.

In various embodiments, at least a portion of data may be collected, not in real time, but after at some point after the sensors and/or the machine usage has generated the data. For instance, the data may be buffered and communicated at regular time intervals. The data may be communicated after the machine is powered down. In at least one embodiments, sensors may provide data regarding the condition of the machine when not in use. The sensor and/or ID Tag data may be stored, logged, or archived in the system database.

At block 1106, the collected sensor data is monitored. The sensor data may be monitored in real-time, or close to real-time as it is collected in block 1104. The sensor and/or ID Tag data may be stored, logged, or archived in the system database.

In any event, process 1100 may flow to decision block 1108, where a determination may be made whether an alert condition is satisfied. This determination may be made based on a comparison of the collected sensor data and the alert conditions. For example, the sensor data may be monitored to determine if a threshold value is exceeded, a rate of change is observed, or the like in accordance with the alert conditions. If the sensor data matches, exceeds, or otherwise fulfills an alert condition, then the alert condition may be satisfied. If an alert condition is satisfied, then process 1100 may flow to block 1110; otherwise, process 1100 may loop to block 1104 to continue to collect additional sensor data.

At block 1110, an alert may be provided to a user. As described herein, each alert condition may include which type of alert may be provided to which users upon an alert condition being satisfied. The alert may be an email, text message, automated phone call, or the like. The alert may be provided via a user interface, such as user interface 704 of FIG. 7. In some embodiments, the alert conditions may include escalation instructions, such that if an alert condition is repeated a predetermined number of times in a given time period, then additional users may also be provided an alert or the type of alert may change.

In some embodiments, the alerts may be employed to generate reports or provide other information to a user. For example, in some embodiments, a report may be generated for each time a pressure value exceeds a predetermined threshold, which may be based on a safety standard. In another example, a report of the running time of a machine and/or operator may be provided to a user (e.g., billing unit, manager, or other business related entity). In this way, a manager or an accountant can track usage of a machine in comparison to a lease or rental agreement. It should be recognized that these examples are not limiting or exhaustive and other alerts may be provided based on alert conditions being satisfied.

In some other embodiments, one or more alert conditions may be dependent on one or more other alert conditions being satisfied. For example, if a pressure sensor exceed a predetermined threshold (alert condition satisfied), then another alert condition may be employed to determine if the temperature is above a predetermined threshold. However, embodiments are not so limited and other alert condition relationships and/or alerts may be employed.

After block 1110, process 1100 may loop to block 1304 to continue to collect additional sensor data. Process 1100 may be an adaptive process. As such, the alert conditions may be periodically updated to reflect the current and/or actual usage of the machine.

Figure 12:
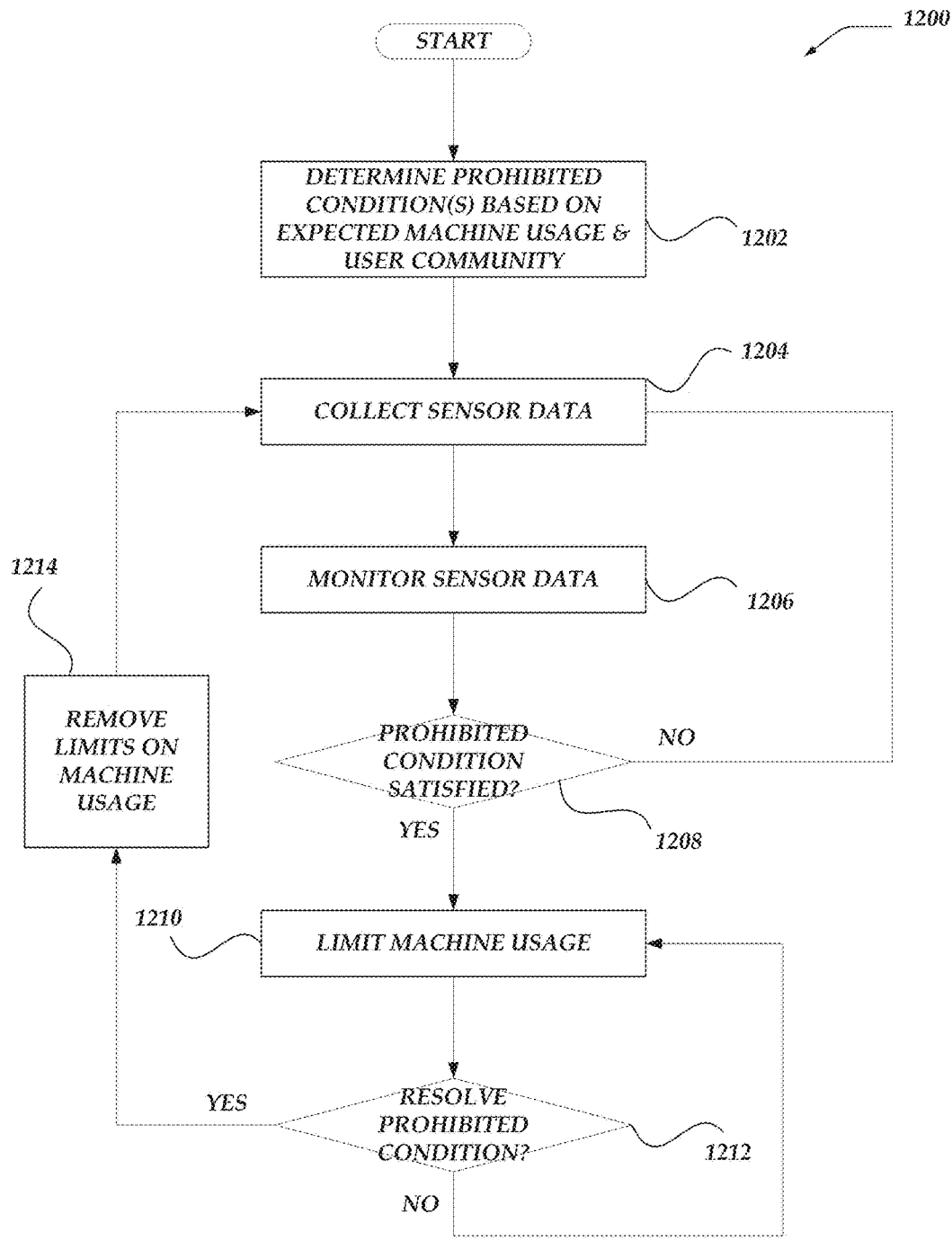
FIG. 12 illustrates a logical flow diagram generally showing another embodiment of a process for monitoring and managing the usage of a machine that includes a collection of modular components.

FIG. 12 illustrates a logical flow diagram generally showing another embodiment of a process 1200 for monitoring and managing the usage of a machine that includes a collection of modular components. Process 1200 begins, after a start block, at block 1102, where one or more prohibited conditions for the machine are determined. Prohibited conditions may be determined in a similar way to the alert conditions of block 1102 of process 1100 of FIG. 11. For instance, any alert condition occurring in process 1100 may be a prohibited condition in other embodiments, such as process 1200. Similar to alert conditions of process 1100 of FIG. 11, prohibited conditions may be based on crowd-sourced data.

Furthermore, a prohibited condition may be a prohibited geo-location, time, day, land speed, air speed, water speed of the machine, total usage time, total cycles on the machine, or the like. A prohibited condition may be based on a machine operator, the permissions of a machine operator, a machine load, peak sensor values, a determined maintenance requirement, such as a predicted failure date, and the like. A prohibited condition may be based on governmental regulatory schemes that regulate the operation of the equipment, industry standards, operational and maintenance protocols, and the like.

In at least one embodiment, a prohibited condition may be based on an agreement between an owner of the machine and an operator of the machine. In one exemplary embodiment, the machine operator does not own the machine and may be subject to a rental agreement, or some other terms-of-use agreement. A prohibited condition may be based on the terms of the rental agreement. For instance, one or more prohibited conditions may be based on the agreed upon day and/or total time of machine usage, a total number of machine cycles or operations, or limitations on the time of day, total usage time, dates of use, physical locations of use, and the like. If the operator exceeds any of these limitations, the corresponding prohibited condition is satisfied.

In at least one embodiment, the sensors may include device that measure a responsivity of the operator. Such sensors may include a device capable of determining operator alertness or attentiveness (such as a device that tracks eye movements), a blood alcohol breathalyzer measuring device, and the like. Prohibited conditions may be based on limitations of values provided by such sensors.

At block 1204, the sensor data is collected. In various embodiments, real-time data may be provided from one or more sensors measuring characteristics of a machine, which may be collected by a collection computer, such as described herein. Collecting sensor data at block 1204 may include similar embodiments to collecting sensor data at block 1104 of FIG. 11. At block 1206, the collected sensor data is monitored. The sensor data may be monitored in real-time, or close to real-time as it is collected in block 1204. The sensor and/or ID Tag data may be stored, logged, or archived in the system database.

In any event, process 1200 may flow to decision block 1208, where a determination may be made whether a prohibited condition is satisfied. This determination may be based on a comparison of the collected sensor data and the prohibited conditions. For example, the sensor data may be monitored to determine if a threshold value is exceeded, a rate of change is observed, or the like in accordance with the prohibited conditions. If the sensor data matches, exceeds, or otherwise fulfills a prohibited condition, then the prohibited condition may be satisfied. If a prohibited condition is satisfied, then process 1200 may flow to block 1210; otherwise, process 1200 may loop to block 1204 to continue to collect additional sensor data.

At block 1210, the machine usage may be limited based on a prohibited condition. For instance, the system may limit the usage of the machine if the operator fails to pass a breathalyze test, pilots the machine into a restricted area or geo-location, exceeds safe operational speed or weight, exceeds contracted usage such as number hours of operation per day or number of cycles of use, or the like. Limiting the usage of the machine may include completely terminating the ability to operate the machine. In other embodiments, limiting the machine usage may include enabling the operator to operate the machine in a limited capacity, until the triggered prohibited condition is cleared or reset. An alert may be provided to instruct the operator as to what steps must be taken to bring the machine back into compliance, such that the prohibited condition may be cleared.

At decision block 1212, it is determined whether the prohibited condition is resolved. If the condition is not resolved, process 1200 flows back to block 1210 to continue limiting the machine usage. If the prohibited condition is resolved, for instance if the operator returns the machine usage to an allowable state, process 1200 flows to block 1214. In at least one embodiment, the prohibited condition may be resolved remotely, via a user interface, such as user interface 704 of FIG. 7.

At block 1214, the limits on machine usage are removed and the prohibited condition is cleared. In at least one embodiment, a notification is provided to the user regarding the removal on the machine usage. Process 1200 flows to block 1204, where the operator may continue to operate the machine unhindered and sensor data is collected.

Monitoring and Managing the Maintenance of a Machine

Figure 13:
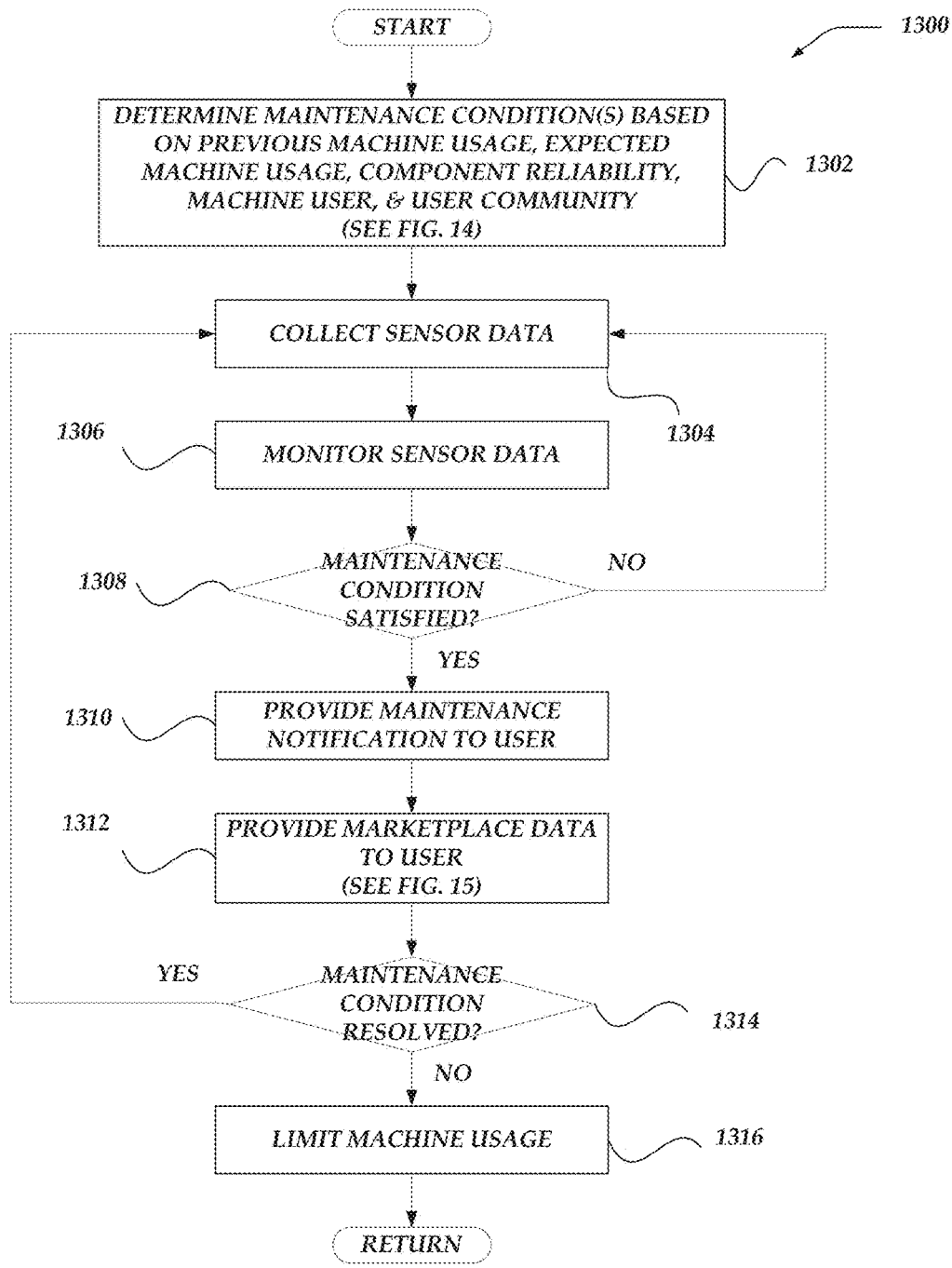
FIG. 13 illustrates a logical flow diagram generally showing one embodiment of a process for monitoring managing the maintenance of a machine that includes a collection of modular components.

FIG. 13 illustrates a logical flow diagram generally showing one embodiment of a process 1300 for monitoring and managing the maintenance of a machine that includes a collection of modular components. After a start block, process 1300 proceeds to block 1302 where maintenance conditions are determined. The maintenance conditions may be machine and/or machine component maintenance conditions. Various embodiments of determining maintenance conditions are discussed in the context of FIG. 14. However, briefly the maintenance conditions may be based on at least one of the previous machine usage, expected machine usage, or component reliability. As mentioned above, information or data regarding the previous machine usage, the expected machine usage, and the component reliability may be accessed via a system database, such as system database 702 of FIG. 7.

Maintenance conditions may include an approximate date or time remaining until a predicted failure or replacement period for a particular component. Maintenance conditions may include scheduled regular maintenance for the machine, subsystems in the machine, collections of components, or specific components of the machine. Maintenance conditions may be assigned a priority based on a criticality of the component or time left before the predictive failure or scheduled maintenance. When the time remaining to the predicted component failure or scheduled maintenance is less than a predetermined threshold failure time, the maintenance condition may be triggered. Furthermore, the user may define one or more maintenance conditions. The maintenance conditions may be based on crowd-sourced data and/or user networks.

At block 1304, the sensor data is collected. In various embodiments, real-time data may be provided from one or more sensors measuring characteristics of a machine, which may be collected by a collection computer, such as described herein. Collecting sensor data at block 1304 may be similar to any of the embodiments discussed in the context of block 1104 and 1204 of FIGS. 11 and 12 respectively. At block 1306, the collected sensor data is monitored. The sensor data may be monitored in real-time, or close to real-time as it is collected in block 1104. The sensor and/or ID Tag data may be stored, logged, or archived in the system database.

In any event, process 1300 flows to decision block 1308, where a determination may be determined whether a maintenance condition is satisfied. This determination may be based on a comparison of the collected sensor data and the determined maintenance conditions. For example, the sensor data may be monitored to determine if a threshold value is exceeded, a rate of change is observed, or the like in accordance with the maintenance conditions. If the sensor data matches, exceeds, or otherwise fulfills the maintenance condition, then the maintenance condition may be satisfied. As noted above, in one embodiment, a maintenance condition may be satisfied if a time to replace a component is less than a predetermined threshold failure time. If a maintenance condition is satisfied, then process 1300 may flow to block 1310; otherwise, process 1300 may loop to block 1304 to continue to collect additional sensor data.

At block 1310, process 1300 provides a maintenance notification or alert to a user. Providing a maintenance notification to a user at block 1310 may be similar to providing an alert to a user at block 1110 of FIG. 11. The maintenance alert may include information regarding the time to expected component failure, or the like.

At block 1312, marketplace data is provided to the user. Various embodiments of providing marketplace data to the user are discussed in the context of FIG. 15. However, briefly, online marketplace data may be provided to the user via an e-commerce like user interface, such as marketplace display 744 of user interface 704 of FIG. 7. The marketplace data may include an aggregation of e-commerce data regarding options to obtain a replacement and/or replacement component. At least a portion of the marketplace data may be crowd-source and/or provided by a user social network or a machine type network.

At decision block 1314, it is determined whether the satisfied or triggered maintenance condition has been resolved. For instance, in some embodiments, the system may give a user, such as a machine operator a predetermined amount of time to resolve the maintenance issue. Resolving the maintenance condition may involve replacing a machine component prior to the expected failure date. If the maintenance condition is adequately and/or timely resolved, process 1300 flows back to block 1304 to continue collecting sensor data. Otherwise, process 1300 flows to process 1316.

At block 1316, the machine usage is limited. In various embodiments, limiting machine usage at block 1316 may be similar to limiting machine usage at block 1210 of FIG. 12. After the maintenance condition is resolved, limits on the machine usage may be removed, such as according to the discussion of block 1214 of FIG. 12. Process 1300 terminates and/or return to a calling process to perform other actions.

Figure 14:
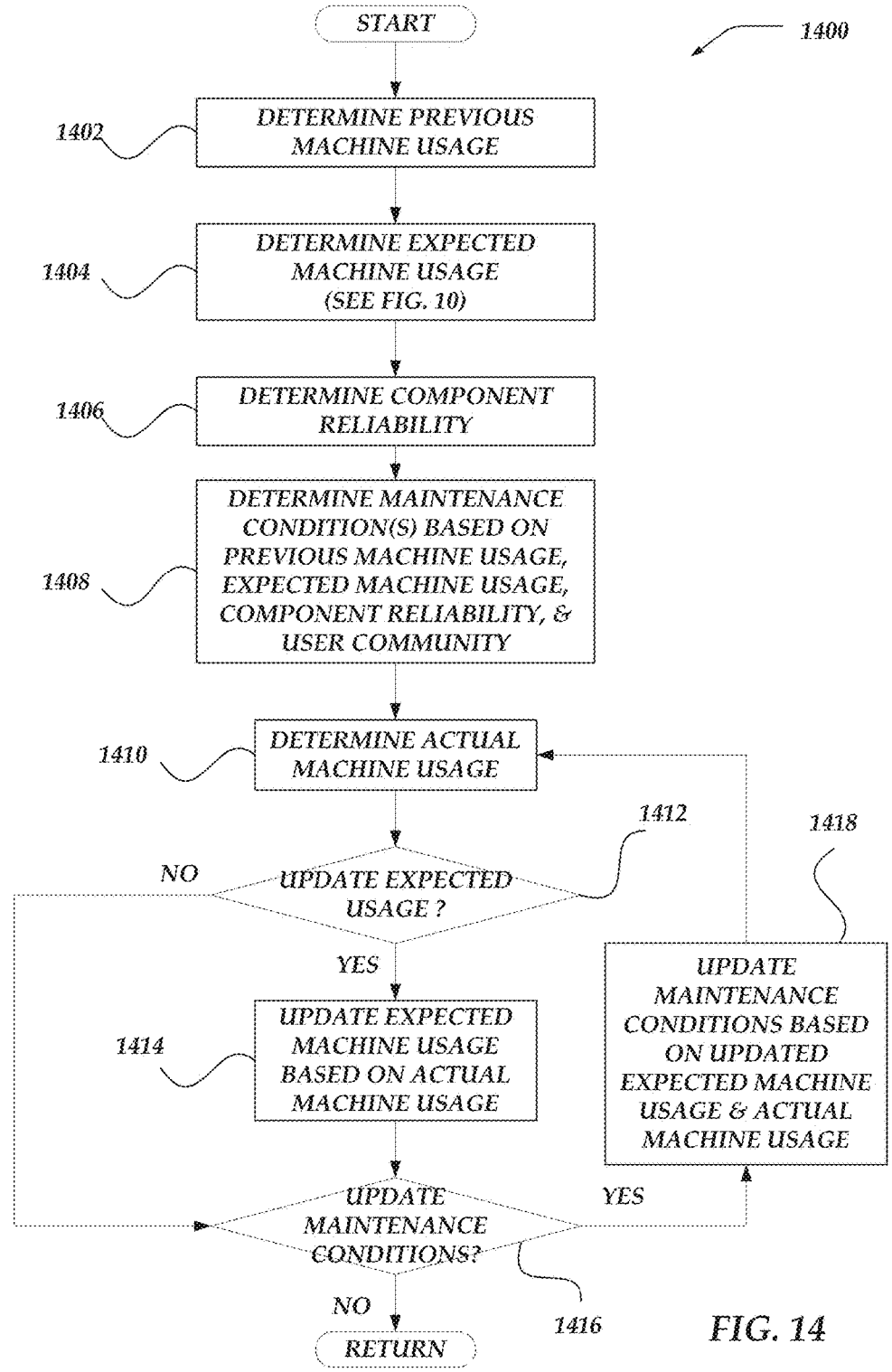
FIG. 14 illustrates a logical flow diagram generally showing one embodiment of a process for determining maintenance conditions for a machine that includes a collection of modular components.

FIG. 14 illustrates a logical flow diagram generally showing one embodiment of a process 1400 for determining maintenance conditions for a machine that includes a collection of modular components. After a start block, process 1400 proceeds to block 1402, where the previous machine usage is determined. Determining the machine's previous usage may be similar to block 1010 of FIG. 10. At block 1404, the expected machine usage is determined. Various embodiments for determining the expected machine usage are discussed in the context of process 1000 of FIG. 10.

At block 1406 the component reliability is determined for the components included in the machine. The component reliability is targeted to the component types and the specific instances of components included in the machine. The component reliability may be determined by querying one or more of the system databases, such as component reliability database 720 of FIG. 7. In at least one embodiment, component reliability may be determined from crowd-sourced data. In such embodiments, the user community database 728 may be queried. A user's social network or a network of users of a similar machine may be employed to crowd-source data that the component reliability is based upon.

At block 1408, one or more maintenance conditions are determined. Maintenance conditions may be based on at least one of the determined previous machine usage, expected machine usage, or the component reliability. In a preferred embodiments, at least a component failure date and/or rate is predicted. For instance, the component reliability may include a total running time, total number of cycles, or some other indicated of the lifetime of a component. The previous machine usage may indicate how much of the component's lifetime has already been consumed. The expected machine usage is used to determined how much more time is left in the machine's lifetime based on the expected future use of the machine. The predicted failure date or rate is then based on these determinations.

At block 1410, the actual machine usage is determined. Determining the actual machine usage at block 1410 may be similar to determining the actual machine usage as discussed in reference to block 916 of FIG. 9.

At decision block 1412 it is determined if the expected machine usage is to be updated. Determining if the expected usage is to be updated at decision block 1412 may be similar to the decision performed at decision block 918 of FIG. 9. If the expected machine usage is not to be updated, process 1400 proceeds to decision block 1416. Otherwise, process 1400 proceeds to block 1414, where the expected machine usage is updated based on the actual machine usage. Updating the expected machine usage at block 1414 may be similar to updating the machine usage at block 920 of FIG. 9.

At decision block 1416, it is determined if the maintenance conditions are to be updated. If the maintenance conditions are not to be updated, process 1400 may terminate and/or return to a calling process to perform other actions. Otherwise, process 1400 proceeds to block 1418, where the maintenance conditions are updated. In various embodiments, the maintenance conditions are updated based on the updated expected machine usage. In at least one embodiment, the maintenance conditions are updated based on the actual machine usage. Crowd-generated heuristics may be employed to update the maintenance conditions. Process 1400 proceeds to block 1410, where the machine is monitored to determine the actual machine use.

Figure 15:
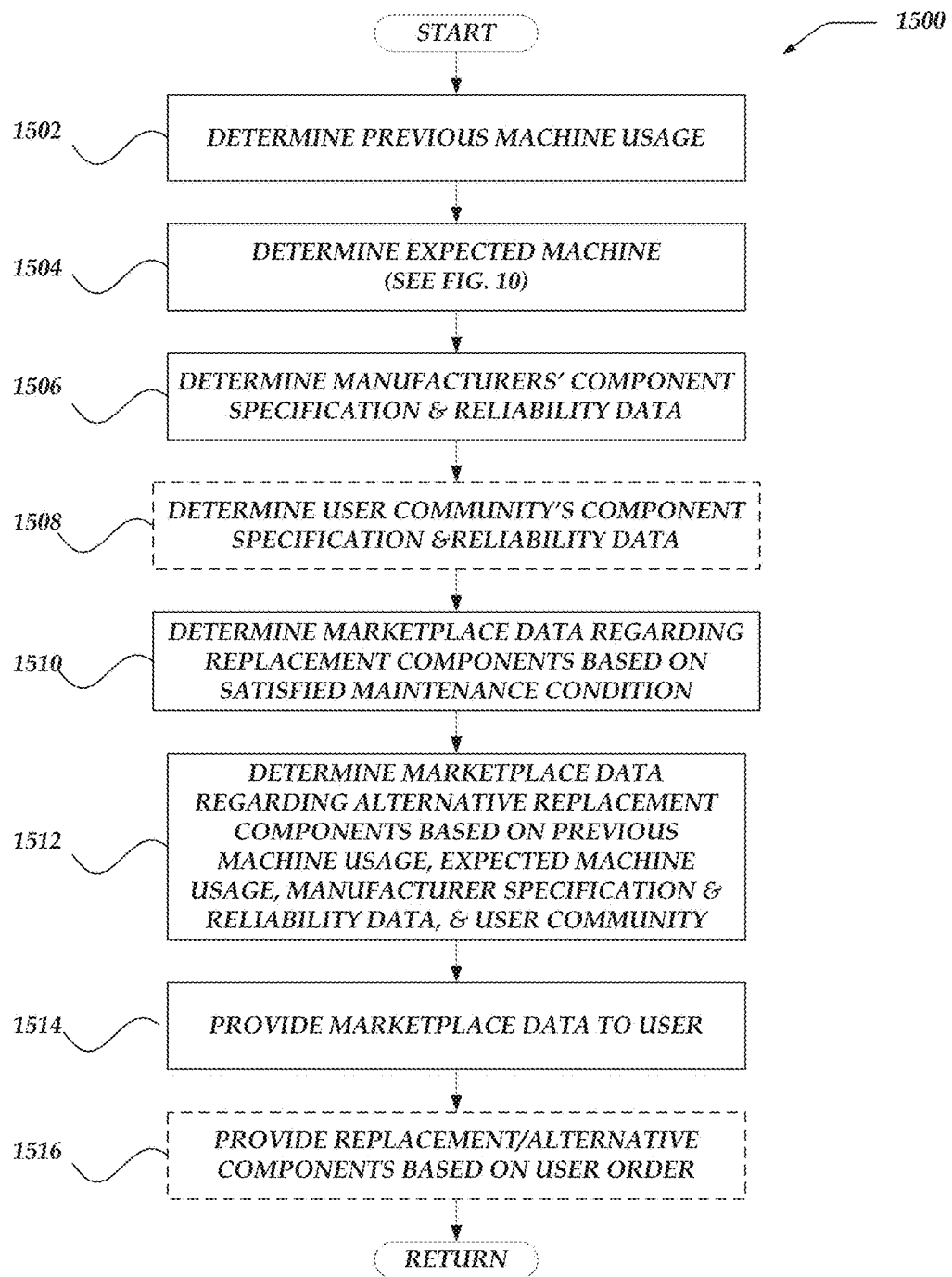
FIG. 15 illustrates a logical flow diagram generally showing one embodiment of a process for providing marketplace data regarding the maintenance of a machine that includes a collection of modular components to a user.

FIG. 15 illustrates a logical flow diagram generally showing one embodiment of a process 1500 for providing marketplace data regarding the maintenance of a machine that includes a collection of modular components to a user. After a start block, process 1500 proceeds to block 1502, where the previous usage of the machine is determined. In various embodiments, determining the previous usage of the machine at block 1502 may be similar to determining the previous usage at block 1010 of FIG. 10. At block 1504, the expected usage of the machine is determined. Various embodiments of determining a previous machine usage are discussed in the context of process 1000 of FIG. 10.

At block 1506, the manufacture's component specification and reliability data is determined. In at least one embodiment, the manufacture's component specification data is determined by querying the component specification database 716 of FIG. 7.

At optional block 1508, reliability from the user community may be determined based on at least the user community database 728 of FIG. 7. The user's social network may contribute to the user community reliability data. Also, a community of users of the same or similar type of machines may contribute to the user community reliability data.

At block 1510, marketplace data regarding replacement components is determined. The replacement data is based on a satisfied maintenance condition, for instance a satisfied maintenance condition of block 1308 of FIG. 13. The replacement component data may be directed to components with upcoming replacement schedules. The replacement data may be aggregated from part and/or machine suppliers, vendors, and the like. The aggregation may be performed manually or may be curated by one or more parties. In at least one embodiment, the aggregation may be performed automatically. The marketplace data may be e-commerce data.

At block 1512, marketplace data regarding alternative replacement components may be determined. The alternative replacement component data may be based on previous machine usage, expected machine usage, manufacturers' specification and reliability data, and the user community. Alternative replacement components may be suggested by the user's social network. For instance, a community of users may provide suggestions for alternative components based on the operators actual usage of the machine.

At block 1514, the marketplace, or e-commerce, data is provided to the user 1514. In one embodiment, the marketplace data is provided to the user via a user interface, such as user interface 704 of FIG. 7. At block 1516, replacement and/or alternative components are provided to the user based on a user order. The user may be enabled to directly order to replacement/alternative parts via the user interface. In at least one embodiment, the parts may be automatically ordered without user intervention. After block 1516, process 1300 may terminate and/or return to a calling process to perform other actions.

Figure 16:
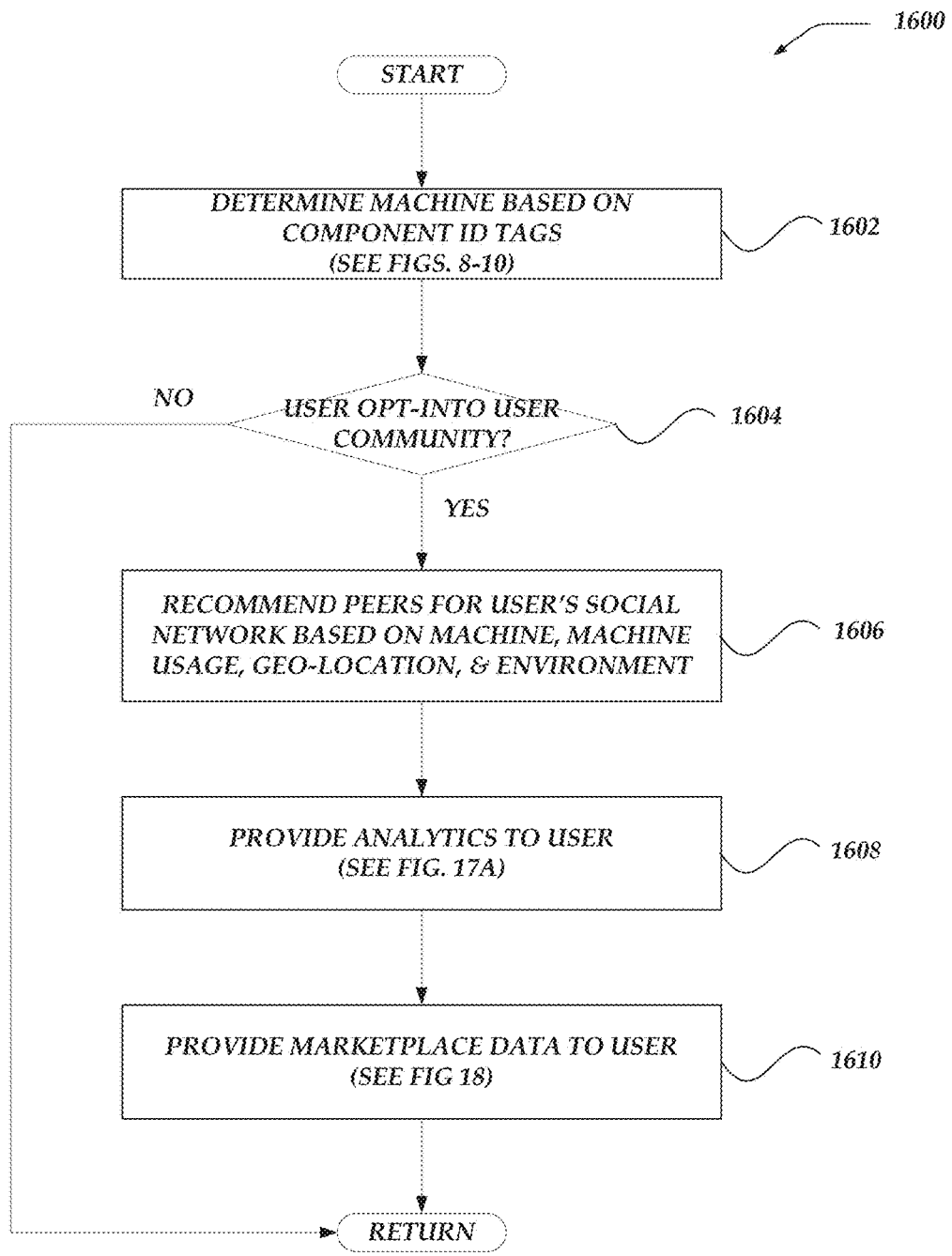
FIG. 16 illustrates a logical flow diagram generally showing one embodiment of a process for providing user community generated analytics and marketplace data for modular systems that are consistent with the various embodiments described herein.
Figure 17A:
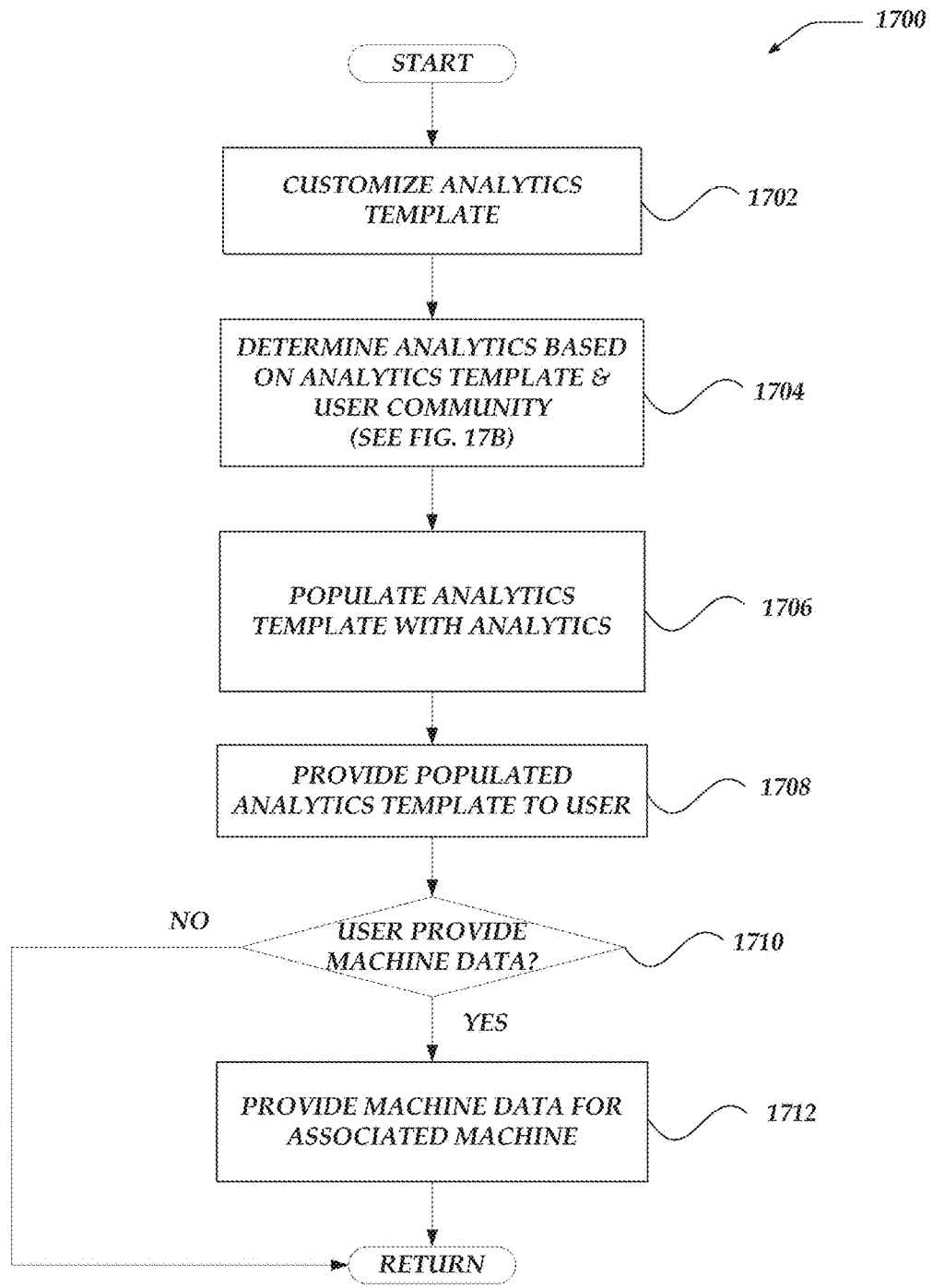
FIG. 17A illustrates a logical flow diagram generally showing one embodiment of a process for providing user community generated analytics for modular systems that are consistent with the various embodiments described herein.
Figure 17B:
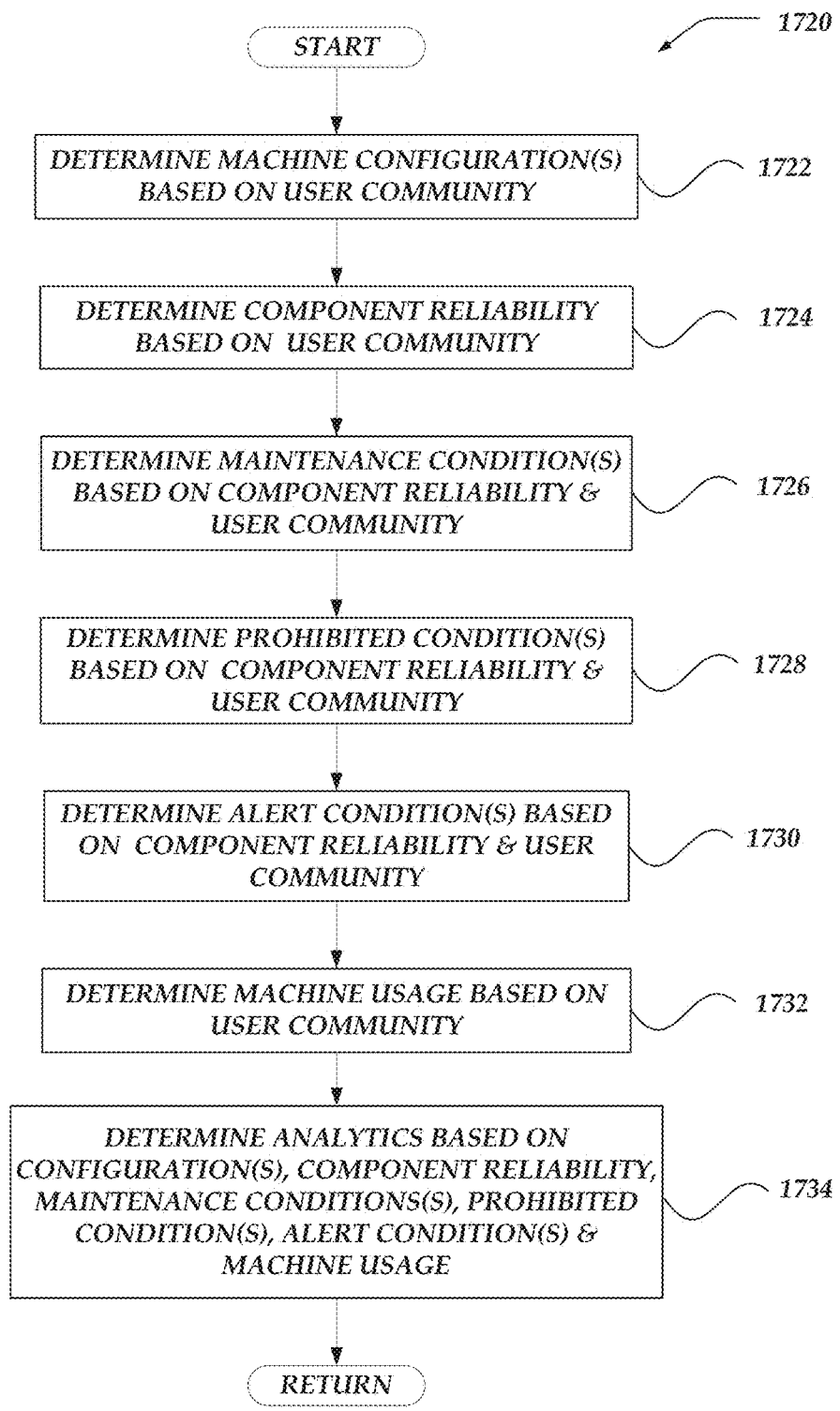
FIG. 17B illustrates a logical flow diagram generally showing one embodiment of a process for determining user community generated analytics for modular systems that are consistent with the various embodiments described herein.
Figure 18:
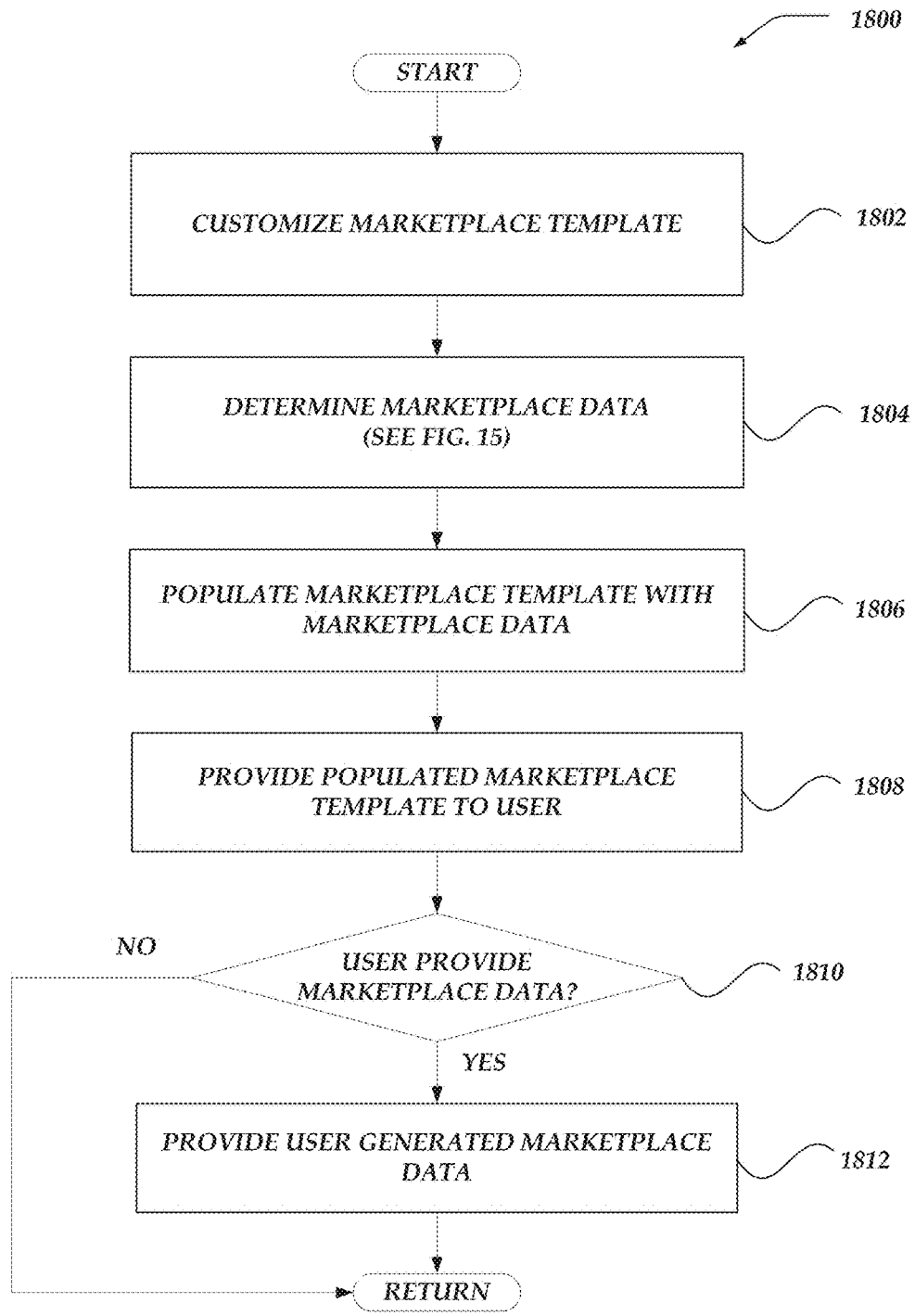
FIG. 18 illustrates a logical flow diagram generally showing one embodiment of a process for providing user community generated marketplace data for modular systems that are consistent with the various embodiments described herein.
Figure 19:
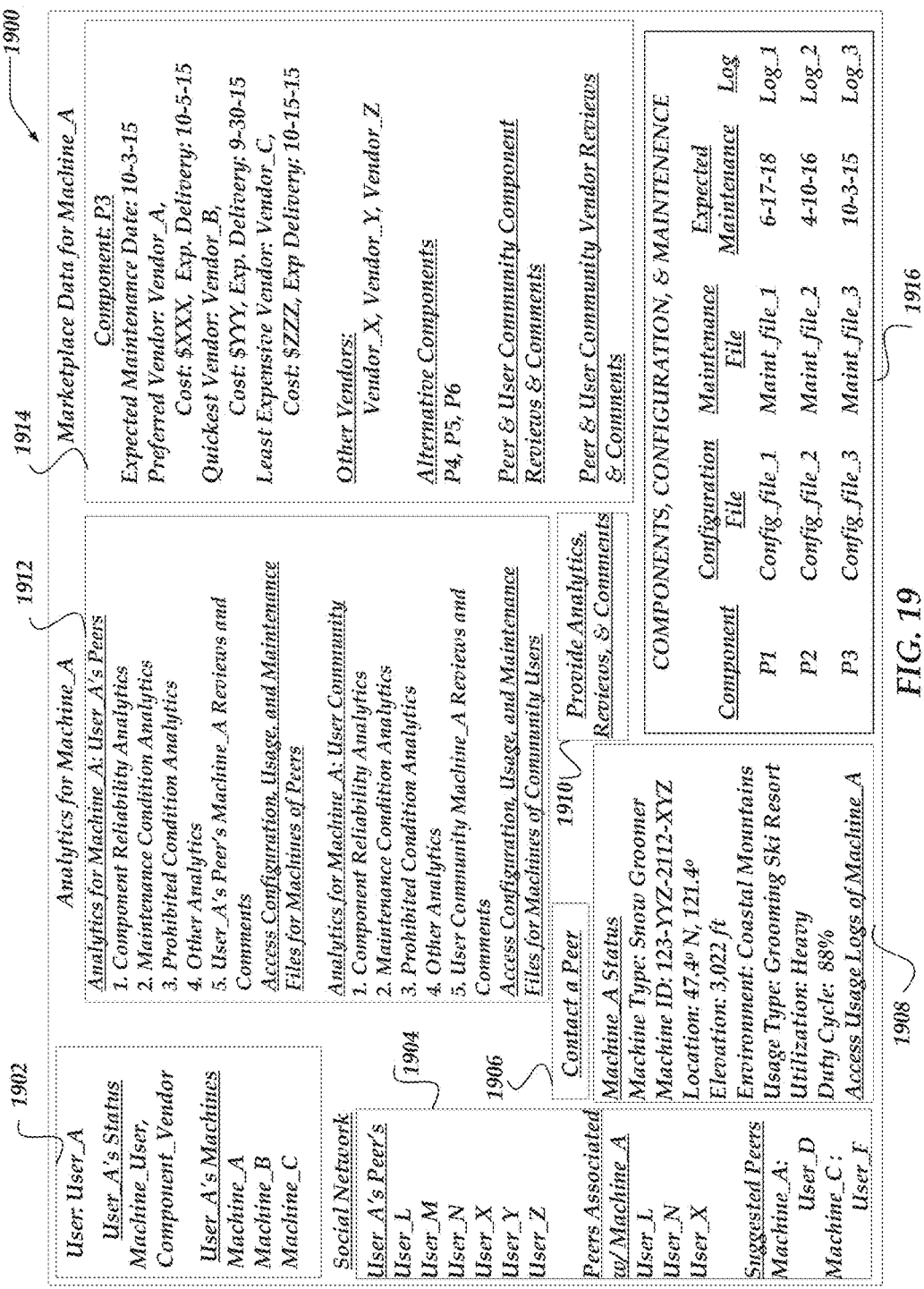
FIG. 19 illustrates an embodiment of a user interface for providing a machine user analytics and marketplace data for modular systems that is consistent with the various embodiments described herein.

FIGS. 16-18, discussed below, describe various embodiments for providing user community generated analytics and marketplace data for modular systems, such as any of the systems described herein. FIG. 19 illustrates an embodiment of a user interface 1900 for providing a machine user the analytics and marketplace data that are described throughout. In some embodiments, at least a portion of the analytics and marketplace data are provided to a machine user via user interface 704 of system 700 of FIG. 7. In at least one embodiment user interface 1900 is included in system 700 of FIG. 7. Portions of user interface 1900 and interface 704 are discussed in the context of processes 800, 900, 1000, 1100, 1200, 1300, 1400, 1500, 1600, 1700, 1720, or 1800 of FIG. 8, 9, 10, 11, 12, 13, 14, 15, 16, 17A, 17B, or 18 respectively. In at least some embodiments, user interface 1900 is included in system 700 of FIG. 7. As such, any user interactions provided via user interface 704 of FIG. 7, such as providing machine data, analytics, marketplace data, and the like, may be provided to a user via user interface 1900. Likewise, any information provided to a user via user interface 1900 may be provided to a user via user interface 704.

User interface (UI) 1900 may be used by a machine user, such as machine user User_A, or any other member of the user community. As shown in FIG. 19, UI 1900 is providing User_A various information, including community generated analytics and marketplace data. Furthermore, UI 1900 is enabling User_A to provide data and information, including analytics and any marketplace data generate by and/or specific to User_A or any machines associated with User_A, to the user community. Furthermore, UI 1900 enables User_A to form a social network and communicate information to peers within User_A's social network, as well as other users of the user community. In various embodiments, UI 1900 is provided to User_A via a display device of any computer, including but not limited to client computer 102-105 of FIG. 1, client computer 200 of FIG. 2, server computer 400 of FIG. 4, and the like. It should be understood that in the various embodiments, the information provided to a user of any user interface discussed herein, including but not limited to UI 1900 and UI 704 of FIG. 7, may be customized based on a customization of one or more templates, such as but not limited to analytic templates and marketplace data templates. For instance, the status of the user, the user's social network, the status of a particular machine, the components, configurations, and maintenance of a particular machine, and the like may each be customized based on templates.

Members of the user community may have one or more member statuses, such as machine user, component vendor, machine vendor, regulatory body, municipality, and the like. A UI portion 1902 of UI 1900 illustrates that User_A has a status of a machine user, as well as status of a component vendor. Accordingly, User_A uses machines as well as sells components for machines in an electronic marketplace that contributes to the marketplace data shown in UI portion 1914.

UI portion 1916 may display one or more components included in Machine_A, such as P1, P2, P3, and the like. The components may be automatically or manually identified, as discussed in the various embodiments herein. For each component or part, UI portion 1916 may provide links or other access to configuration files, maintenance files, sensor log files, or other analytics regarding Machine_A. In at least one embodiment, UI portion 1916 also provides at least an expected date or deadline regarded expected maintenance, determined in a maintenance predictive analysis. For instance, system 700 of FIG. 7 may predict that component P1 will be required to be replaced and/or maintained by Jun. 17, 2018. At least a portion of the information shown in UI portion 1916 may be based on information provided by system database 702 of FIG. 7, such as machine and component usage database 718, maintenance database 724, component reliability database 720.

Furthermore, UI portion 1902 may show various data regarding the user profile of User_A, including, but not limited to, machines associated with User_A. As shown in UI portion 1902, at least Machine_A, Machine_B, and Machine_C are associated with User_A.

FIG. 16 illustrates a logical flow diagram generally showing one embodiment of a process for providing user community generated analytics and marketplace data for modular systems that are consistent with the various embodiments described herein. Process 1600 may begin, after at start block, at block 1602, where a machine is determined. Various embodiments of determining a machine are discussed throughout, including at least in the context of FIGS. 8, 9, and 10. However briefly, at block 1602, a machine type may be determined based on interrogating or receiving data from a plurality of ID Tags associated with components included in the machine. Furthermore, the machine may be uniquely identified as a specific instance of the machine type. The specifically identified machine may be uniquely defined by a serial number or the like based on the self-identified components types and/or specific instances of the self-identified components. For instance, the machine may be uniquely identified.

In at least one embodiment, the machine includes a dedicated ID Tag that includes identification data for at least the machine type or the unique instance of the machine. In such embodiments, the identification of the included components and/or component types may not be required. The determination at block 1602 may be an automatic determination. A machine user may be prompted to confirm the determination of the machine and/or provide additional information. In at least some embodiments, the determination may be based on at least components that were manually entered by the machine user. In various embodiments, once a machine or at least a machine type has been determined, the machine may be associated with a user. For instance, UI portion 1902 of UI 1900 shows that User_A is a user of, or at least associated with, multiple machines, including Machine_A, Machine_B, and Machine_C.

In some embodiments, as discussed throughout, determining a machine may include determining a machine usage. Determining a machine usage may include determining an expected machine usage, a previous machine usage, an actual machine usage, and the like. For instance, determining a machine usage is discussed, at least in conjunction with process 900 of FIG. 9, process 1000 of FIG. 10, process 14 of FIG. 14, and process 1500 of FIG. 15.

Furthermore, determining a machine may include determining a geographical location and/or an environment of the machine, as discussed throughout, including at least process 1000. Essentially, at block 1602, any determinations as discussed herein may be determined, including but not limited to any block of processes 800, 900, and 1000 of FIGS. 8, 9, and 10.

At decision block 1604, the machine user may decide whether to opt-into a user community, wherein the user community includes but is not otherwise limited to any of the exemplary embodiments of user communities discussed herein. If the machine user decides to opt-into the user community, process 1600 flows to block 1606. Otherwise, process 1600 may terminate and/or return to a calling process to perform other actions. For instance, if the machine user does not decide to opt-into the user community, any other process described herein may be performed, such as, but not limited to processes 800, 900, 1000, 1100, 1200, 1300, 1400, or 1500 of FIGS. 8, 9, 10, 11, 12, 13, 14, and 15, respectively.

In at least one embodiment, the user must opt-out of the user community. In such an embodiment, unless the machine user opts-out of the user community, process 1600 will flow to block 1606. If the user does decide to opt-out of the user community, process 1600 may terminate.

In various embodiments, a machine user that has opted-into the user community (or alternatively, has not opted-out) may form a social network that includes one or more other individuals or members within the user community. The other users within the machine user's social network may be peers. UI portion 1904 of UI 1900 of FIG. 19 shows that User_A has opted into the user community and has formed a social network. The social network of a user may include a social graph. As shown by UI portion 1904, the peers within User_A's social network include User_L, User_M, User_N, User_X, and the like.

At least a portion of the peers within a social network may be associated with one or more machines. For instance, UI portion 1904 illustrates that User_L, User_N, and User_X are each associated with Machin_A, of which User_A is also associated with. These users may be associated with Machine_A, because these users are users of an equivalent machine to the machine type of Machine_A, or at least a similar machine to that of Machine_A. In some embodiments, at least one these users associated with Machine_A may be a vendor or supplier of an equivalent machine or a machine that is similar to Machine_A, or may be a component vendor for component types that may be included in, or used in conjunction with, Machine_A.

At block 1606, one or more peers are recommended to the user to include in the user's social network. The recommended peers may be based on a determined machine, such as the machine determined at block 1602, or during any other process described herein. In various embodiments, the recommended peers may be based on the determined machine type. In some embodiments, the recommendation of a peer may be based on an association between the recommended peer and the machine, machine type, or the like. In at least one embodiment, the recommended peers are based on the uniquely identified machine.

UI portion 1904 of UI 1900 shows that User_D has been recommended as a peer to include in User_A's social network, based on User_A's association with Machine_A. User_D is not currently a member of User_A's social network, but User_D may also be associated with a machine equivalent or at least similar to Machine_A. For instance, User_D may also be a user of a machine that is at least similar to Machine_A, or a vendor of Machine_A. Likewise, User_F has been recommended as a peer to User_A, based on both User_A's association and User_F's association with Machine_C. User_A may add one or more of the recommended peers, or any other member of the user community, to User_A's social network, via a request that may be initiated by contacting the recommended peer, as enabled by UI portion 1906. User_A may communicate messages, data, and the like via contacting a peer, a recommended peer, or another member of the user community via UI portion 1906.

In various embodiments, recommending peers is based on at least a geographic (geo-) location of the machine or the machine user. For instance, peers may be recommended based on a proximity between the user and the recommended peers. Likewise, peers may be recommended based on an environment, or at least an environmental parameter, of a machine associated with the user and/or one or more machines of the recommended peer. For instance, a peer may be recommended to User_A because User_A uses one or more machines in a desert environment, and the recommended peer also has used machines in a desert environment.

At block 1608, various analytics are provided to the machine user. Various embodiments of providing the machine user with analytics are discussed in conjunction with at least process 1700 of FIG. 17A. However briefly, at least a portion of the analytics may be for the machine or machine type determined at block 1602. In some embodiments, the analytics are for a machine selected in a UI, such as UI 704 of FIG. 7 or UI 1900 of FIG. 19. The analytics may include, but are not limited to analytics related to machine component reliability, machine maintenance conditions, machine prohibited conditions, machine usages, machine alert conditions, and the like. The analytics may include virtually any information about a machine associated with the user, or other machines associated with members of the user community.

As discussed throughout, analytics may include information or data stored in any databases described herein, including but not limited to system databases 702 of system 700 of FIG. 7. The analytics may be based on machine data generated by the user's machine. For instance, the analytics may be based on machine data generated by the ID_Tags and sensors included in the user's associated machines. The analytics may also be based on machine data generated by equivalent or similar machines associated with other members of the user community. For instance, the analytics may be based on data generated by the ID_Tags and/or sensors included in the other machines associated with the other members of the user community. In exemplary embodiments, the analytics may be based on the component reliability, maintenance conditions, prohibited conditions, machine and/or component logs, configurations, and the like, as determined by the various embodiments described herein for machines associated with members of the user community.

Accordingly, machine data may include any data generated by any machine associated with one or more members of the user community. In some embodiments, the analytics may be based on statistical distributions of the machine data. In at least one embodiment, at least a portion of the analytics are based on one or more moments of the statistical distributions of the machine data, such as the mean, the standard deviation, and the like. For instance, a component reliability analytic for a particular component included in the user's machine may be similar to, or even equivalent to, the mean time to failure of the component, as used by other members of the community in a similar application to that of the user that is being provided the analytic. The analytics may be based on anecdotal data provided by one or more members of the community, such as component and/or machine reviewer and comments, and the like.

At least a portion of the analytics may be generated based on machine data provided by peers within the user's social network. As discussed throughout, at least a portion of the analytics may be provided to the user via a user interface, such as UI 1900 of FIG. 19 or UI 704 of FIG. 7. UI portion 1912 of UI 1900 shows an exemplary embodiment of providing User_A with user community generated analytics. The analytics provided in UI portion 1912 may be based on a customization of an analytics template. As shown in UI portion 1912, the provided analytics may be subdivided into analytics based on machine data specific to peers within User_A's social network and analytics based on machine data provided by the user community as a whole. For instance, the component reliability, the maintenance condition, the prohibited condition, and other such analytics generated based on the statistical distributions of machine data provided by the User_A's peers may be shown in one section of UI portion 1912, while the corresponding analytics generated by the machine data of a larger portion of the user community may be shown in another section of UI portion 1912.

At block 1610, marketplace data is provided to the machine user. Various embodiments of providing the machine user with marketplace data are discussed in conjunction with at least process 1800 of FIG. 18. However briefly, at least a portion of the marketplace data may be for the machine or machine type determined at block 1602. The marketplace data may include information relating to the maintenance of the machine, replacement components or alternative components for the machine, and the like for various machines. Marketplace data may include an aggregation of electronic (e)-commerce data. Marketplace data may be provided (automatically or manually) may be based on data aggregated from various sources, including vendors, suppliers, buyers, sellers, online auctioneers, members of the user community, and the like.

At least a portion of the marketplace data may be based on machine data provided by the user community. As such, the marketplace data may be generated by the user community. At least a portion of the user community generated marketplace data may be generated by peers within the machine user's social network. The marketplace data may be provided to the machine user via a user interface, such as UI 1900 of FIG. 19. UI portion 1914 of UI 1900 shows an exemplary embodiment of providing User_A with marketplace data. The marketplace data provided in UI portion 1914 may be based on a customization of a marketplace data template. Process 1600 may terminate and/or return to a calling process to perform other actions.

FIG. 17A illustrates a logical flow diagram generally showing one embodiment of a process for providing user community generated analytics for modular systems that are consistent with the various embodiments described herein. Process 1700 begins, after a start block, at block 1702 where an analytics template is customized. Customizing the analytics template may enable a customization of which analytics are determined and how the determined analytics are provided to a user, such as a user of a user interface.

The user may customize the analytics template to indicate which analytics are provided and a structure for the provided analytics, as well as which members of the user community contribute machine data, as well as reviews, comments, and the like to determine the analytics. In some embodiments, customizing the analytics template may include indicating which analytics are to be provided. Customizing the analytics template may include indicating which members of the user community may provide the machine data to determine the various analytics. For instance, a portion of the analytics may be based on machine data provided by only peers of the user. Other analytics may be based on machine data provided by a larger subset of members of the user community.

UI portion 1912 of UI 1900 of FIG. 19, as well various portions of UI 704 of FIG. 7, shows various analytics provided to machine user. Customizing the analytics template may configure which analytics are determined and how the analytics are shown and organized in UI portion 1912, as well as UI 704.

At block 1704, various analytics are determined based on the customized analytics template. Various embodiments of determining analytics are discussed in at least conjunction with process 1720 of FIG. 17B. However, briefly, at least a portion of the analytics may be generated based on machine data, user reviews, user comments, and the like provided by members of the user community. For instance, members of the user community may provide ID Tag and sensor data for components, reliability data for components, prohibited, or maintenance conditions of the machines that they have used and the like, as determined by the various embodiments discussed herein.

At least a portion of the user community generated analytics may be generated based on machine data, user reviews, user comments, and the like provided by the peers within the user's social network. The various analytics may be associated with a machine associated with the user. For instance, UI portion 1912 provides user community and peer generated analytics associated with Machine_A. Analytics associated with other machines associated with the user may be presented by selecting another machine within UI 1900.

As discussed throughout, determining analytics may include determining a machine user and/or a user community. Various embodiments for determining a machine user and/or a user community are discussed in at least the context of process 1000 of FIG. 10. Analytics associated with a machine may include virtually any information or data (including ID_Tag and sensor data) associated with the machine. For instance, the user community generated analytics may include, but are not limited to component reliability analytics, maintenance condition analytics, prohibited condition analytics, machine usage (previous, expected, actual, and the like) analytics, alert condition analytics, and the like. The analytics may include log files for other machines that are used by users in the user community. At least a portion of the antics may be based on a machine user associated with the machine.

At least a portion of the determined analytics may be associated with a particular machine. For instance, UI portion 1908 of UI 1900 shows analytics that are particularized to Machine_A. Some of these analytics may be directed to a status of Machine_A. For instance, analytics may include the type of machine, a unique machine ID, at least an approximate geo-location of the machine, an approximate elevation of the machine, an environment of the machine, usage type, machine utilization, duty cycle, and the like. Analytics may include log files for the particular machine.

As noted throughout, the analytics for the machine may include component reliability analytics for at least a portion of the components included in a particular machine associated with the user. Component reliability analytics may include determined component reliability. In various embodiments, the component reliability analytics may include component reliability, such as that determined in conjunction with at least block 1406 of process 1400 of FIG. 14, or any other embodiments described herein. Analytics for the machine may include maintenance conditions as determined by any of the various embodiments described herein. Analytics may also include prohibited conditions as determined by any of the various embodiments described herein. The analytics may include log files for machines used by members of the user community.

At block 1706, at least a portion of the determined analytics are used to populate the customized analytics template. The customization of the analytics template at block 1702 may determine which analytics are used to populate the analytics template. At block 1708, the populated analytics template is provided to a user. For instance, the populated analytics template may be provided to a user via a user interface, such as UI 1900.

At decision block 1710, it is determined whether the user will provide machine data, user reviews, user comments, and the like to contribute to the user community generated analytics. For instance, due to privacy concerns, a user may wish to keep at least a portion of the machine data generated by one or more of the machines associated with them private. In such embodiments, process 1700 may terminate and/or return to a calling process to perform other actions. Otherwise, process 1700 flows to block 1712.

At block 1712, the user provides at least a portion of the machine data corresponding to one or more of the user's associated machines. For instance, ID Tag and/or sensor generated data may be provided to platform 140 of FIG. 1. Such machine data may be used to generate at least a portion of the analytics discussed herein. The user may additionally provide log files for one or more of their associated machines, any of the data shown in any user interface discussed herein, such as UI portion 1908 of UI 1900, users reviews, comments, and the like. For instance, the user may provide configuration log files, usage log files, maintenance log files, and the like. The user may set permissions on the log files, regarding who in the user community may access the various log files. For instance, the user may set permissions such that the log files may only be accessed by peers. In at least one embodiment, the user may set a permission that indicates that the log files must be anonymized prior to being shared with other members of the user community. In at least one embodiment, the user may set a permission that indicates that the machine data included in the log files may be used to contribute to the statistical distributions of the user community to generate analytics, but the log files may not be otherwise accessible to members of the user community. In various embodiments, the machine data used to generate the various analytics may be provided by the members in the user community via such log files. In at least one embodiment, the machine data that is provided at block 1712 is based on the customized analytics template. Process 1700 may terminate and/or return to a calling process to perform other actions.

FIG. 17B illustrates a logical flow diagram generally showing one embodiment of a process for determining user community generated analytics for modular systems that are consistent with the various embodiments described herein. After a start block, process 1720 begins at block 1722, where machine configurations are determined based on the user community. In at least one embodiment, the machine configurations are determined based on the machine configurations of machines associated with members of the user community and/or the machine configurations of machines associated with the peers of the user. The machine configurations may be based on a machine selected by the user to be provided the analytics. In at least one embodiment, the machine configurations are determined for one or more machines associated with one or more members of the user community. The one or more members of the user community may include one or more peers included in the user's social network. Various embodiments for determining machine configurations are discussed throughout, including at least in conjunction with processes 800 and 900 of FIGS. 8 and 9. The configurations may be provided via a configuration log file.

At block 1724, the component reliability for one or more components is determined based on the user community. In at least one embodiment, one or more component reliabilities are determined based on the component reliabilities for component types included in machines associated with members of the user community and/or the component reliabilities of component types included in machines associated with the peers of the user. The one or more components may be a component type included in a machine associated with the user that the analytics are being provided to. For instance, in various embodiments, the one or more components may include component types that are included in Machine_A, of UI 1900 of FIG. 19, because Machine_A is associated with User_A of UI 1900.

Various embodiments for determining the component reliability of components are discussed at least in conjunction with process 1400 of FIG. 14 or any other process discussed herein. The component reliability may be determined based on various component reliability distributions generated from the component reliabilities of component types included in machines associated with members of the user community and/or peers included in the user's social network. The one or more component reliabilities may be based on a component reliability database, such as component reliability database 720 of FIG. 7.

At block 1726, the maintenance conditions for one or more machines are determined based on the user community. In at least one embodiment, one or more maintenance conditions are determined based on the maintenance conditions for machines associated with members of the user community and/or the maintenance conditions of machines associated with the peers of the user to be provided analytics. The one or more maintenance conditions may be based on the one or more component reliabilities determined at block 1724 or within any other process described herein. The one or more maintenance conditions may be a maintenance conditions for a machine associated with the user that the analytics are being provided to. For instance, in various embodiments, the determined one or more maintenance conditions may be maintenance conditions for Machine_A associated with User_A of UI 1900.

Various embodiments for determining the maintenance conditions of machines are discussed at least in conjunction with process 1300 and process 1400 of FIGS. 13-14. The maintenance conditions may be based on various maintenance condition distributions generated from maintenance conditions of machines associated with members of the user community and/or peers included in the user's social network. The one or more maintenance conditions may be based on a maintenance database, such as maintenance database 722 of FIG. 7. The one or more maintenance conditions may be based on a maintenance file or maintenance log file of one or more machines or one or more members of the user community.

At block 1728, the prohibited conditions for one or more machines are determined based on the user community. In at least one embodiment, one or more prohibited conditions are determined based on the prohibited conditions for machines associated with members of the user community and/or the prohibited conditions for machines associated with the peers of the user to be provided analytics. The one or more prohibited conditions may be based on the one or more component reliabilities determined at block 1724 or within any other process described herein. The one or more prohibited conditions may be a prohibited conditions for a machine associated with the user that the analytics are being provided to. For instance, in various embodiments, the determined one or more prohibited conditions may be prohibited conditions for Machine_A associated with User_A of UI 1900.

Various embodiments for determining the prohibited conditions of machines are discussed at least in conjunction with process 1200 of FIG. 12. The prohibited conditions may be based on various prohibited condition distributions generated from prohibited conditions of machines associated with members of the user community and/or peers included in the user's social network. The one or more prohibited conditions may be based on a data included in a database, such as any of the databases included in system database 702 of FIG. 7. The one or more prohibited conditions may be based on data included in a file or log file of one or more machines or one or more members of the user community.

At block 1730, the alert conditions for one or more machines are determined based on the user community. In at least one embodiment, one or more alert conditions are determined based on the alert conditions for machines associated with members of the user community and/or the alert conditions for machines associated with the peers of the user to be provided analytics. The one or more alert conditions may be based on the one or more component reliabilities determined at block 1724 or within any other process described herein. The one or more alert conditions may be alert conditions for a machine associated with the user that the analytics are being provided to. For instance, in various embodiments, the determined one or more alert conditions may be prohibited conditions for Machine_A associated with User_A of UI 1900.

Various embodiments for determining the alert conditions of machines are discussed at least in conjunction with process 1100 of FIG. 11. The alert conditions may be based on various alert condition distributions generated from alert conditions of machines associated with members of the user community and/or peers included in the user's social network. The one or more alert conditions may be based on a data included in a database, such as any of the databases included in system database 702 of FIG. 7. The one or more alert conditions may be based on data included in a file or a log file of one or more machines or one or more members of the user community.

At block 1732, the machine usage for one or more machines are determined based on the user community. In at least one embodiment, machine usage is determined for one or more machines associated with members of the user community and/or one or more machines associated with the peers of the user to be provided analytics. The determined machine usage may be expected machine usage, actual machine usage, or the like. The machine usage may be for a machine associated with the user that the analytics are being provided to. For instance, in various embodiments, the determined machine usage may be for Machine_A associated with User_A of UI 1900. The determined machine usage may include usage type, utilization, duty cycle, and the like. Machine usage may include a geo-location, elevation, and/or one or more environmental parameters of the machine or machine's geo-location.

Various embodiments for determining the alert conditions of machines are discussed at least in conjunction with process 800, process 900, and process 1000 of FIGS. 8, 9, and 10. The machine usage may be based on various machine usage distributions generated from machine usages for machines associated with members of the user community and/or peers included in the user's social network. The one or more determined machine usages may be based on a data included in a database, such as any of the databases included in system database 702 of FIG. 7. The one or more machine usages may be based on data included in a file or a log file of one or more machines or one or more members of the user community. Such log files may include machine usage log files.

At block 1734, one or more analytics are determined. The determined analytics may be based on any of the configurations, component reliabilities, maintenance conditions, prohibited conditions, alert conditions, machine usage, and the like. In at least one embodiment, the analytics may be based on reviews and/or comments provided by members of the user community, including peers of the user to be provided the determined analytics. In some embodiments, the determined analytics are determined by an analytics template. The analytics template may be a customized template. Process 1700 may terminate and/or return to a calling process to perform other actions.

FIG. 18 illustrates a logical flow diagram generally showing one embodiment of a process for providing user community generated marketplace data for modular systems that are consistent with the various embodiments described herein. Process 1800 begins, after a start block, at block 1802 where a marketplace template is customized. Customizing the marketplace template may enable a customization of which marketplace data is determined and how the determined marketplace data is provided to a user, such as a user of a user interface.

The user may customize the marketplace template to indicate which marketplace data is provided and a structure for the provided marketplace data, as well as which members of the user community contribute data, as well as reviews, comments, and the like to determine the marketplace data. In some embodiments, customizing the marketplace data template may include indicating which marketplace data is to be provided. Customizing the marketplace data template may include indicating which members of the user community may provide the data. For instance, a portion of the marketplace data may be based on an aggregation of marketplace data provided by only peers of the user. Other embodiments of marketplace data may be based on an aggregation of marketplace data provided by a larger subset of members of the user community.

UI portion 1914 of UI 1900 of FIG. 19, as well various portions of UI 704 of FIG. 7, such as marketplace display 744, shows various analytics provided to machine user. Customizing the marketplace template may configure which marketplace data is determined and how the marketplace data is shown and organized in UI portion 1914, as well as UI 704.

At block 1804, various marketplace data is determined based on the customized marketplace template. Various embodiments of determining marketplace data are discussed in at least conjunction with process 1500 of FIG. 15. However, briefly, at least a portion of the marketplace data may be generated based on machine data, user reviews, user comments, and the like provided by members of the user community. The marketplace data may be an aggregation of marketplace data, machine data, and the like provided by various machine and component vendors.

At least a portion of the user community generated marketplace data may be generated based on machine data, user reviews, user comments, and the like provided by the peers within the user's social network. For instance, the user's peers or other members of the user community may provide reviews and/or comments of the services provided by various machine and/or component vendors. The marketplace data may be associated with a machine associated with the user. For instance, UI portion 1914 of FIG. 19 and marketplace display 744 of FIG. 7, provide user community and peer generated marketplace data associated with Machine_A. Marketplace data associated with other machines associated with the user may be presented by selecting another machine within UI 1900.

As discussed throughout, determining marketplace data may include determining a machine user and/or a user community. Various embodiments for determining a machine user and/or a user community are discussed in at least the context of process 1000 of FIG. 10. Marketplace data associated with a machine may include virtually any information or data pertaining to online or e-commerce regarding the machine and/or machine components. For instance, the user community generated marketplace data may include, but are not limited to expected maintenance dates for the machine and/or machine components, which vendors may provide components the fastest, the most cost effective, and the like, as well as lists of preferred vendors. The marketplace data may include expected dates at which the various vendors or suppliers may provide replacement and/or alternative components. The marketplace data may include alternative component types for components that have an associated upcoming expected maintenance date. The marketplace data may include user community generated reviews and comments of components, suppliers, vendors, and the like. Such reviews and comments may be provided and/or filtered by the user's peers and the like.

At least a portion of the determined marketplace data may be associated with a particular machine. For instance, UI portion 1914 of UI 1900, and marketplace display 744 of UI 704, shows marketplace data that is particularized to Machine_A. Some of this marketplace data may be directed to a status of Machine_A. For instance, recommended vendors may based on the type of machine, a unique machine ID, at least an approximate geo-location of the machine, an approximate elevation of the machine, an environment of the machine, usage type, machine utilization, duty cycle, and the like.

At block 1806, at least a portion of the determined marketplace data is used to populate the customized marketplace template. The customization of the marketplace template at block 1802 may determine which marketplace data is used to populate the marketplace template. At block 1808, the populated analytics template is provided to a user. For instance, the populated marketplace template may be provided to a user via a user interface, such as UI 1900 of FIG. 19 or UI 704 of FIG. 7.

At decision block 1810, it is determined whether the user will provide marketplace data to contribute to the user community generated marketplace data. For instance, due to privacy concerns, a user may not wish to provide reviews or comments regarding components, vendors, suppliers, and the like. In such embodiments, process 1800 may terminate and/or return to a calling process to perform other actions. Otherwise, process 1800 flows to block 1812.

At block 1812, the user provides marketplace data corresponding to one or more of the user's associated machines. As shown in UI portion 1902 of UI 1900, in addition to being a machine user, User_A is also a component vendor. As such, User_A may provide marketplace data to the user community. Such user provided marketplace data may be used to generate at least a portion of the user community generated marketplace data discussed herein. The user may provide marketplace data, including but not limited to cost, availability, expected delivery dates, and the like for various machines, components, and the like. At least a portion of the marketplace data may be based on machine data. The user may provide reviews and/or comments regarding other vendors, suppliers, and the like. The user may also provide reviews and/or comments regarding other machines, machine components, and the like. The user may set permissions on for the marketplace data, regarding who in the user community may access the provided marketplace data. For instance, the user may set permissions such that at least portions of the marketplace data may only be accessed by peers. In at least one embodiment, the user may set a permission that indicates that at least portions of the marketplace data must be anonymized prior to being shared with other members of the user community. For instance, their reviews must be anonymized. In at least one embodiment, the marketplace data that is provided at block 1812 is based on the customized marketplace template. Process 1800 may terminate and/or return to a calling process to perform other actions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for managing a machine, comprising:
communicating, to a collection computer, component identification data separately stored in each of a plurality of component identification (ID) Tags that correspond to one or more components for the machine, wherein the component identification data includes a component type;
automatically determining a machine type of the machine based on a comparison of the one or more component types and one or more previously provided combinations of component types that correspond to one or more previously determined machine types, wherein a statistical evaluation of a look up table that maps correlations between specific combinations of component types and machine types is employed to determine the machine type;
recommending one or more candidate peers to include in a social network of a user based on one or more of the component types or the machine type, wherein the one or more candidate peers are included in a user community;
providing an analytics template to the user, wherein the analytics template is populated with analytics for the machine type based on machine data provided by the user community; and
providing a marketplace template to the user, wherein the marketplace template is populated with marketplace data for the machine type based on the machine data provided by the user community.

2. The method of claim 1, wherein at least one of the analytics or the marketplace data for the machine type is further based on machine data provided by the plurality of peers of the user.

3. The method of claim 1, further comprising:
determining an expected machine usage based on a previously determined machine usage for the user community; and
determining at least one of the analytics or the marketplace data for the machine type based on the previously determined expected machine usage for the user community.

4. The method of claim 1, further comprising:
determining an actual machine usage based on data provided by one or more sensors that correspond to one or more characteristics of the one or more components for the machine; and
dynamically updating at least one of the analytics or the marketplace data for the machine type based on the actual machine usage.

5. The method of claim 1, further comprising:
determining one or more of a geographic location or an environmental parameter of the machine, wherein at least one of the one or more candidate peers, the analytics for the machine type, or the marketplace data for the machine type is further based on the one or more of the geographic location or the environmental parameter.

6. The method of claim 1, further comprising:
determining the analytics for the machine type based on a customization of the analytics template by the user; and determining the marketplace data for the machine type based on a customization of the marketplace template by the user.

7. The method of claim 1, further comprising:
determining one or more maintenance conditions based on at least a previous machine usage and the machine data provided by the user community;
determining one or more alternative components based on the one or more maintenance conditions or the machine data; and
determining the marketplace data based on the one or more maintenance conditions, the one or more alternative components or the machine data.

8. The method of claim 1, further comprising:
generating user data based on data provided by one or more sensors that correspond to one or more characteristics of the one or more components for the machine; and
receiving the user data from the machine; and
updating the machine data to include at least a portion of the user data.

9. A processor readable non-transitory storage media that includes instructions for managing a machine, wherein the execution of the instructions by a processor enables actions, comprising:
communicating, to a collection computer, component identification data separately stored in each of a plurality of component identification (ID) Tags that correspond to one or more components for the machine, wherein the component identification data includes a component type;
automatically determining a machine type of the machine based on a comparison of the one or more component types and one or more previously provided combinations of component types that correspond to one or more previously determined machine types, wherein a statistical evaluation of a look up table that maps correlations between specific combinations of component types and machine types is employed to determine the machine type;
recommending one or more candidate peers to include in a social network of a user based on one or more of the component types or the machine type, wherein the one or more candidate peers are included in a user community;
providing an analytics template to the user, wherein the analytics template is populated with analytics for the machine type based on machine data provided by the user community; and
providing a marketplace template to the user, wherein the marketplace template is populated with marketplace data for the machine type based on the machine data provided by the user community.

10. The media of claim 9, wherein at least one of the analytics or the marketplace data for the machine type is further based on machine data provided by the plurality of peers of the user.

11. The media of claim 9, wherein the actions further comprise:
determining an expected machine usage based on a previously determined machine usage for the user community; and
determining at least one of the analytics or the marketplace data for the machine type based on the previously determined expected machine usage for the user community.

12. The media of claim 9, wherein the actions further comprise:
   determining an actual machine usage based on data provided by one or more sensors that correspond to one or more characteristics of the one or more components for the machine; and
   dynamically updating at least one of the analytics or the marketplace data for the machine type based on the actual machine usage.

13. The media of claim 9, wherein the actions further comprise:
   determining one or more of a geographic location or an environmental parameter of the machine, wherein at least one of the one or more candidate peers, the analytics for the machine type, or the marketplace data for the machine type is further based on the one or more of the geographic location or the environmental parameter.

14. The media of claim 9, wherein the actions further comprise:
   determining the analytics for the machine type based on a customization of the analytics template by the user; and
   determining the marketplace data for the machine type based on a customization of the marketplace template by the user.

15. The media of claim 9, wherein the actions further comprise:
   determining one or more maintenance conditions based on at least a previous machine usage and the machine data provided by the user community;
   determining one or more alternative components based on the one or more maintenance conditions or the machine data; and
   determining the marketplace data based on the one or more maintenance conditions, the one or more alternative components or the machine data.

16. The media of claim 9, wherein the actions further comprise:
   generating user data based on data provided by one or more sensors that correspond to one or more characteristics of the one or more components for the machine; and
   receiving the user data from the machine; and
   updating the machine data to include at least a portion of the user data.

17. A system for managing a machine, comprising:
   a plurality of component identification (ID) Tags that separately store component identification data, wherein each of the plurality of ID Tags corresponds to one or more components for the machine and the component identification data includes a component type; and
   a network computer;
   a memory for storing at least instructions; and
   a processor device that executes the instructions to enable actions, comprising:
      communicating, to a collection computer, component identification data separately stored in each of a plurality of component identification (ID) Tags that correspond to one or more components for the machine, wherein the component identification data includes a component type;
      automatically determining a machine type of the machine based on a comparison of the one or more component types and one or more previously provided combinations of component types that correspond to one or more previously determined machine types, wherein a statistical evaluation of a look up table that maps correlations between specific combinations of component types and machine types is employed to determine the machine type;
      recommending one or more candidate peers to include in a social network of a user based on one or more of the component types or the machine type, wherein the one or more candidate peers are included in a user community, wherein the likeliest comparison is employed to determine the machine type;
      providing an analytics template to the user, wherein the analytics template is populated with analytics for the machine type based on machine data provided by the user community; and
      providing a marketplace template to the user, wherein the marketplace template is populated with marketplace data for the machine type based on the machine data provided by the user community.

18. The system of claim 17, wherein at least one of the analytics or the marketplace data for the machine type is further based on machine data provided by the plurality of peers of the user.

19. The system of claim 17, wherein the actions further comprise:
   determining an expected machine usage based on a previously determined machine usage for the user community; and
   determining at least one of the analytics or the marketplace data for the machine type based on the previously determined expected machine usage for the user community.

20. The system of claim 17, wherein the actions further comprise:
   determining an actual machine usage based on data provided by one or more sensors that correspond to one or more characteristics of the one or more components for the machine; and
   dynamically updating at least one of the analytics or the marketplace data for the machine type based on the actual machine usage.

21. The system of claim 17, wherein the actions further comprise:
   determining one or more of a geographic location or an environmental parameter of the machine, wherein at least one of the one or more candidate peers, the analytics for the machine type, or the marketplace data for the machine type is further based on the one or more of the geographic location or the environmental parameter.

22. The system of claim 17, wherein the actions further comprise:
   determining the analytics for the machine type based on a customization of the analytics template by the user; and
   determining the marketplace data for the machine type based on a customization of the marketplace template by the user.

23. The system of claim 17, wherein the actions further comprise:
   determining one or more maintenance conditions based on at least a previous machine usage and the machine data provided by the user community;
   determining one or more alternative components based on the one or more maintenance conditions or the machine data; and determining the marketplace data based on the one or more maintenance conditions, the one or more alternative components or the machine data.

24. The system of claim 17, wherein the actions further comprise:
generating user data based on data provided by one or more sensors that correspond to one or more characteristics of the one or more components for the machine; and
receiving the user data from the machine; and
updating the machine data to include at least a portion of the user data.

\* \* \* \* \*